United States Patent [19]

Reddersen et al.

[11] Patent Number: 5,475,206
[45] Date of Patent: Dec. 12, 1995

[54] SCANNER ASSEMBLY

[75] Inventors: Brad R. Reddersen; Phillip C. Gummeson, both of Eugene, Oreg.; Hiroshi Hayakawa, Saitama, Japan; Blaine F. Loris, Eugene, Oreg.; Randy D. Elliott, Eugene, Oreg.; Kimberly A. Ketelsleger, Eugene, Oreg.; Haruhiko Machida, Tokyo; Yoshiyuki Sugawara, Saitama, both of Japan; Roger M. Kenyon; Thomas L. Durant, both of Eugene, Oreg.

[73] Assignee: Spectra-Physics Scanning Systems, Inc., Eugene, Oreg.

[21] Appl. No.: 271,229

[22] Filed: Jul. 6, 1994

Related U.S. Application Data

[63] Continuation of Ser. No. 839,797, Feb. 21, 1992, abandoned.

[51] Int. Cl.⁶ .................................................... G06K 7/16
[52] U.S. Cl. ........................................... 235/462; 235/472
[58] Field of Search ................................. 235/461, 468, 235/462, 470, 472; 359/216, 217, 219, 221; 250/334

[56] References Cited

U.S. PATENT DOCUMENTS

| | | | |
|---|---|---|---|
| 4,000,397 | 12/1976 | Hebert et al. | 235/462 |
| 4,224,509 | 9/1980 | Cheng | 235/467 X |
| 4,333,006 | 6/1982 | Gorin et al. | 235/457 |
| 4,387,297 | 6/1983 | Swartz et al. | 235/462 |
| 4,409,470 | 10/1983 | Shepard et al. | 235/472 |
| 4,415,224 | 11/1983 | Dickson | 350/3.71 |
| 4,538,060 | 8/1985 | Sakai et al. | 235/472 |
| 4,560,862 | 12/1985 | Eastman et al. | 235/467 |
| 4,575,625 | 3/1986 | Knowles | 235/467 |
| 4,591,242 | 5/1986 | Broockman et al. | 350/3.71 |
| 4,607,156 | 8/1986 | Koppenaal et al. | 235/472 |
| 4,652,750 | 3/1987 | Eastman et al. | 250/239 |
| 4,699,447 | 10/1987 | Howard | 350/6.9 |
| 4,721,860 | 1/1988 | Troendle | 235/462 X |
| 4,736,095 | 4/1988 | Shepherd et al. | 235/472 |
| 4,740,675 | 4/1988 | Brosnan et al. | 235/462 |
| 4,748,316 | 5/1988 | Dickson | 235/454 |
| 4,760,248 | 7/1988 | Swartz et al. | 235/472 |
| 4,766,300 | 8/1988 | Chadima, Jr. et al. | 235/472 |
| 4,794,237 | 12/1988 | Ferrante | 235/454 X |
| 4,806,742 | 2/1989 | Swartz et al. | 233/472 |
| 4,808,804 | 2/1989 | Krichever | 235/462 |
| 4,816,660 | 3/1989 | Swartz et al. | 235/472 |
| 4,831,275 | 5/1989 | Drucker | 235/462 X |
| 4,835,374 | 5/1989 | Swartz et al. | 235/472 |
| 4,861,975 | 8/1989 | Kino et al. | 250/201 |
| 4,877,949 | 10/1989 | Danielson et al. | 235/472 X |
| 4,897,532 | 1/1990 | Swartz et al. | 235/472 |
| 4,920,255 | 4/1990 | Gabeler | 235/472 X |
| 4,930,848 | 6/1990 | Knewles | 235/472 X |

(List continued on next page.)

OTHER PUBLICATIONS

International Publication No. WO91/11065, published Jul. 25, 1991, Norand Corporation.
International Publication No. WO 90/16033, published Dec. 27, 1990, Norand Corporation.
Japanese Application for Utility Model Registration No. 4212, filed Nov. 12, 1991, Opt Electronics Co. Ltd., including English translation thereof.

*Primary Examiner*—John Shepperd
*Attorney, Agent, or Firm*—Lyon & Lyon

[57] ABSTRACT

A laser bar code system is described which includes a first scan module releasably affixed to a housing, which scan module is readily interchangeable with and plug compatible with a second scan module which is configured at least partly differently from the first scan module. In addition, a partitioned scan module is described which comprises a first laser diode subsystem, a first scanning subsystem, a first collection subsystem, and a first signal processing subsystem, a selected one of which is releasably affixed to a chassis, and readily interchangeable and plug compatible with a second laser diode subsystem, a second scanning subsystem, a first collection subsystem, and a second signal processing subsystem, respectively, which is configured at least partly differently from the first.

9 Claims, 53 Drawing Sheets

U.S. PATENT DOCUMENTS

| | | | |
|---|---|---|---|
| 4,939,356 | 7/1990 | Rando et al. | 235/470 |
| 4,962,980 | 10/1990 | Knowles | 235/467 X |
| 4,971,410 | 11/1990 | Wike, Jr., et al. | 235/472 |
| 5,080,456 | 1/1992 | Katz et al. | 359/214 |
| 5,122,644 | 6/1992 | Hasegawa et al. | 235/472 X |
| 5,132,525 | 6/1992 | Swartz et al. | 235/472 |
| 5,148,008 | 9/1992 | Takenaka | 235/472 X |
| 5,168,149 | 12/1992 | Dvorkis et al. | 235/462 X |
| 5,202,784 | 4/1993 | Reddersen | 359/196 |
| 5,218,187 | 6/1993 | Koenck et al. | 235/462 X |
| 5,313,053 | 5/1994 | Koenck et al. | 235/472 |

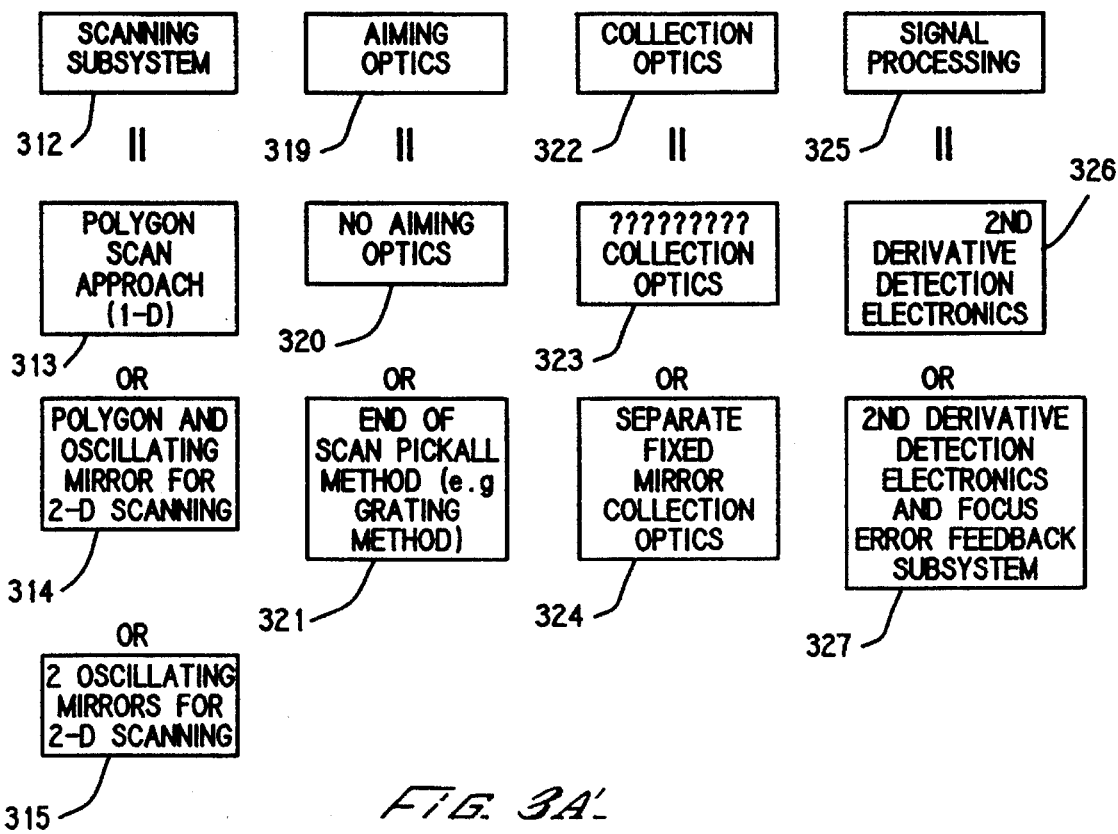
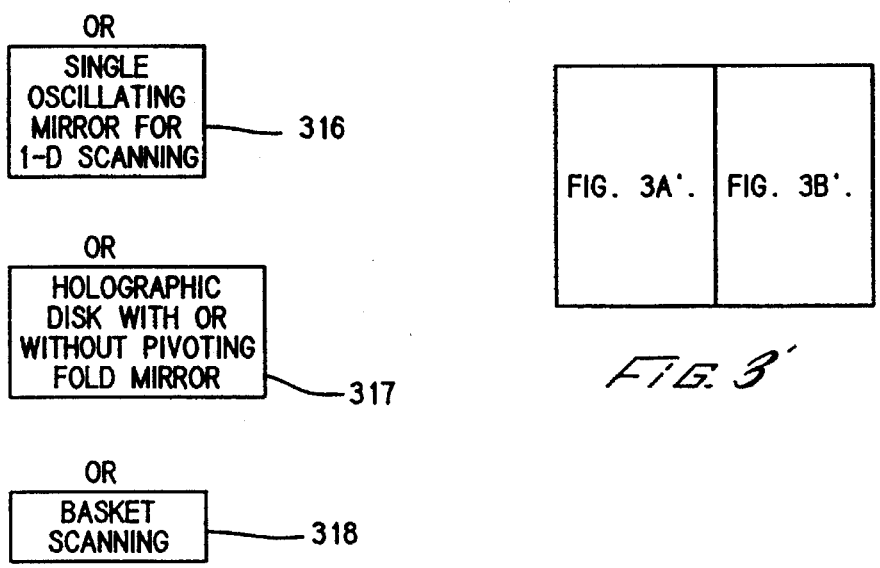

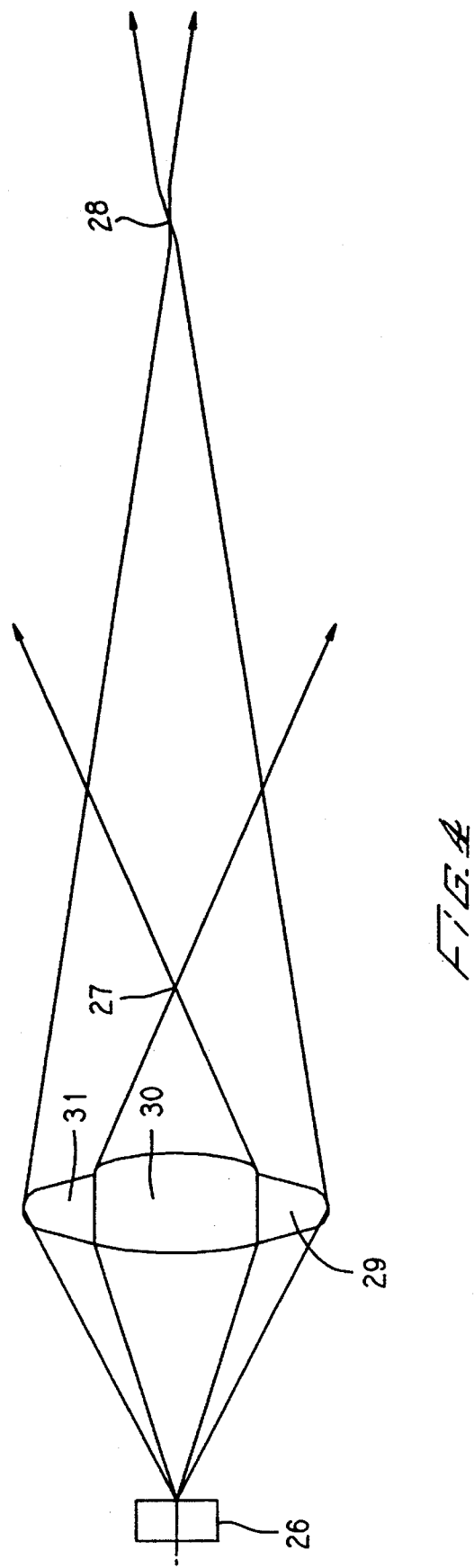

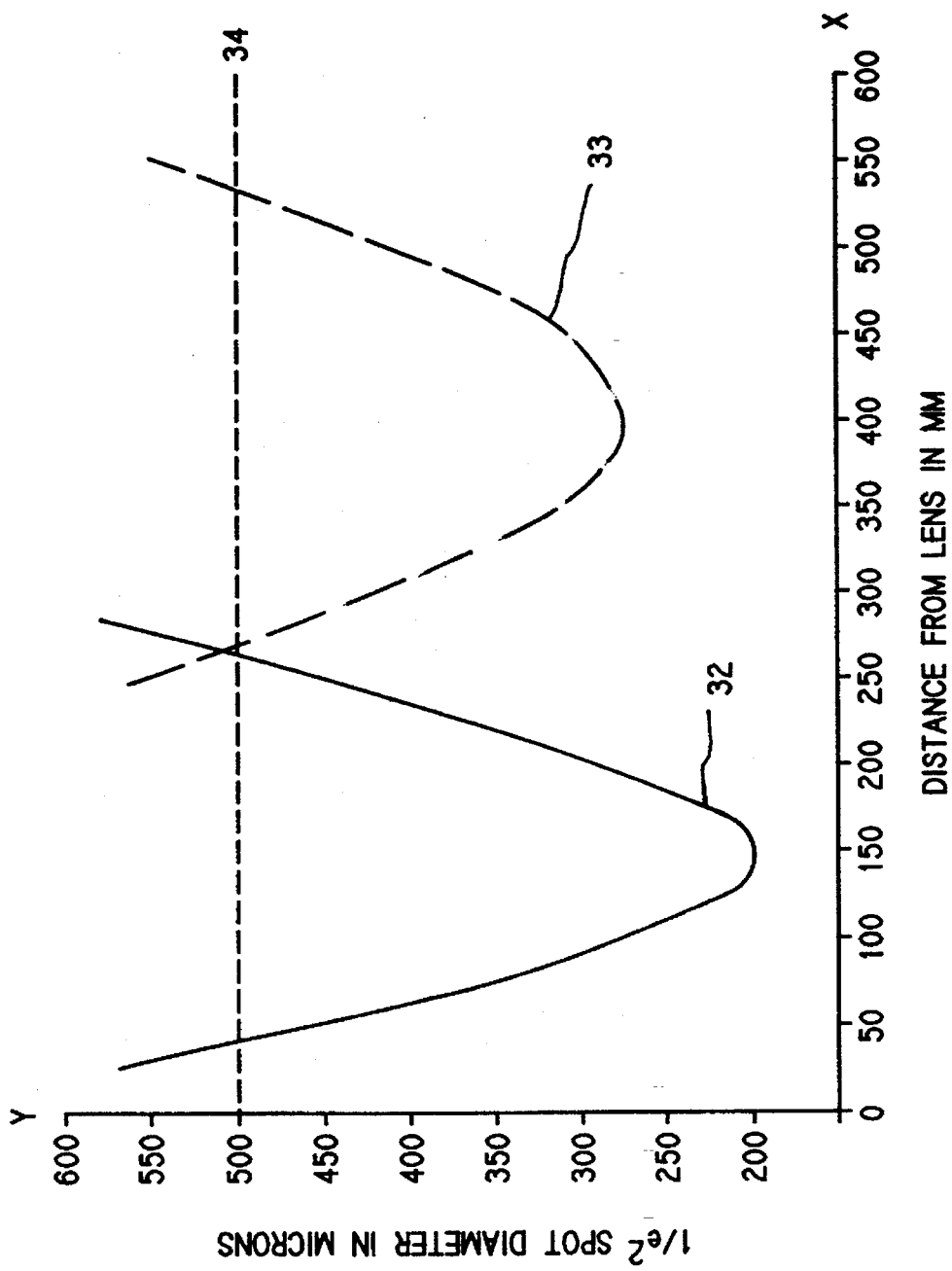

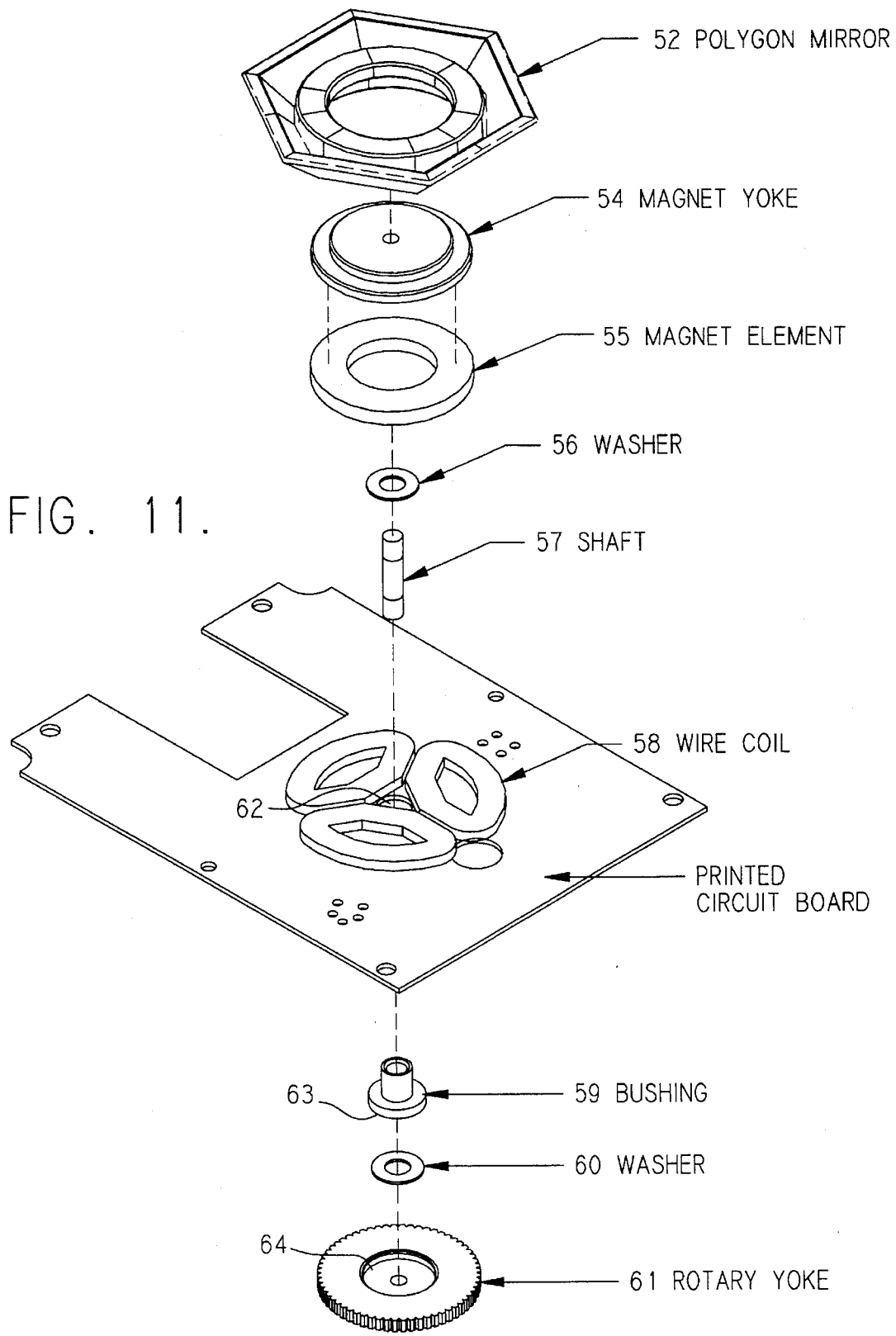

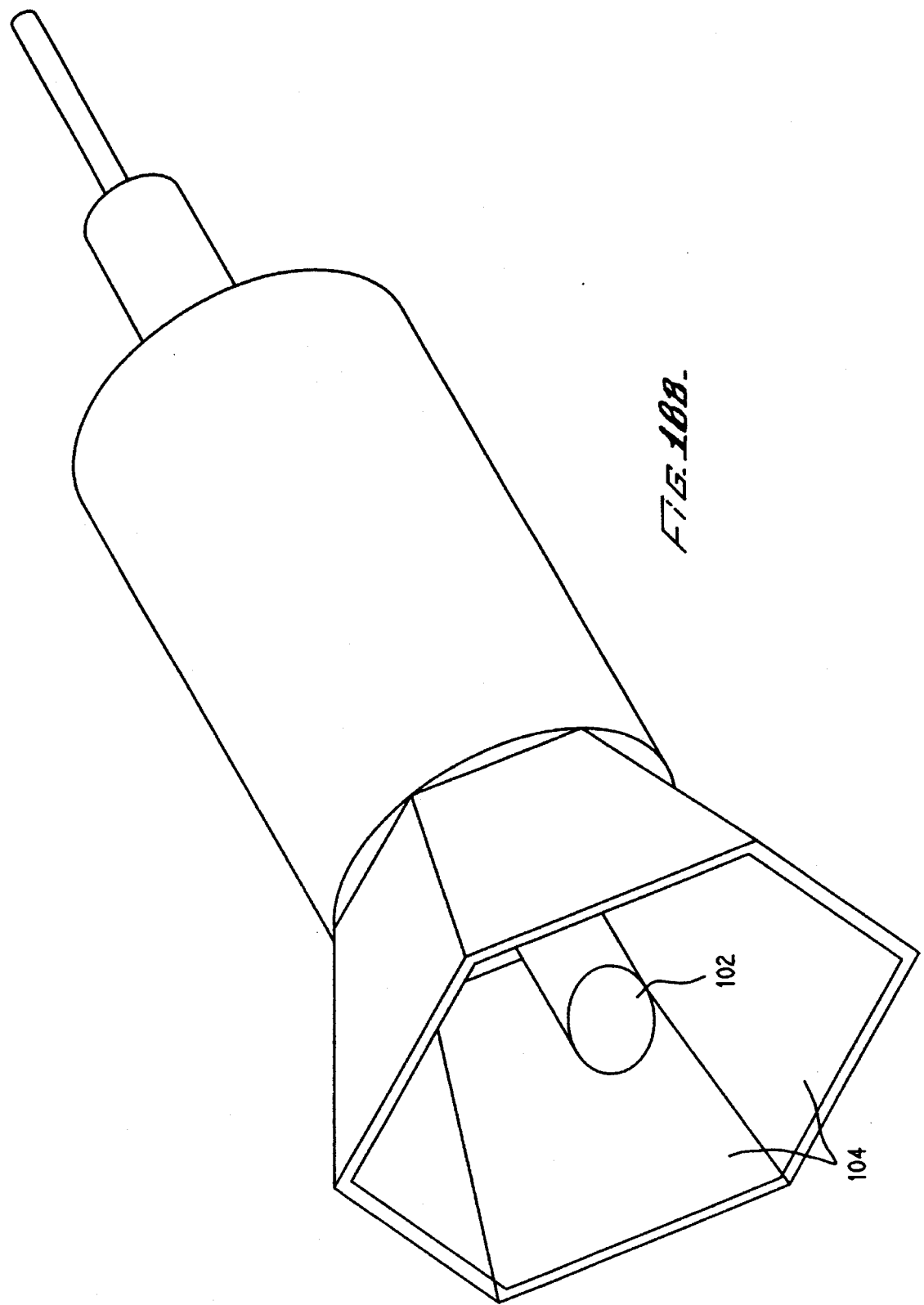

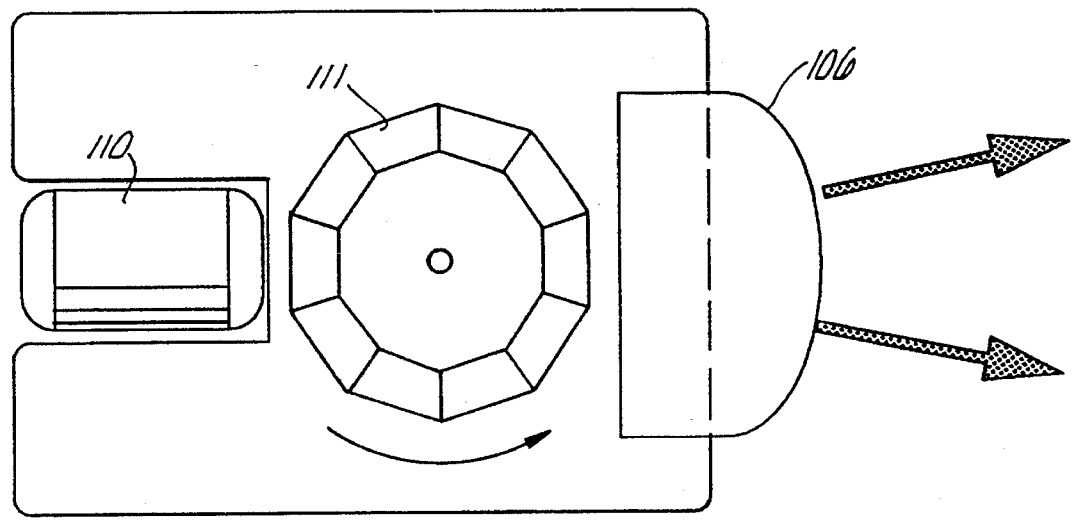
_Fig. 19a_
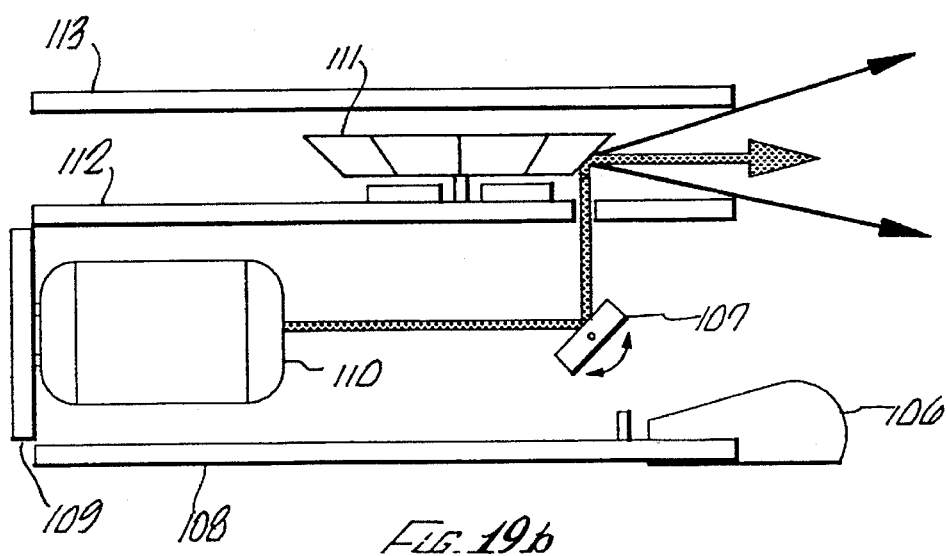
_Fig. 19b_

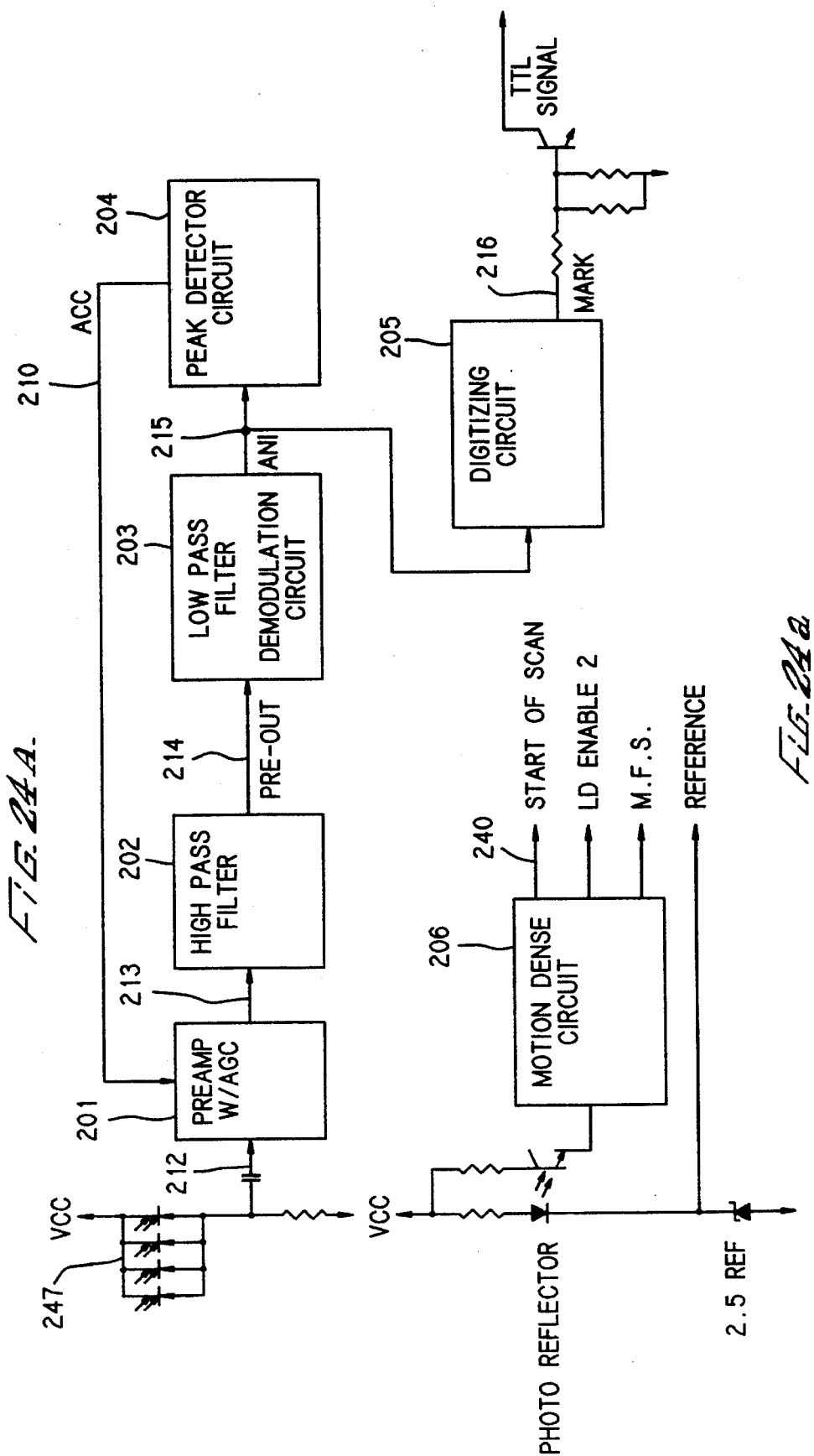

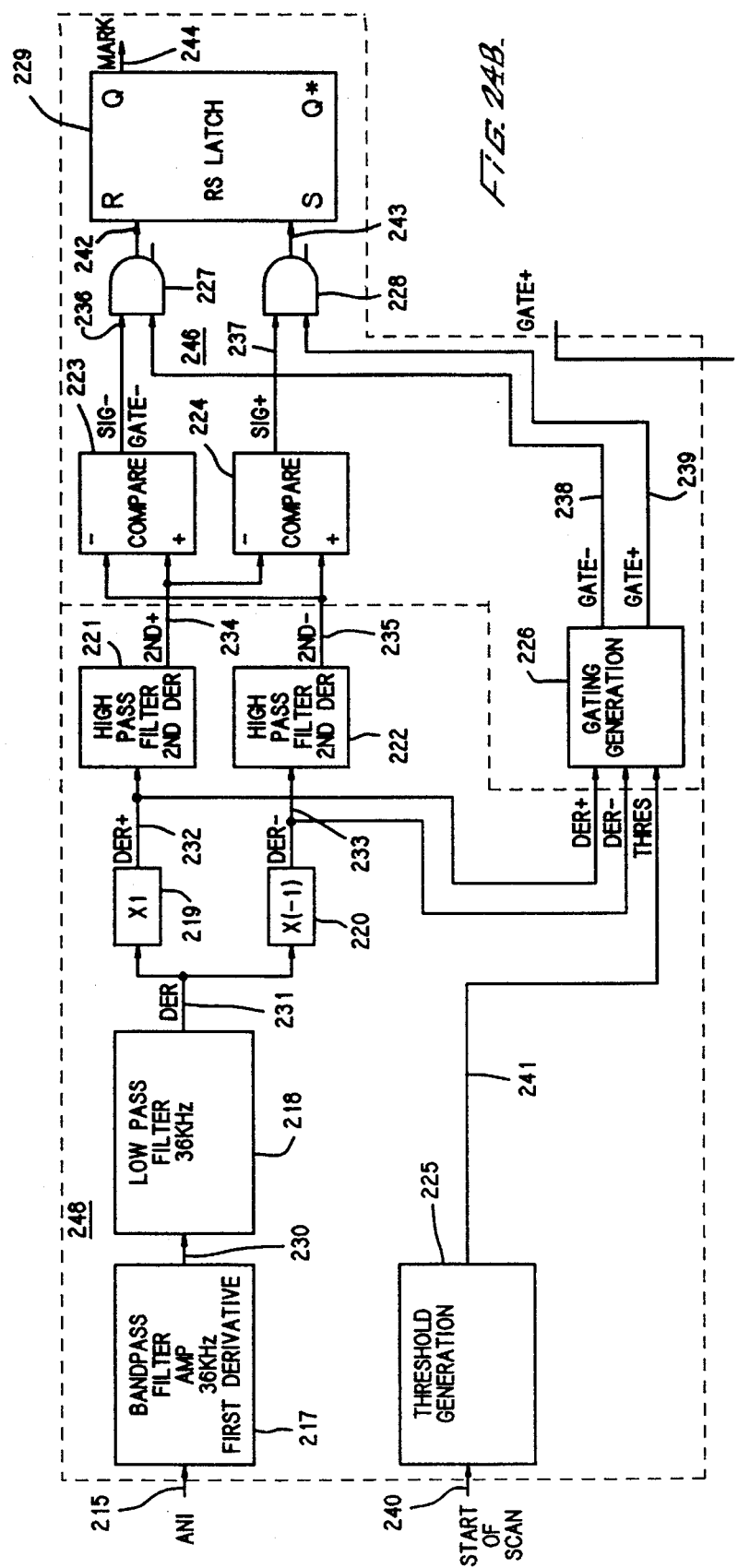

SCANNER ASSEMBLY

This is a continuation of application Ser. No. 07/839,797 filed on Feb. 21, 1992, now abandoned.

BACKGROUND OF THE INVENTION

1. Field of the Invention

This invention relates generally to a laser bar code scanner, and more specifically, to a laser bar scanner which is readily configurable for different applications.

2. Background Information

A laser bar code scanner, or simply scanner, is a device configured for reading bar code symbols by scanning a laser light beam across the symbol, collecting the light reflected from the symbol, producing an analog signal having an amplitude determined by the intensity of the collected light, digitizing the analog signal, and optionally decoding the digitized signal.

In the past, laser bar code scanners configured for different applications have not been capable of sharing many components since each has developed somewhat independently as the requirements for each application have varied quite a bit from one another. Consequently, in the past, the cost of developing a family of scanners configured for many applications has been high, as it was thought necessary to develop a separate and independent product for each of these applications.

Consequently, it is an object of the subject invention to provide a laser bar code scanner which is configurable for multiple applications at a reduced cost of development compared to that required in the past. Additional objects and advantages will be set forth in the description which follows or will be apparent to those of ordinary skill in the art who practice the invention.

SUMMARY OF THE INVENTION

To achieve the foregoing objects, and in accordance with the purpose of the invention as embodied and broadly described herein, there is provided a laser bar code scanner assembly comprising a housing body enclosing, at least partly, an interior, and having a window; a first scan module releasably affixed to the interior of the housing body which projects a laser beam along an optical path through the window to a bar code symbol, scans the beam over the symbol in a predetermined path, collects at least part of the resultant light reflected from the symbol, and produces a digital signal comprising pulses, where the width of and spacing between the pulses corresponds to that of the bars making up the symbol; and a second scan module which is readily interchangeable and plug compatible with the first scan module and which is configured at least partly differently than the first scan module.

BRIEF DESCRIPTION OF THE DRAWINGS

FIGS. 4–6 illustrate a multi-focus lens system;

FIG. 17 illustrates a scan module incorporating a collection mirror which is in line with and behind a separate scanning mirror;

FIGS. 18a–18b illustrate a basket scanner;

FIGS. 19a–19b illustrate a scan module incorporating a polygonal scanning element and an oscillating mirror to generate a two-dimensional scan pattern;

FIG. 22 illustrates a scan module incorporating a grating to generate an aiming beam;

FIG. 23 illustrates a focus error compensation subsystem for incorporation into the subject scan module;

FIGS. 24a–24b illustrate a second derivative base signal processing subsystem;

DESCRIPTION OF THE PREFERRED EMBODIMENTS

Figure 1:
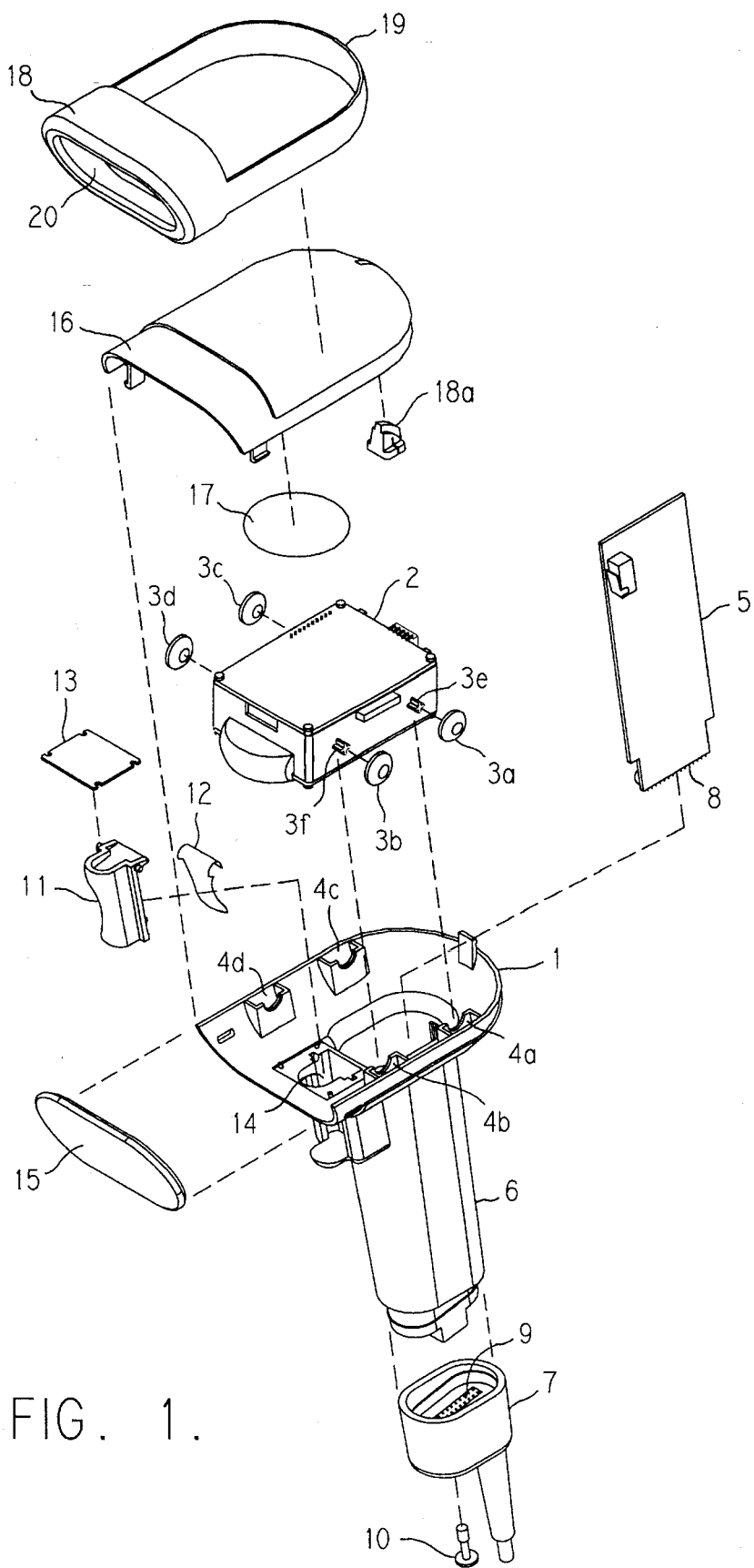
FIG. 1 is an exploded view of a laser bar code scanner incorporating the teachings of the subject invention.
Figure 12:
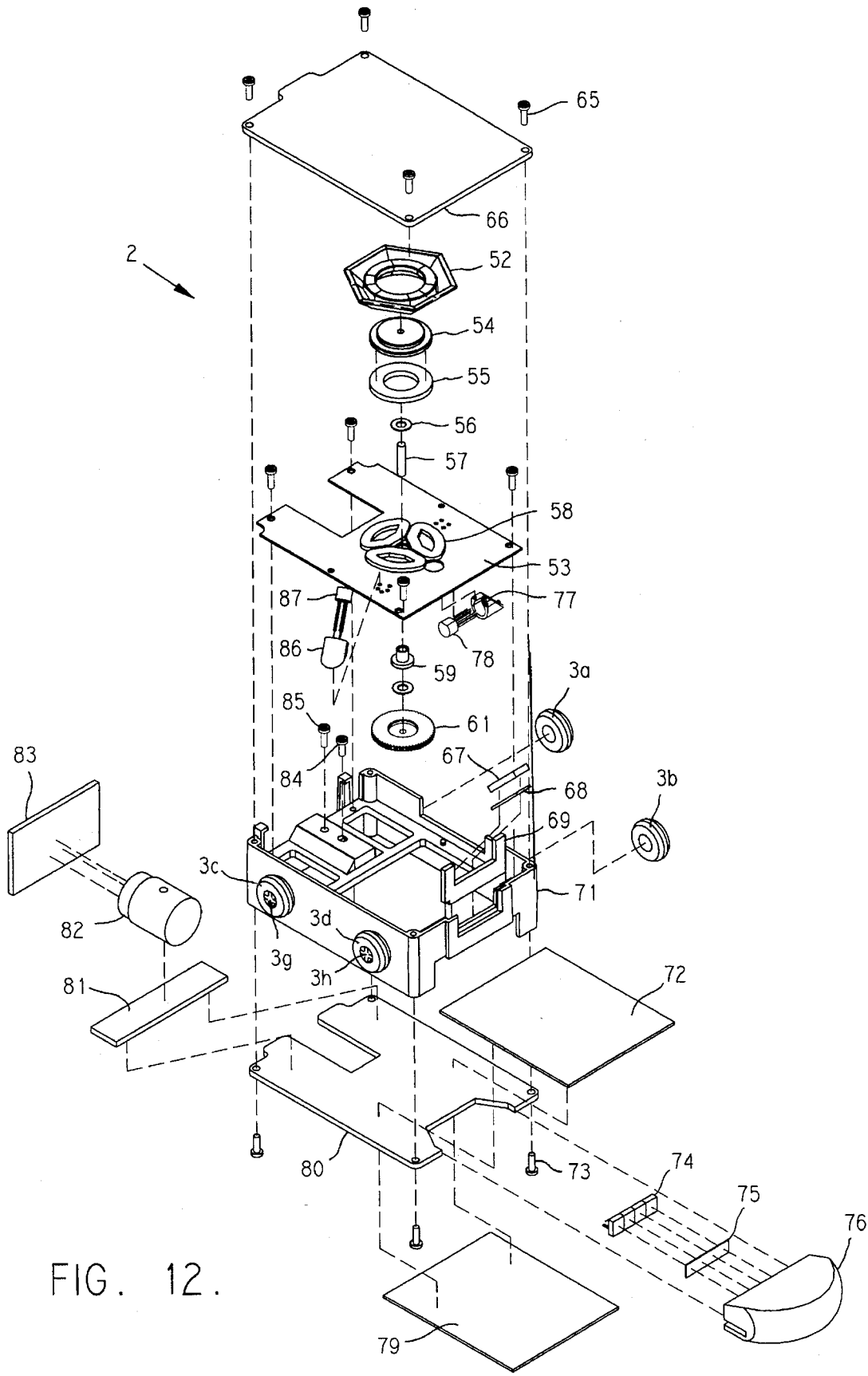
FIGS. 11–12 are exploded views of a scan module incorporating a polygonal scanning element.

An exploded view of a laser bar code scanner incorporating the teachings of the subject invention is illustrated in FIG. 1. As illustrated, the scanner comprises housing body 1 and scan module 2, with scan module 2 releasably affixed to the interior of the housing body by means of shock mounts 3a–3d mounted to the sides of the scan module which fit into corresponding slots 4a–4d which are configured within the interior of the housing body. Each of the shock mounts 3a–3d preferably comprise a donut-shaped element installed on hubs 3e–3f attached to respective sides of the scan module 2. Though not visible in FIG. 1, the hubs 3g, 3h for shock mounts 3c, 3d are shown in FIG. 12 and subsequent figures.

The scanner further comprises digital PCB 5 and end cap subassembly 7 which includes connector 9. The end cap subassembly is releasably mounted to the handle portion 6 of the housing body by means of screw 10 and the digital PCB is releasably mounted within the interior of the handle portion 6 of the housing body by means of connector 9 into which the bottom 8 of the digital PCB plugs. A ribbon cable (not shown) electrically couples the scan module to the digital PCB.

The scanner further comprises trigger 11, spring clip 12, and trigger seal 13. The trigger and spring clip are adapted to fit within recess 14 with trigger seal 12 placed over the top. The spring clip functions to keep the trigger in a normally off position. A switch mechanism (not shown) electrically couples the trigger to the digital PCB.

A piezoelectric buzzer 17, one or more LEDs 19, housing top 16, and housing bumper seal 18 are also provided.

The piezoelectric buzzer 17 is mounted to the underside of the housing top 16 and provides audible feedback to the operator upon the occurrence of certain events, such as the completion of a successful read. Accordingly, the buzzer is electrically coupled to the control PCB, and is activated when one such event has occurred. The volume and tone of the buzzer is programmable.

The one or more LEDs 19 function to provide visual feedback to the operator upon the occurrence of certain events, such as the completion of successful read. As with the buzzer, the LEDs are electrically coupled to the control PCB, and are electrically activated upon the occurrence of these events.

The window 15, when situated in its operative position, is sandwiched between the housing top 16 and the housing body 1. The window functions to provide an outlet for the scanning (and possibly aiming) beam emitted by the scan module.

The housing top and housing body are advantageously configured such that when the housing top is placed in its operative position over the top of the housing body, a groove is formed which extends around the outer periphery of the portion of assembled housing above the handle portion 6.

The housing bumper seal 18 comprises a loop portion 19 and a front portion 20. The loop portion 18a fits into the groove discussed previously, which extends around the outer periphery of the assembled housing, and the front portion 20 fits over the front of the upper portion of the completed housing, while leaving a space for the window. The seal functions to releasably secure the housing top to the housing body with the window sandwiched therebetween.

The operation of the scanning module will now be described. The scanning module projects a laser beam, sometimes called the scanning beam, through the window and to a bar code situated within a predetermined range of distances from the bar code scanner. The module further scans the scanning beam across the symbol and collects at least part of that portion of the beam which is reflected therefrom. The module then forms an analog signal having an amplitude determined at least partly by the intensity of the collected portion of the reflected beam, and digitizes the analog signal by forming a digital signal comprising a plurality of digital pulses, where the widths of and spaces between the pulses correspond to that of the bars in the bar code symbol.

The digitized signal is then passed to the digital PCB which optionally decodes the digitized signal, or else it passes the signal (by means or a cable coupled to the end cap subassembly or by means of RF) to a remote terminal for decoding.

Figure 2:
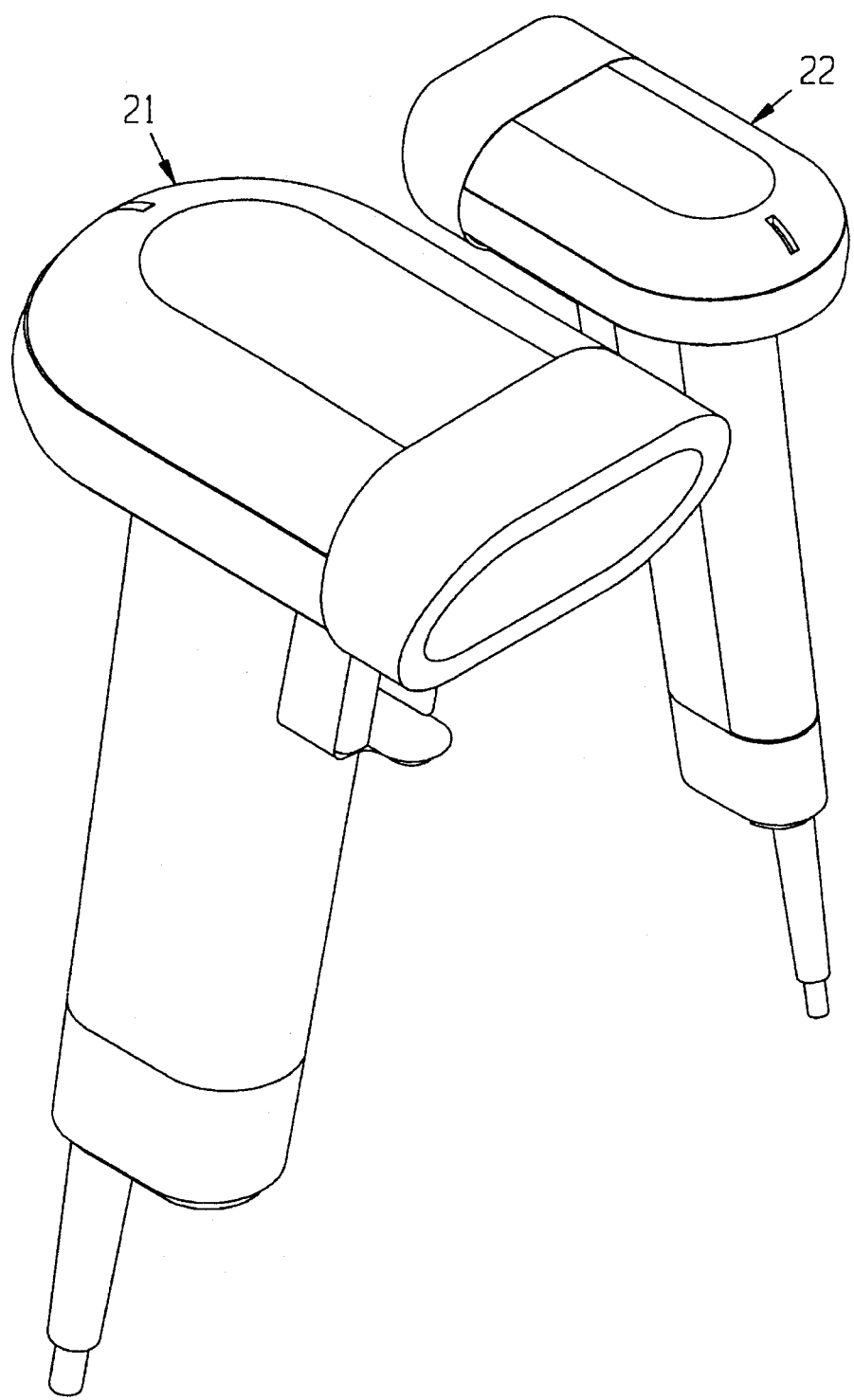
FIG. 2 are views of an assembled laser bar code scanner incorporating the teachings of the subject invention.

The scanner, once assembled, is illustrated in FIG. 2, which shows a front perspective view of the assembled scanner, identified with reference numeral 21, and a rear perspective view of the assembled scanner, identified with reference numeral 22.

It should be appreciated that the scanner described above is modular in a nature, enabling an entire product family to be configurable from the scanner simply by interchanging the scan module with a second module (and possibly also interchanging the digital PCB and end cap subassembly with alternate components), plug compatible with the first, but configured for a different application. For example, as will be discussed, the following products are configurable from the above scanner simply by interchanging scan modules (and possibly also the digital PCB and end cap subassembly) with alternate components:

1. The standard range scanner—Designed to read 40 mil bar codes at distances to 25" or more, this product includes a scan module configured with a visible laser diode, a fixed-focus lens system, an aperture stop within the lens system for beam-shaping a polygon scanning device, a separate collection lens to gather the light reflected from the symbols, photodetectors to convert the gathered light into analog signals, a second derivative signal processing system, and digital hardware options to support connection to customer-specific automatic identification and P.O.S. communication devices. Optionally, this product can be configured for two-dimensional scanning, undecoded data outputs, multiple decoder interfaces, remote communications and batch memory storage. Applications for this device includes P.O.S. terminal communications, bar code verification, and portable as well as fixed general automatic identification uses.

2. Long range scanner—Designed to read 20 mil bar codes at distances to 72" or more, this product includes a scan module configured with a visible laser diode, a multi-focus lens system, a polygon scanning subsystem, a special optical element (a grating) to generate aiming spots at the scan plane (using the same laser light source as that used to generate the scanning beam), a separate collection lens to gather the light reflected from the symbols, photodetectors to convert the gathered light into analog signals, a second derivative signal processing system, plus digital hardware to communicate to a conventional "undecoded" interface of a portable data terminal. Optionally, this product can be configured to include RF communications, batch memory storage, and multiple-interface terminal support, in addition to two-dimensional scanning capabilities.

3. Very long range scanner—Designed to read distances up to 12 feet or more, this product includes a scan module configured with a high-power visible laser diode subsystem, special optics designed to extend the depth-of-field, an oscillating mirror scanning device, a mirror collection optics system, a photodetector to convert the reflected light into an analog signal, second derivative detection with focus error compensation, plus digital hardware to connect and communicate with portable data terminals. In addition, the product will optionally be configured with a modular auto-focus mechanism, RF communications electronics, and batch memory storage.

4. Scan module—This product is simply a scan module standing alone. Variants of this product are advantageously configured for use in the standard range scanner, the long-range scanner, and very long-range scanner described above. Optionally, this product is configured to include on-board digital decoding and data formatting for a variety of data terminals, and remote communications including RF and batch memory. Additionally, this product is optionally configured with the capability of operating either stand-alone, as a plug-in assembly, or completely integrated in a portable data terminal for automatic identification applications.

Figure 3C:
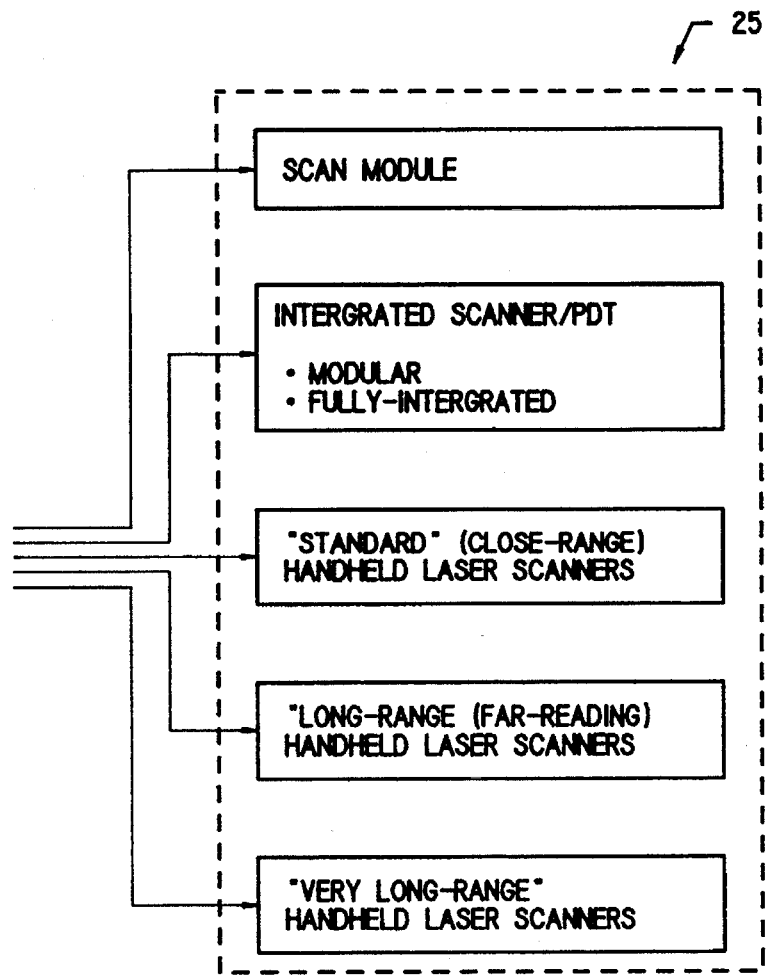
FIGS. 3a–3b are diagrams illustrating the family of configurations possible with a laser bar code scanner incorporating the teachings of the subject invention.
Figure 3:
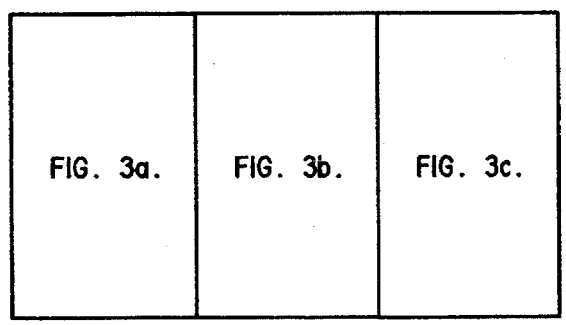
Figure 3A:
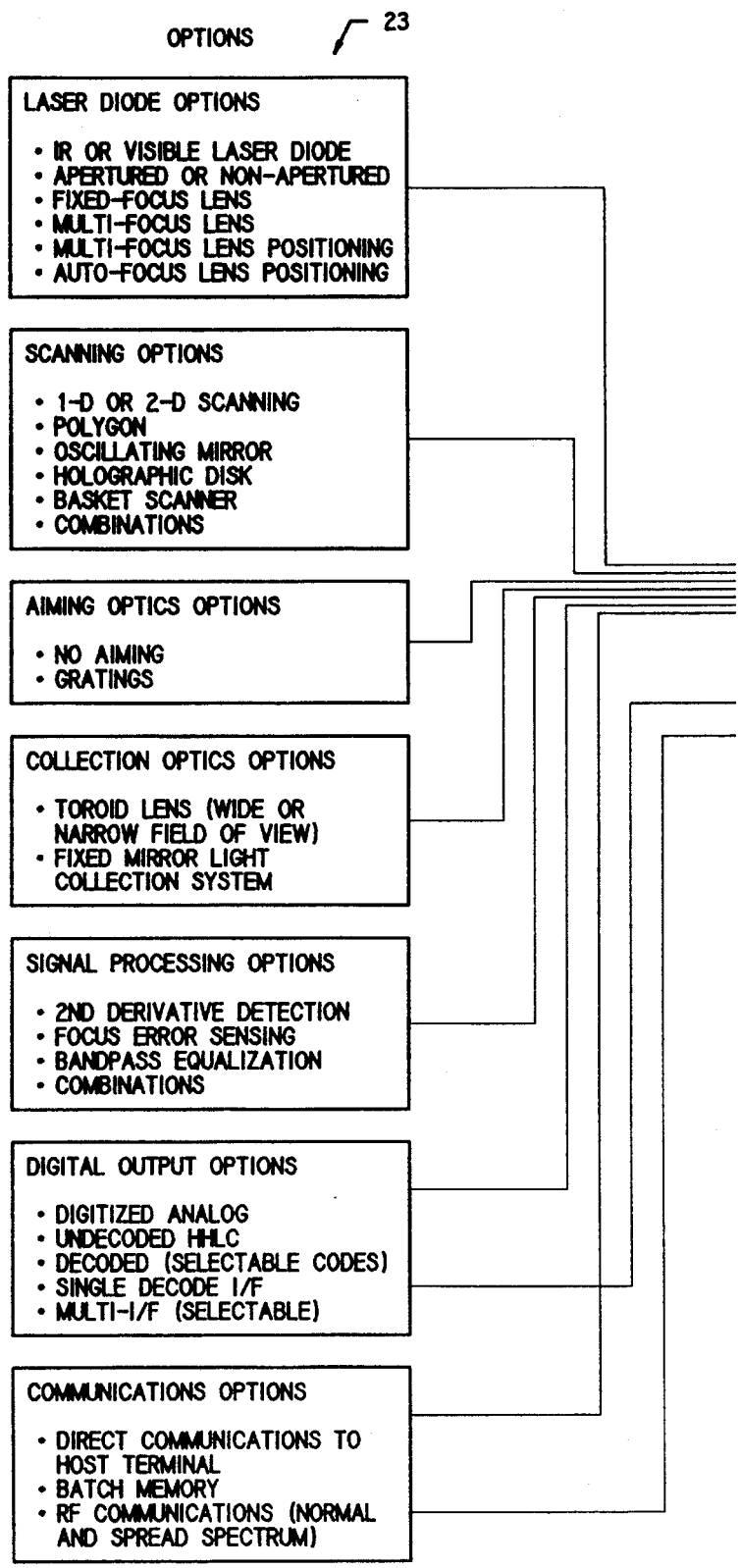
Figure 3B:
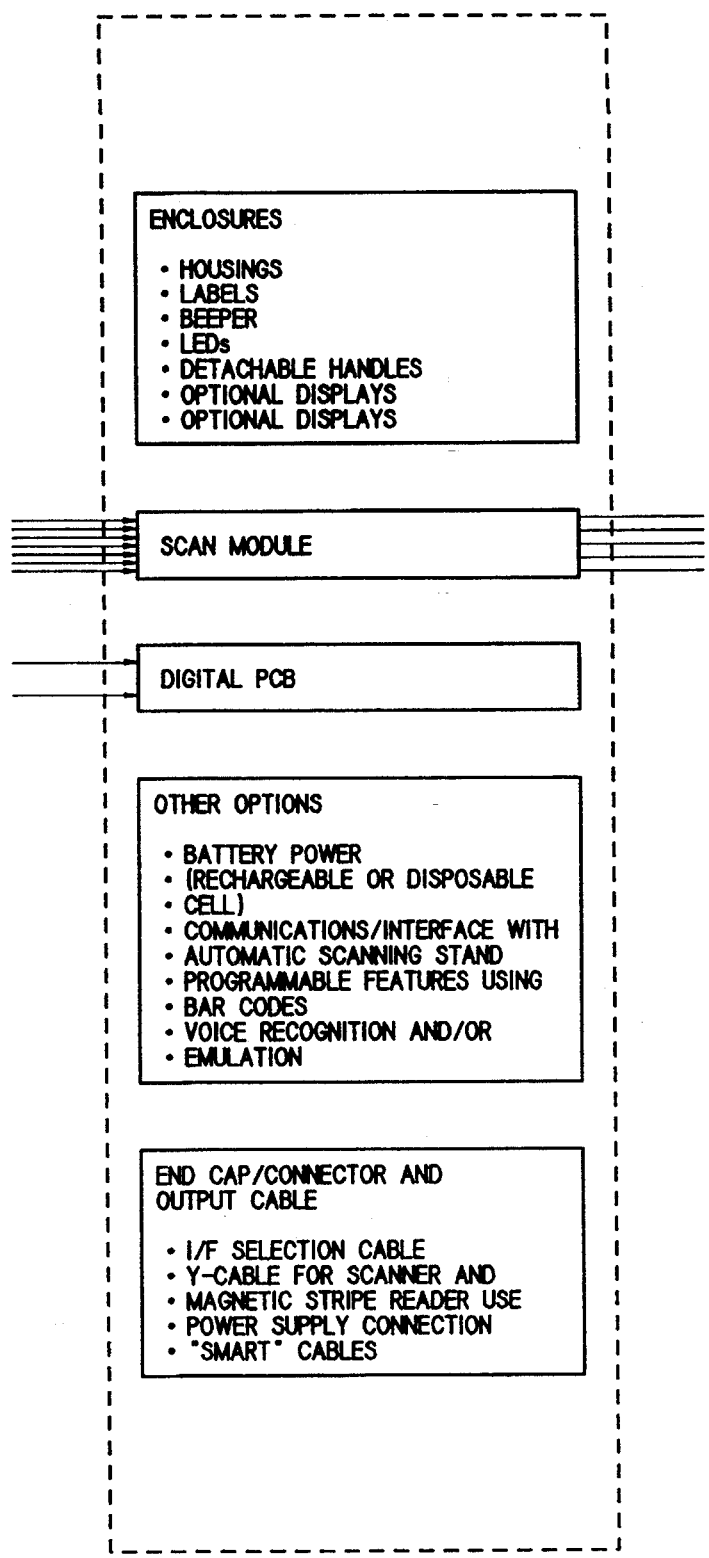
Figure 3B:
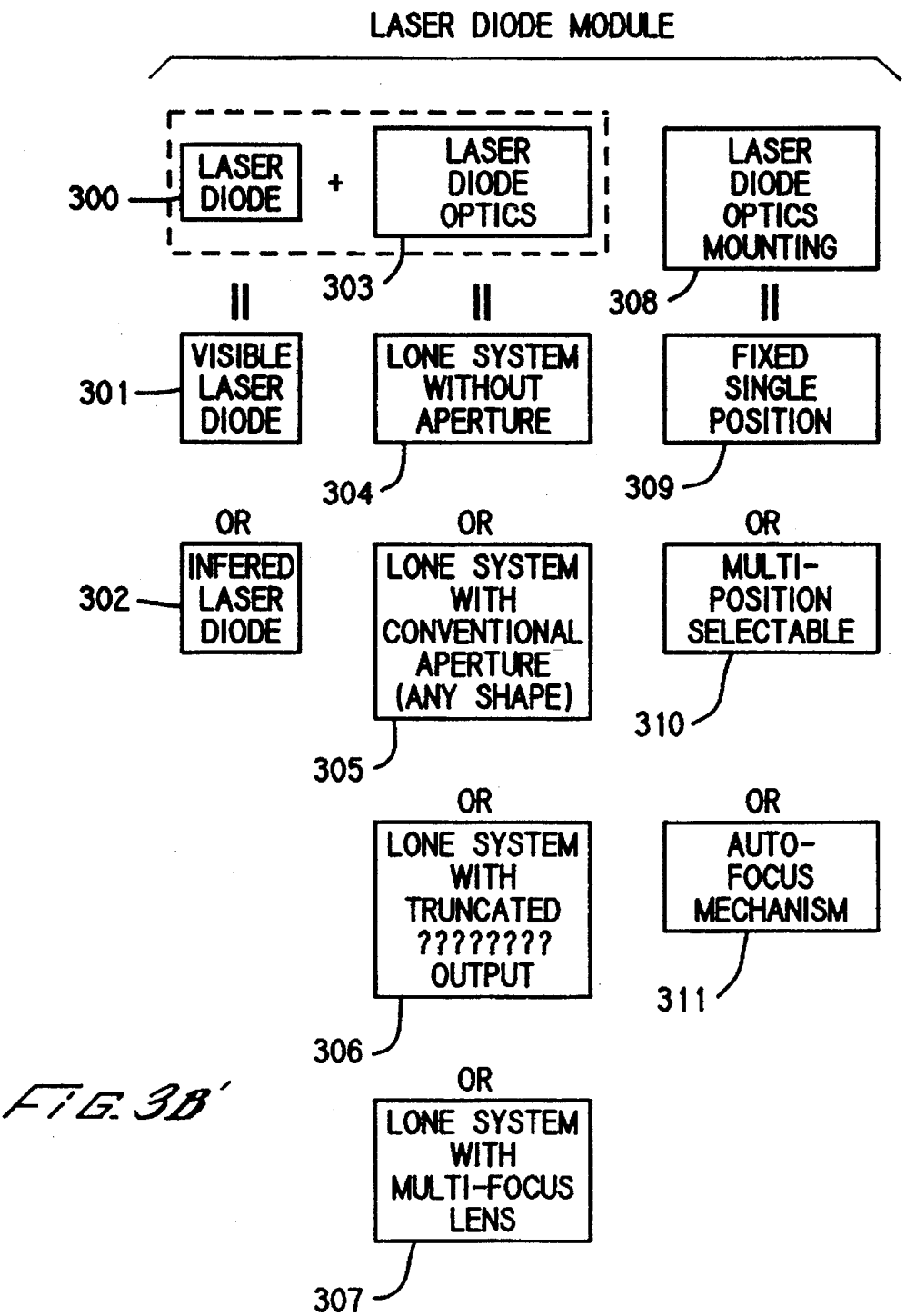

A summary of the products which are possible in this family is provided in FIG. 3a, in which the column of products is identified with reference numeral 25, the column of modules which can be interchanged to produce these products is identified with reference numeral 24, and the column of features which can optionally be incorporated into each module, with reference numeral 23. Each of these products and modules will now be described in more detail.

Scan Module

Turning first to the scan module, the scan module is a self-contained unit including all optical elements, electro-optic components, electronics, software, and mechanical support structures to perform a minimum of the following functions:

Light generation from a laser diode and associated driver electronics

Laser diode beam shaping using lenses and apertures to meet specific customer requirements Scanning of the laser beam so as to run across the bar codes to be read, in both one-dimensional as well as two-dimensional patterns Collecting light from the scanning beam which has been reflected from and/or scattered by the bar code label being read, using lenses and mirror structures that are positioned either in-line or off-axis from the main scanning beam Conversion of the collected light energy into an analog output signal Electrical processing of the output analog signal In addition, the scan module advantageously includes the following additional functions:

Conversion of the analog signal to a digitized representation of the bar code scanned Forming one or more "aiming beams," to make it easier to see the scanning beam on the bar code Electronic processing of the digitized representation of the bar code signal Formatting of the digitized representation of the bar code signal into "undecoded" or "wand emulation" interface outputs Optional decoding of the digitized representation of the bar code signal, to convert the bar and space information into an alphanumeric data stream Optional conversion of the decoded data stream into various data communications formats Optional storage of the decoded and/or formatted information in memory prior to communication to external terminals Optional capability for batch storage and subsequent downloading of the stored data, on demand, to remote data terminals; this function also includes allowance for various methods of automatically and manually "clearing" the stored memory The scan module comprises a laser diode subsystem, a scanning subsystem, optional aiming optics, a collection subsystem, and a signal processing subsystem, where each of these subsystems is releasably affixed to at least one optical chassis, and at least one is interchangeable and plug compatible with a second subsystem configured for a different application.

Figure 7:
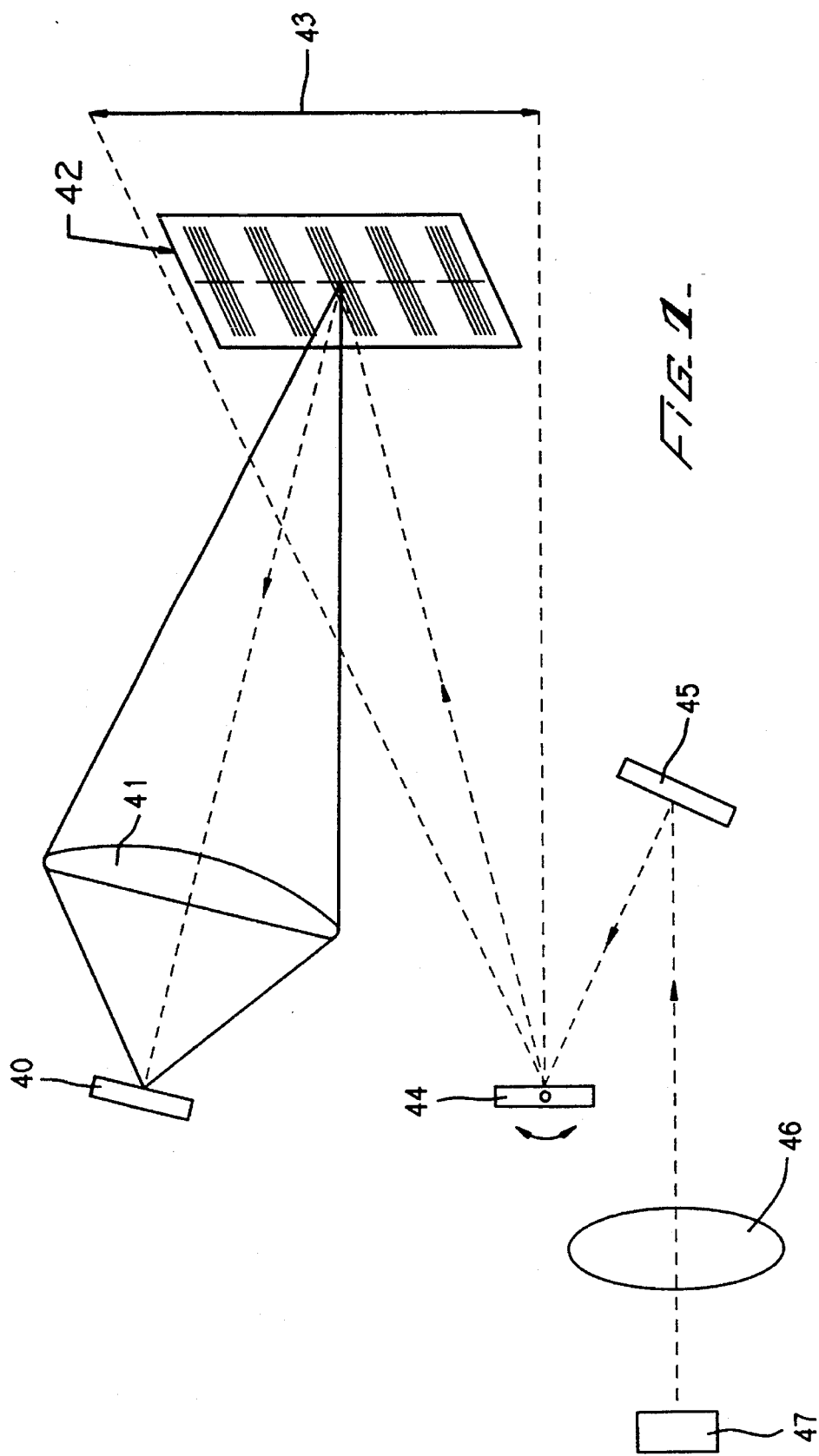
FIG. 7 is a functional diagram of the scan module.

Turning to FIG. 7, this figure illustrates the relationship between the subsystems. With reference to this figure, a laser beam is emitted by the laser diode 47, and then shaped and focussed by laser diode optics 46. The laser diode and laser diode optics make up the laser diode subsystem. The beam is then deflected by folding mirror 45 to scanning mirror 44 which oscillates and rotates appropriately so that the laser beam is scanned across the bar code 42 in a predetermined pattern. The laser beam in the plane of the bar code 42 is the scanning beam 43. The folding mirror and scanning mirror together make up the scanning subsystem.

At least a portion of the scanning beam will be reflected off the bar code 42, and collected by collecting lens 41, which directs the collected light to photodetectors 40. The photodetectors convert the collected light to an analog signal where the amplitude of the signal is determined at least partly by the intensity of the collected light. The collecting lens and photodiodes make up the collection subsystem. The signal processing subsystem (not shown) converts the analog into a digital signal.

Turning first to the laser diode subsystem, this subsystem comprises a laser diode, and laser diode optics. The laser diode used in the subsystem is advantageously either a visible or infrared laser diode, gain-guided, index-guided, and multiple quantum-well laser diodes.

The diode is advantageously driven in a continuous "constant power" manner, or modulated between power levels, depending on the specific application. It is advantageously maintained at a given output power level using a closed-loop feedback circuit based on power detected from a monitor photodiode in the laser diode housing or a separate photodiode.

The laser diode optics includes a focusing lens system with one or more of the following lens types, depending on the application:

Spherically symmetric glass or plastic lenses

Aspheric glass or plastic lenses, rotationally symmetric as well as non-rotationally symmetric around the optical axis; this can include cylindrical optical elements as well Lens systems where the lens diameter itself acts as a functional aperture stop for the system Holographic optical elements, including but not restricted to Fresnel "zone plate" optics.

These elements are advantageously selected so that, when aligned with respect to the laser diode, focussing is achieved to provide a properly shaped and sized spot at a given distance from the lens opening. This focal distance (or collimation), beam shape, and size, will vary depending on the application.

Some of these application will include:

Standard range scanners

Long range or very long range scanners

High density readers (which require smaller spots than conventional scanners)

High visibility readers (which require higher brightness for a given application, and therefore require smaller spots, improved optical systems efficiency, and different laser diodes (with different optical wavefront characteristics) to implement.

The laser diode optics may include physical apertures of various types to provide further shaping and sizing of the output wavefront, depending on the application. For long range scanning needs (where 40 mil labels need to be read at distances of up to six feet or further away from the scanner), conventional optical approaches may not be sufficient to extend the scanner depth-of-field to cover a given required read range. In this case, a multi-focus lens will be used instead of a conventional "single focus" lens system. The following paragraphs describe how such a lens system operates.

Multi-Focus Lens System

A multi-focus lens is illustrated in FIG. 4. A laser diode is identified with reference numeral 26, and the multi-focus lens with reference numeral 29. As illustrated, the multi-focus lens 29 has a center section 30 and an outer annulus 31. The center section 30 is designed to bring the laser beam to focus at the location identified with reference numeral 27, and the outer annulus 31 is designed to bring the laser beam to focus at the location identified with reference numeral 28.

The effect of having the two foci can be illustrated using FIG. 5. The curve identified with reference numeral 32 defines a "beam propagation" profile for a conventional optical system in a scanner, in which the laser beam is focussed to a nominal minimum diameter, in this case 200 microns, where that diameter is measured at the points at which the laser beam intensity is $1/e^2$ as large as it is at its center. (This is what is meant by the "$1/e^2$ spot diameter in microns" label on the y-axis of the graph.) That minimum beam diameter is achieved at a distance of 150 mm from the optical system. As the beam propagates on either side of the minimum diameter position, the beam diameter expands in size according to the laws of diffraction theory and the limitations of the optical system utilized.

It should be appreciated that there is a general relationship between the minimum size of the bars that can be properly resolved by a laser bar code scanner and the beam diameter achievable with that scanner. It has been found that the minimum bar size that can be successfully read should be more than 1.4× as large as the $1/e^2$ spot diameter at the plane of the bars. Therefore, if a given customer application requires that the scanner resolve a minimum bar width of 14 mils throughout a scanning region from 50 mm from the lens to over 500 mm from the lens, then a maximum spot diameter that could resolve this bar width would be 14 mils×1.4, or 19.6 mils (497 microns). Turning to FIG. 5, the line drawn at approximately 500 microns, identified with reference numeral 34, represents the maximum spot size that can be achieved by the optical system discussed previously. As seen, this line limits the depth-of-field achievable for that optical system to a minimum read distance of 50 mm, and a maximum of just over 250 mm for the successful reading of 14 mm bars. Therefore, with this conventional optical system, a depth-of-field of 500 mm cannot be achieved. To extend the achievable depth-of-field to a larger depth-of-field, the multi-lens system of FIG. 4 can be used. To explain how this occurs, suppose that the curve identified by numeral 32 is the propagation profile of a beam focussed by center portion 30 of the lens of FIG. 4, and that the curve identified by reference numeral 33 is the propagation profile of the peripheral portion 31 of the lens of FIG. 4, so that the focal length of the center portion, identified with numeral 27 in FIG. 4, is assumed to be 150 mm, while the focal length of the peripheral portion, identified with numeral 28 in FIG. 4 is assumed to be 400 mm. As is seen, the depth-of-field has been increased from 250 mm to about 500 mm by virtue of the multi-lens system.

It should be appreciated that the size of the beam focused by the center peripheral portion is large at the location (identified with numeral 27) where the light focused by the center portion achieves a minimum diameter, while the beam focused by the center portion is large at the location (identified with numeral 28) where the light focused by the peripheral portion achieves a minimum diameter. The result is that, with proper attention to phase characteristics of the beams focused from each section of the multi-lens, the multi-lens should produce only a "carrier" noise signal when the laser light is being collected during bar code scanning. This carrier is easily filtered during signal processing.

Figure 6:
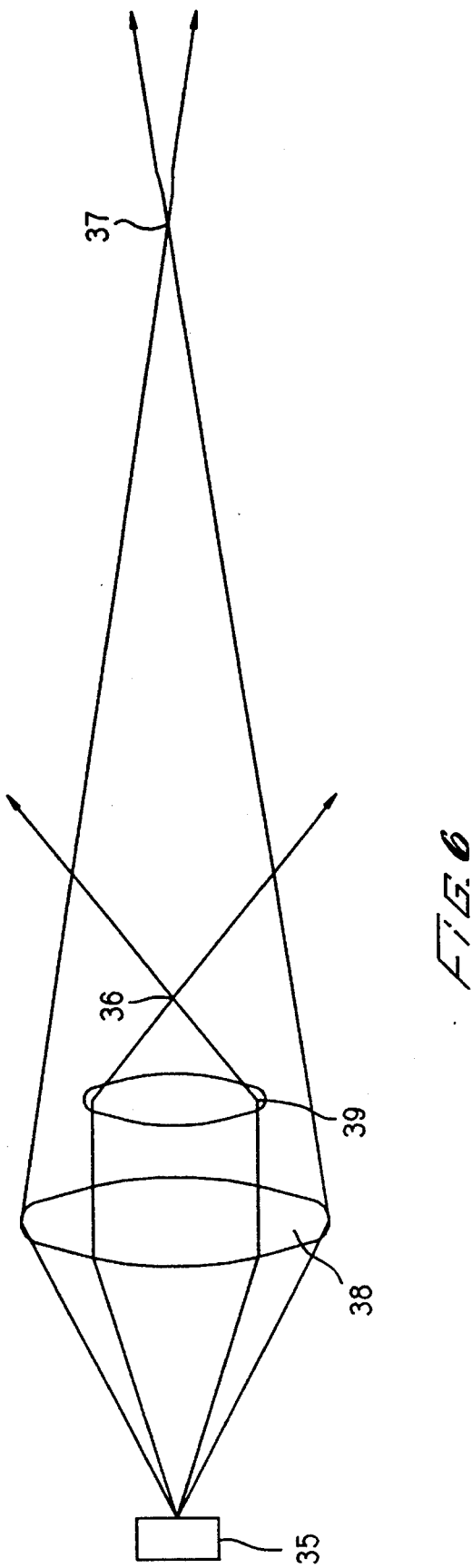

An alternate embodiment of the multi-lens system is shown in FIG. 6 in which the beam from laser diode 35 is focused to two focal points, identified with numerals 36 and 37, by means of an optical system comprising two spaced lenses, identified with numerals 38 and 39. Specifically, lens 39 functions to focus the beam to point 36, while the center periphery of lens 38 functions to focus the beam to point 37.

Additional detail with respect to the multi-lens system is obtainable from co-pending U.S. application Ser. No. 07/786,121, Reddersen, filed Nov. 1, 1991, and entitled "MULTIPLE FOCUS LENS SYSTEM FOR DATA READING APPLICATIONS," which is hereby fully incorporated by reference herein as though set forth in full.

For very long range applications (up to 12 feet or more), in addition to using a multi-lens system as described above, it may be necessary to physically move the optical components in the optical path between the laser diode and the bar code plane to extend the depth-in-field in the scanner. To accomplish this objective, the laser diode optics (and apertures, if any) in the scan module should be configured to be movable by the required amount to one of at least two predetermined positions along the optical axis with respect to the laser diode. In an alternate embodiment, the laser diode optics are automatically movable based on feedback from a bar code "focus error sensing subsystem" (described in more detail below) to achieve an auto-focus lens system. The effect in both embodiments is to provide multiple focal points and/or multiple beam diameters to extend the depth-in-field of the system.

Scanning Subsystem

Turning to the scanning subsystem, as will be discussed in more detail, scanning subsystems are possible that will enable the scan module to be capable of reading everything from single-line bar codes to the most complex of multi-line and high-density codes (such as Code 49, Code 16K, and PDF 417), as well as provide the following capabilities:

Single-line scanning

Figure 8:
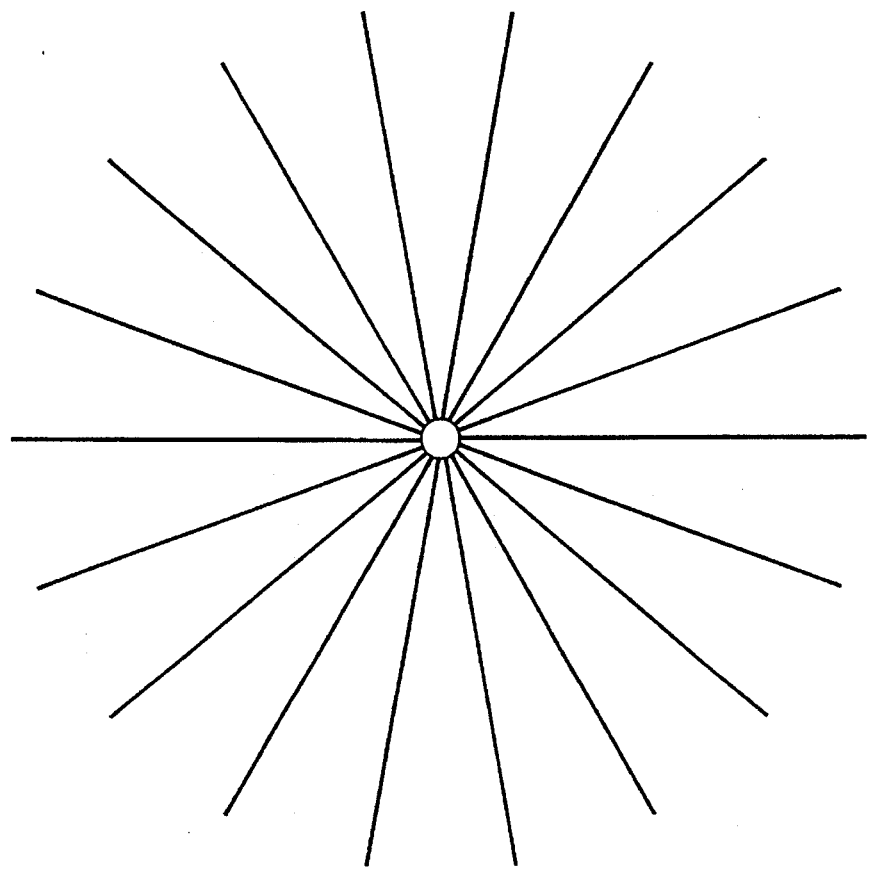
FIGS. 8–9 are scan patterns.

Multi-line raster scanning (as illustrated in FIG. 8)

Figure 9:
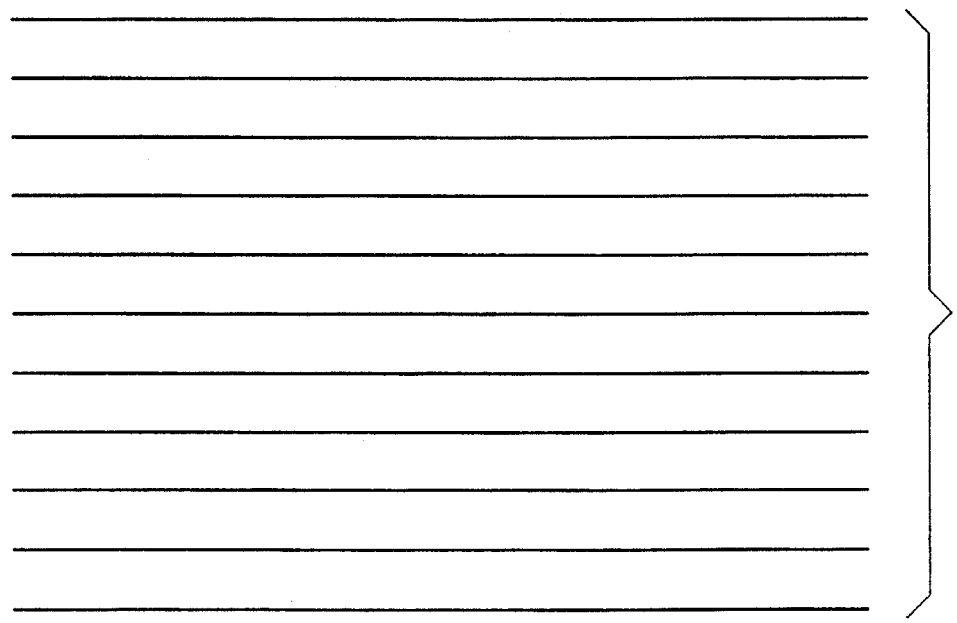

More complex multi-line scanning, including an asterisk type of pattern (as illustrated in FIG. 9) a rosette pattern, and other two-dimensional scanning patterns Two-dimensional bar code scanning to support reading of the newer stacked codes and PDF 417

Polygonal Scanning

Figure 10A:
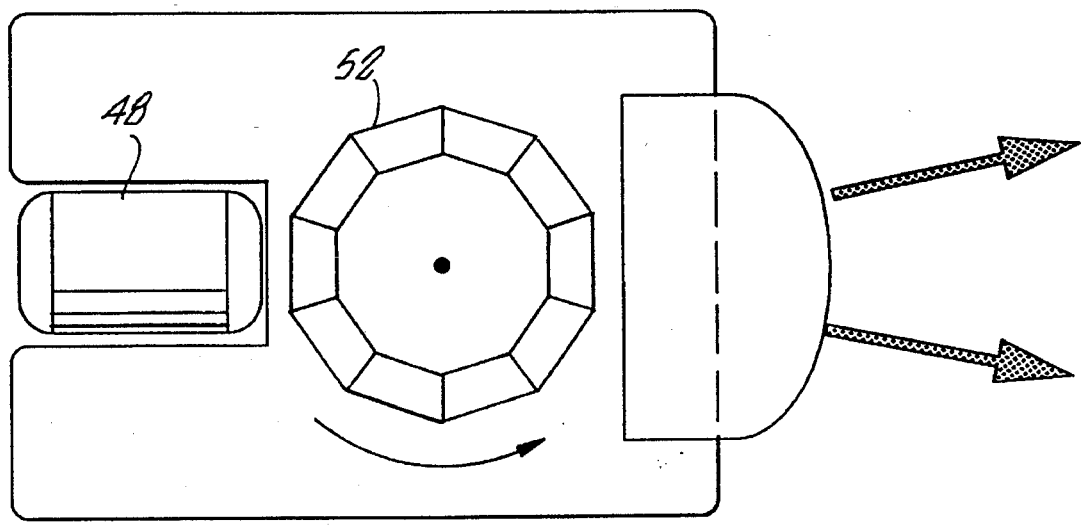
FIGS. 10a–10b are diagrams of a scan module incorporating a polygonal scanning element.
Figure 10B:
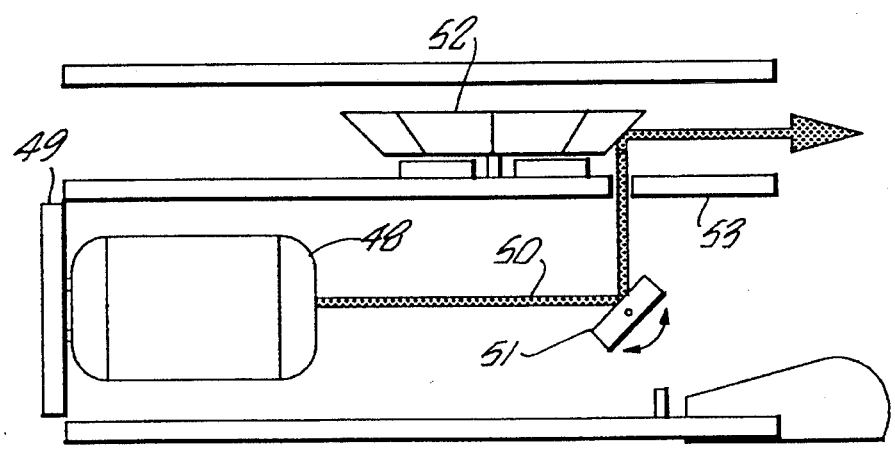

A basic option for the scanning subsystem is polygonal scanning, called as such since the scanning element is a multi-faceted polygon. A scan module incorporating a polygonal scanning element is illustrated in FIGS. 10a–10b, with FIG. 10a being a top view, and with FIG. 10b being a bottom view. As shown, laser diode subsystem 48 produces beam 50 which is directed to fold mirror 51, which in turn directs the beam to polygonal scanning element 52 (referenced to hereafter as simply polygon) through a hole in the motor PCB 53. The polygon rotates in the plane of scanning (shown in FIG. 10a) and causes the beam to repeatedly scan the bar code in a single line after it exits the scan module.

Note that although the polygon comprises facets cut at an angle of approximately 45° with respect to the scan plane, it should be appreciated that other polygonal shapes are possible, such as a polygon where the polygon facets are cut at 90° with respect to the scan plane. Such a polygon could be advantageously used to form a more compact scan module. In this case, however, the laser diode subsystem and fold mirror would have to be set up in the same plane as the polygon.

Figure 11:
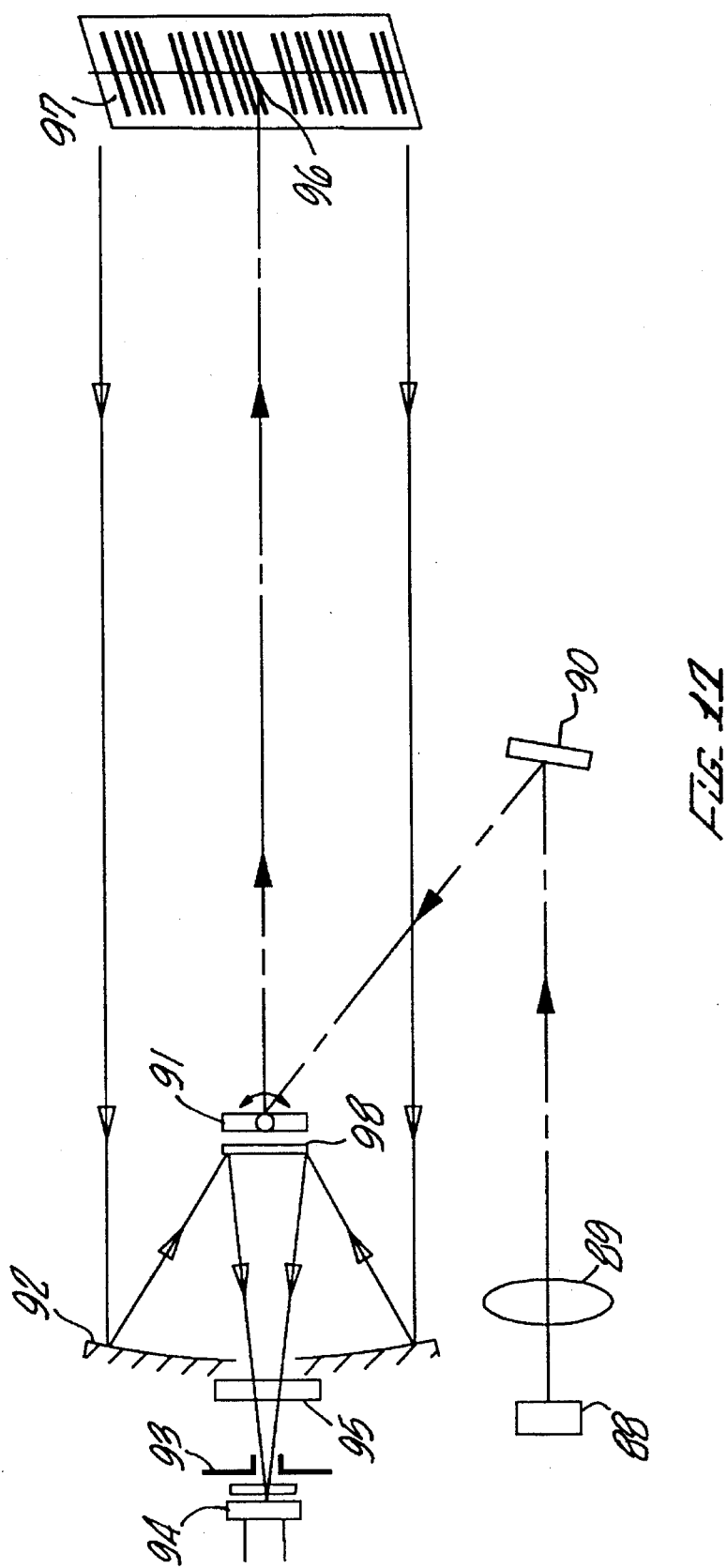

A special compact motor used to rotate the polygon will now be described. This motor is illustrated in FIG. 11. As illustrated, the motor is a DC brushless motor comprising a magnet yoke 54 which is mounted inside the polygon 52. Magnet 55 is affixed to the magnet yoke 54 to form a segmented magnet which is mechanically coupled to a proximate end of motor shaft 57. Motor PCB 53 is also provided, and the three wire coils 58 of the motor are mounted directly on the motor PCB.

The distal end of the motor shaft is placed through a hole 62 in the motor PCB with washer 56 placed over the motor shaft to space the bottom of the segmented magnet from the top of the motor PCB.

A bushing 59 is soldered to the bottom of the motor PCB, and the distal end of the motor shaft 57 fits into the bushing. A rotary yoke 61 is situated underneath the motor PCB, and the bottom 63 of the bushing fits into indentation 64 in the rotary yoke, with washer 60 interposed therebetween to space the bottom of the bushing from the top surface of the rotary yoke.

Electrical current supplied to the coils will provide the rotational drive magnetic field for the motor.

It should be appreciated that a novel and beneficial aspect of the subject motor is the integration of magnet yoke 54 and magnet 55 with polygon facet wheel 52 as this results in a more shallow (at least ¼" or more) scan module compared to prior art scanners in which the scanning mirror was not integrated with the motor, but instead mounted on the shaft of a self-contained motor. Advantageously, the subject scan module has a length of 2.82 in., a width of 2.2 in., a height of 0.85 in., and a volume of less than 5.10 cubic in.

Another novel and beneficial aspect of the subject motor is the direct mounting of the coils and bushing on the motor PCB, since this further results in a more shallow scanning subassembly.

A third novel and beneficial aspect of the subject motor is the use of a thin motor PCB board (approximately 20 mils. thick), which allows better magnetic coupling between magnet yoke 54 and rotary yoke 61, and which further allows a more shallow scanner subassembly.

Figure 29A:
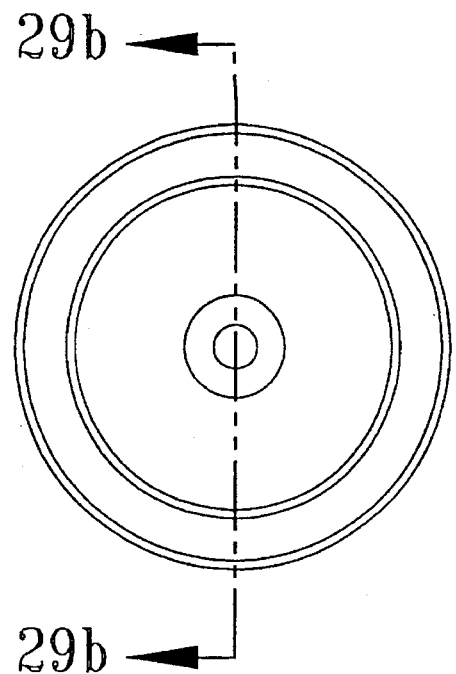
FIGS. 29a–29b illustrate a magnetic yoke configured for use in the scan module of the subject invention.
Figure 29B:
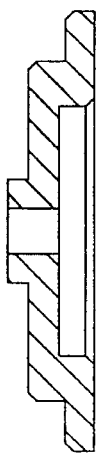
Figure 30A:
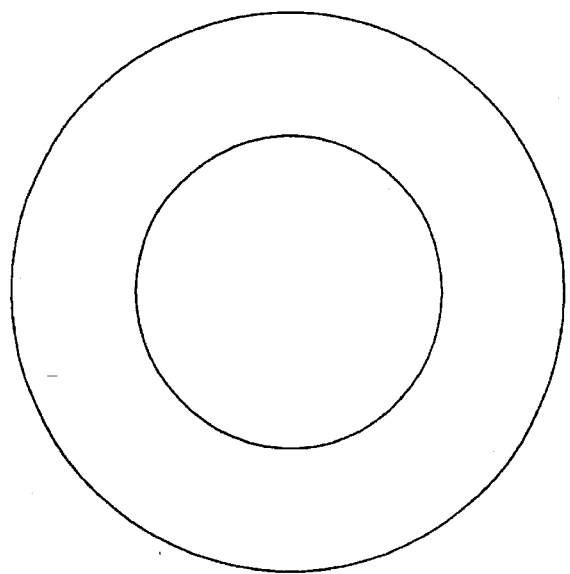
FIGS. 30a–30b illustrate a magnet configured for use in the scan module of the subject invention.
Figure 30B:
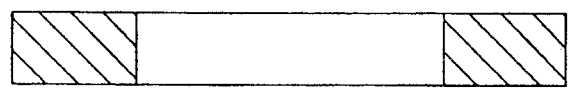
Figure 32A:
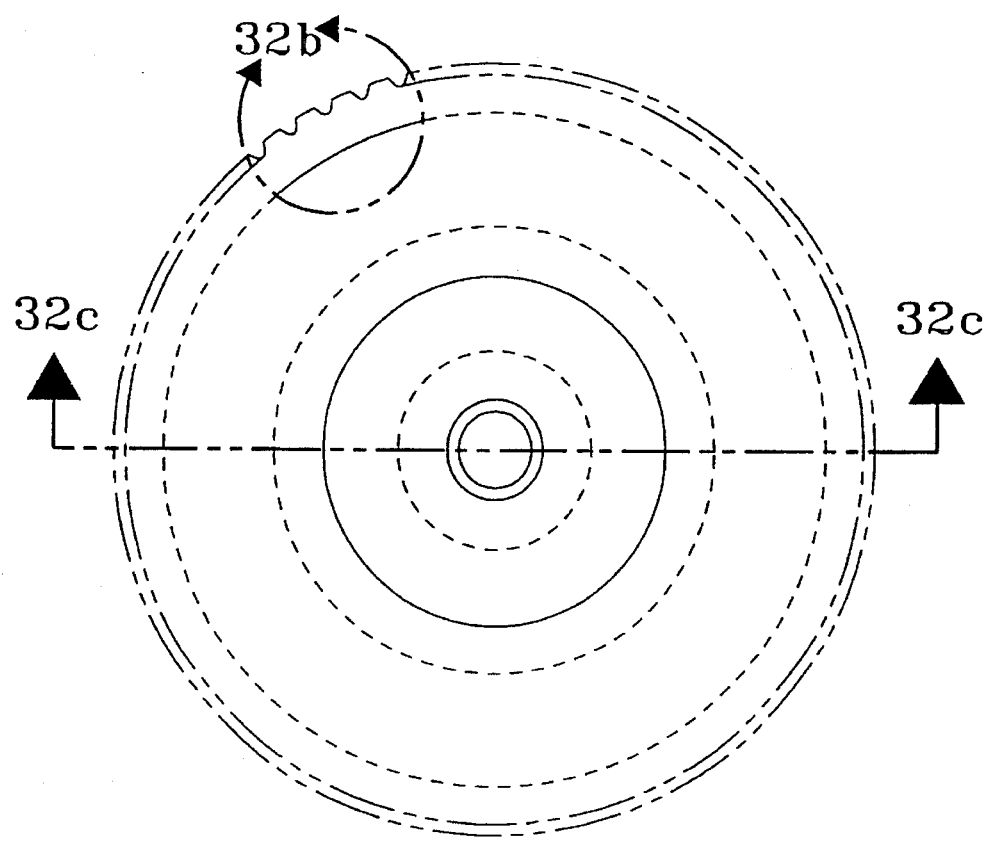
FIGS. 32a–32c illustrate a rotary yoke configured for use in the scan module of the subject invention.
Figure 32B:
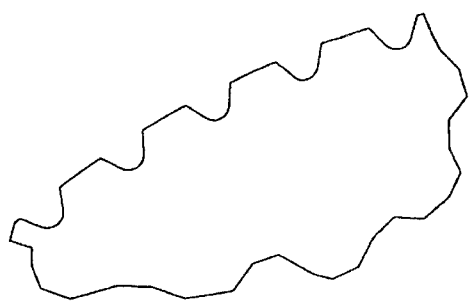
Figure 32C:
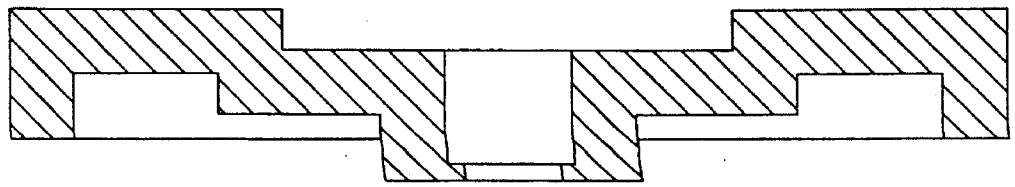
Figure 33A:
FIGS. 33a–33b illustrate a motor shaft configured for use in the scan module of the subject invention.
Figure 33B:
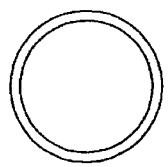
Figure 34A:
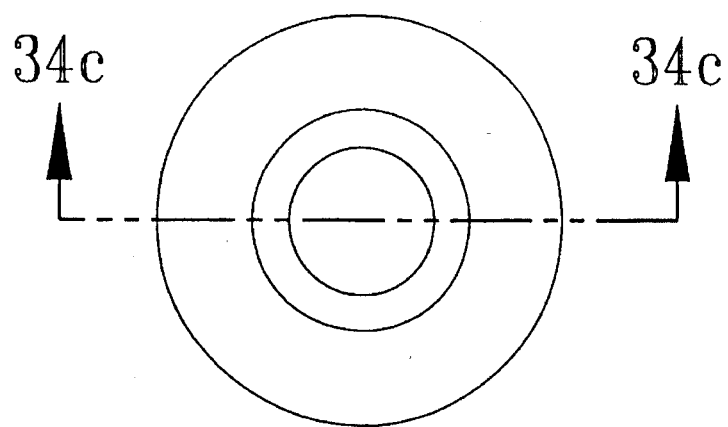
FIGS. 34a–34c illustrate a bushing configured for use in the scan module of the subject invention.
Figure 34B:
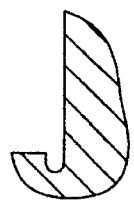
Figure 34C:
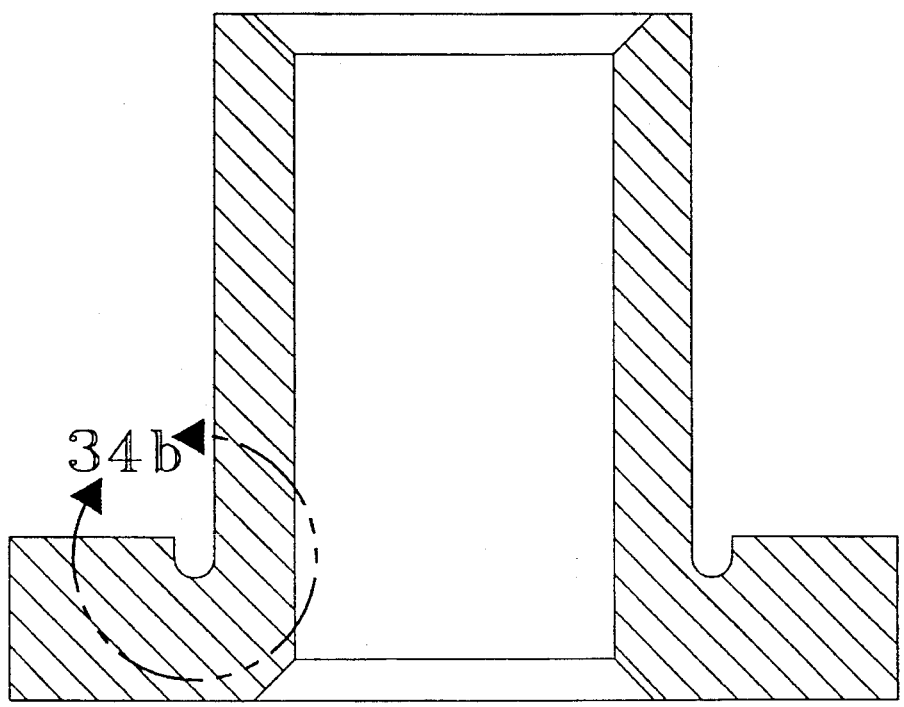
Figure 35A:
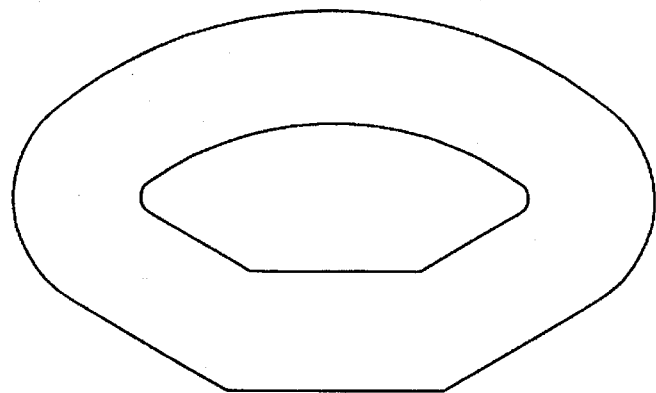
FIGS. 35a–35b illustrate a coil configured for use in the scan module of the subject invention.
Figure 35B:
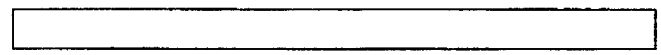

The magnetic yoke, illustrated in detail in FIGS. 29a–29b, is advantageously made of steel C1018 with an electroless nickel finish. The magnet, illustrated in detail in FIGS. 30a–30b, is advantageously made of rare earth $S_nCO_5$. The rotary yoke, illustrated in detail in FIGS. 32a–32c, is advantageously steel C1018 with a bright nickel finish. The motor shaft, illustrated in detail in FIGS. 33a–33b, is advantageously made of 303 stainless steel, Rockwell 875-80. The motor bushing, illustrated in detail in FIGS. 34a–34c, is advantageously made of bronze B-910 G1. A motor coil, illustrated in FIGS. 35a–35b, is advantageously made from single build magnetic wire. An exemplary embodiment of the optical chassis is available in FIGS. 28a–28j. Exemplary dimensions for each of these components is provided in inches in the figures.

Standard Scan Module

A scan module incorporating the above motor which is designed for use in standard, close-range applications will now be described. This scan module is illustrated in FIG. 12, in which compared with FIG. 11, like elements are referenced with like reference numerals.

As illustrated, the module comprises control PCB 66, which forms the top of the module. The control PCB is releasably affixed to chassis 71 by means of screws 65.

The components of the motor are identified with reference numerals 53–61, and these components have been discussed previously.

Additional components of the module include folding mirror 67 and folding mirror tape 68, which functions to hold the folding mirror in position. As discussed previously, the folding mirror functions to direct the laser beam from the laser diode subassembly to the polygon 52. Also included is grating 69, the function of which is to generate one or more aiming beams, as will be described in more detail further on.

Also included are shock mounts 3a–3d, the function of which have been described previously with reference to FIG. 1.

Upper shield 72 is also provided on the bottom of chassis 71, and this component functions to provide an electro-optical shield between the motor and the analog PCB 80.

Photo diodes 74, bandpass filter 75, and toroid lens 76 are also provided. These components function to collect that portion of the scanning beam which is reflected bar code symbols in the course of scanning. A more detailed description of the operation of these components will be provided further on.

The laser diode module will now be described. This module comprises laser diode 82, laser diode bumper 81, and laser diode PCB 83. The laser diode bumper is placed between the bottom of laser diode 82 and the analog PCB, and functions to provide shock resistance for the laser diode. Laser diode PCB 83 is affixed to and electrically coupled to the distal end of the laser diode, with the scanning beam being emitted from the proximal end of the laser diode towards the folding mirror. The laser diode is releasably affixed to the chassis by means of screw 85. A laser diode chassis screw 84 is also provided. This screw provides the capability of tilting the proximal end of the laser diode up or down, in order to properly align the beam with the folding mirror.

Photosensors 87 and 78, and their corresponding enclosures, identified with numerals 86 and 77, will now be described. Each of these consists of a light source and a light detector. Both photosensors are utilized to achieve proper motor speed control.

To accomplish this objective, photosensor 87 is advantageously positioned under the motor PCB, so that the light emitted by the light source in that photosensor is reflected from rotary yoke 61. The reflected light is then detected by the detector within the photosensor, and used to determine whether the yoke is rotating.

To determine motor speed, a series of three Hall sensors (not shown) will be utilized. These are advantageously mounted within the centers of the coils 58. Alternatively, the feedback current from the motor coils—a natural occurrence which derives from the rotation of the magnetic yoke above the coils—is used to determine the fact of motor rotation and speed.

However determined, the motor rotation and speed information provides feedback to the motor PCB, and is used by that board to control the motor.

Photosensor 78 is positioned so that the light source in that photosensor emits light which is reflected off the facets of the polygon 82. The light which is reflected is then detected by the detector within that photosensor. The reflected light is used by the motor PCB to generate a start-of-scan ("SOS") pulse as each new facet is brought into play to begin generating the next scan line. As will be discussed further on, this pulse is used by the signal processing subsystem to initiate processing of the next scan line.

Finally, analog PCB 80 is provided. This component is releasably affixed to the bottom of the chassis 71 by means of screws 73. The analog PCB incorporates the toroid collection lens, the photodetectors, plus the analog signal processing subsystem described further on. It fits on the bottom of the chassis as shown. The control PCB includes drivers for the "good read" and "laser on" LEDs on the outside of any scanner this would be incorporated within, plus a driver for the scanner beeper that sounds when a good read has been achieved. The control, and other PCBs, also include hardwired functions to automatically disable the laser diode if the motor has stopped moving fast enough to allow for "laser safe" (based on regulatory requirements) operation of the module. In addition, the control laser diode driver, and motor control PCBs work together to ensure the most power efficient start-up sequence for the scanning function, triggered by an electronic control line which is available as an input signal to the control PCB.

All printed circuit boards are connected through a series of pins (not shown in the drawing) running along one side of the chassis. A connector on the chassis makes it possible to interconnect all electronics.

It should be appreciated that a novel and beneficial aspect of the scan module herein described is the use of a single chassis to support all the components of the scan module, including the laser diode scanning, collection, and signal processing subsystems, since a single chassis provides a scan module which is more compact and less capable of misalignment.

Figure 13A:
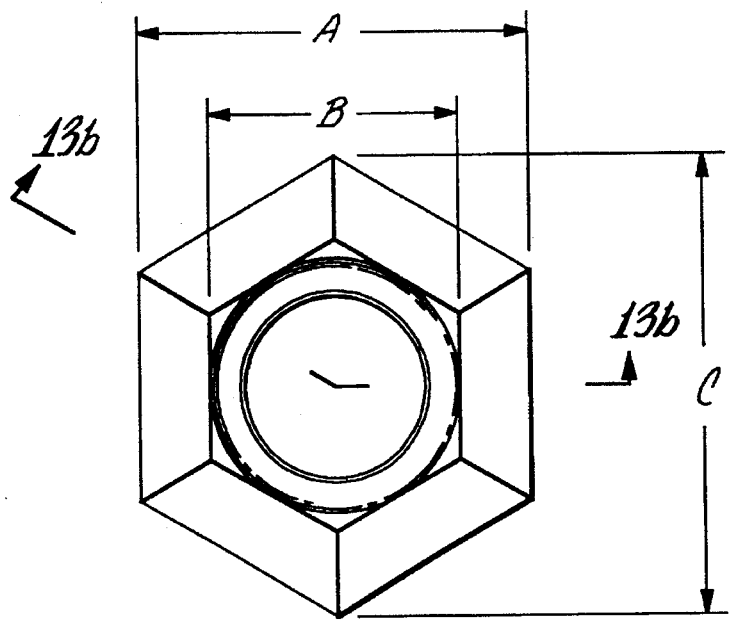
FIGS. 13a–13c illustrate a polygonal scanning element configured for standard range scanning.
Figure 13B:
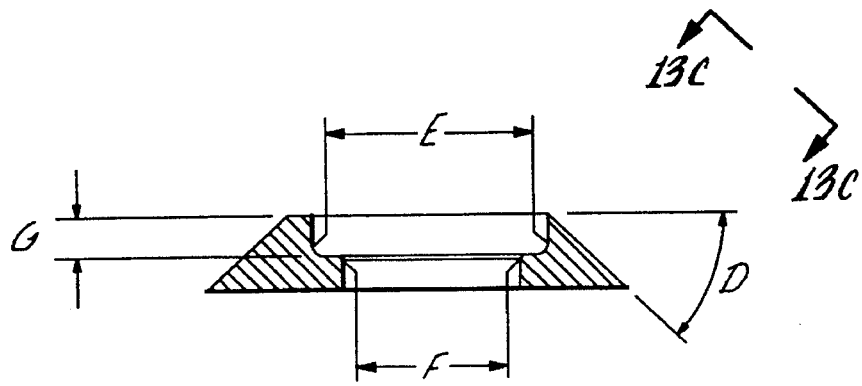
Figure 13C:
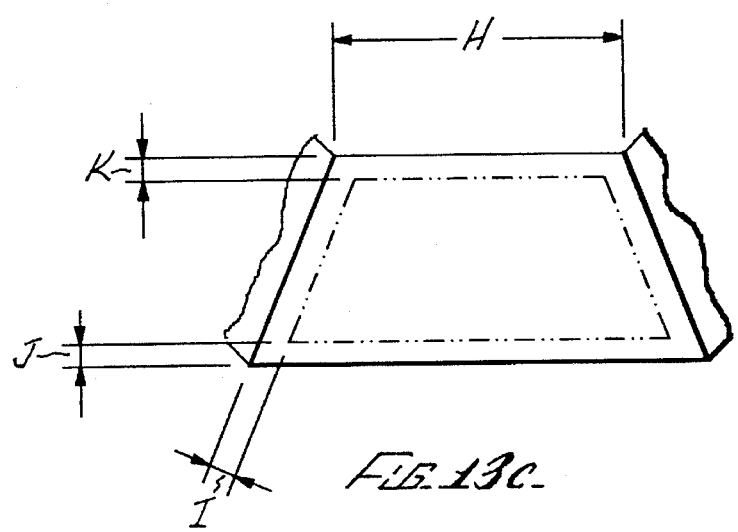

Additional detail on the polygon configured for use in the standard scan module is provided in FIGS. 13a–13c. The polygon is advantageously made from polycarbonate, and has six facets. The outer surface of each facet is advantageously coated with silicon dioxide ($SiO_2$). The dimensions referenced in the figures with identifying labels A–K advantageously have the following values:

| | |
|---|---|
| A | 1.036 in. |
| B | .6560 in. |
| C | 1.196 in. |
| D | 45° |
| E | .620 in. |
| F | .480 in. |
| G | .099 in. |
| H | .378 in. |
| I | .045 in. |
| J, K | .025 in. |

Figure 14A:
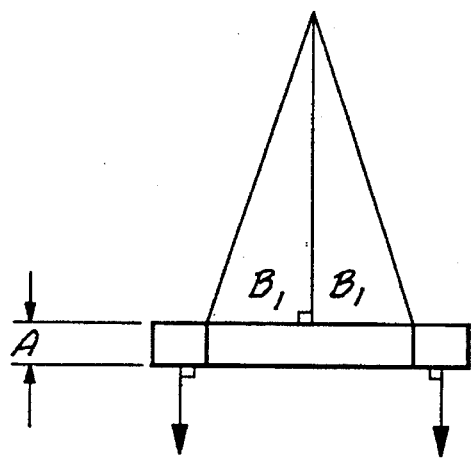
FIGS. 14a–14b illustrate a grating configured for standard range scanning.
Figure 14B:
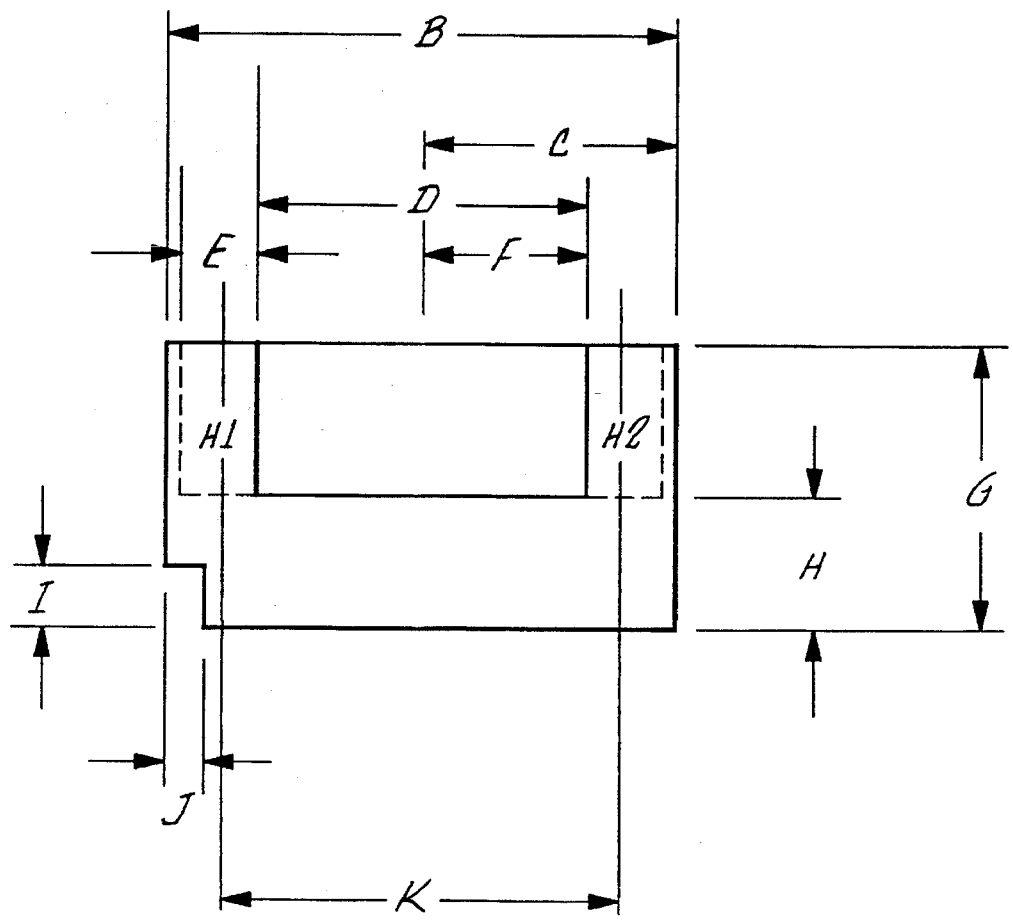

Additional detail on the grating configured for use in the standard scan module is provided in FIGS. 14a–14b. The dimensions labelled as A–K in these drawings advantageously have the following values:

| | |
|---|---|
| A | .080 in. |
| B | .795 in. |
| C | .398 in. |
| D | .440 in. |
| E | .090 in. |
| F | .220 in. |
| G | .390 in. |
| H | .140 in. |
| I | .070 in. |
| J | .050 in. |
| K | .49 in. |

Long-Range Scan Module

Figure 15A:
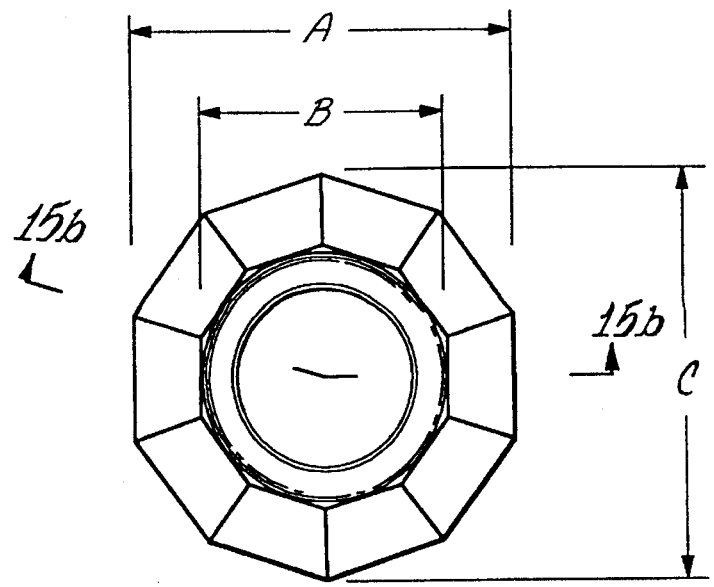
FIGS. 15a–15c illustrate a polygonal scanning element configured for long range scanning.
Figure 15B:
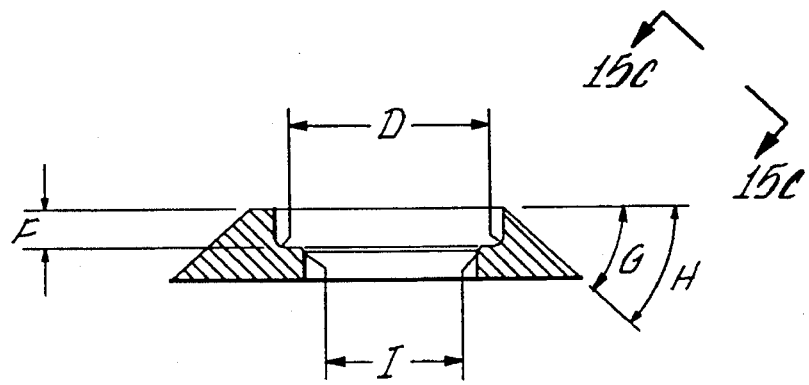
Figure 15C:
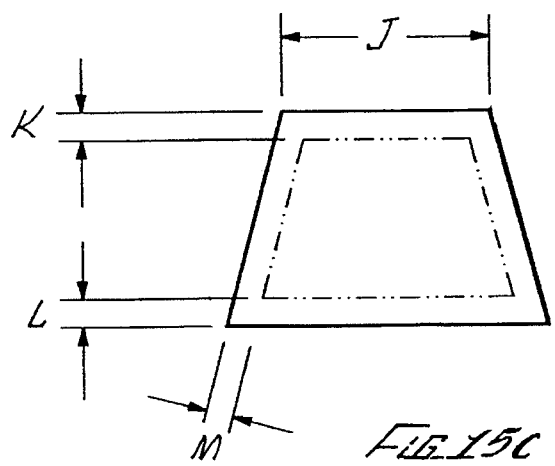

A scan module adapted for long-range scanning will now be described. All the components of such a module are identical to those described previously with respect to the standard scan module, which is illustrated in FIG. 12, except for the polygon and grating. The polygon, as adapted for use in the long-range scan module is illustrated in FIGS. 15a–15c.

As illustrated, the polygon is advantageously made from polycarbonate, and has ten facets. The exterior surface of each facet is advantageously coated with silicon dioxide ($SiO_2$). The dimensions in the figures, labelled with identifying letters A–L, advantageously have the following numerical values:

| | |
|---|---|
| A | 1.060 in. |
| B | .680 in. |
| C | 1.115 in. |
| D | .620 in. |
| E | .010 in. x. 45° chamfer |
| F | .099 in. |
| G | .160 in. |
| H | 45° |
| I | .460 in. |
| J | .221 in. |
| K, L | .025 in. |
| M | .025 in. |

Figure 16A:
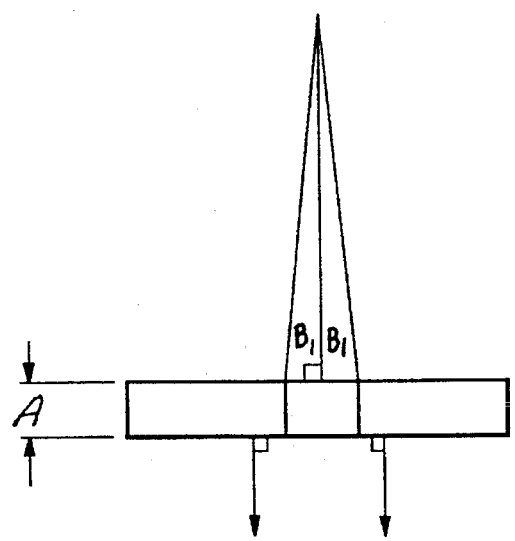
FIGS. 16a–16b illustrate a grating configured for long range scanning.
Figure 16B:
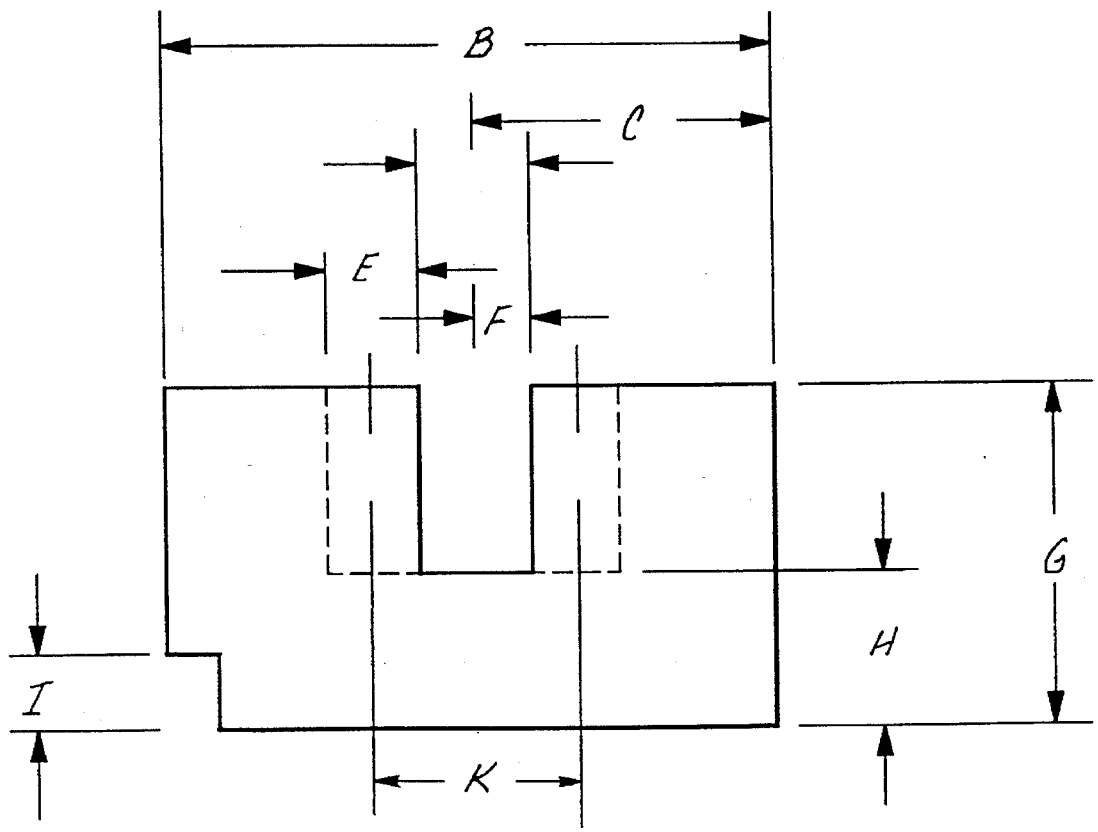

A grating adapted for use in the long-range scan module is illustrated in FIGS. 16a–16b. The dimensions of the grating, labelled with reference letters A–K, advantageously have the following values:

| | |
|---|---|
| A | .080 in. |
| B | .795 in. |
| C | .398 in. |
| D | .120 in. |
| E | .090 in. |
| F | .060 in. |
| G | .390 in. |
| H | .140 in. |
| I | .070 in. |
| J | .050 in. |
| K | .209 in. |

Very Long-Range Scan Module (In-Line Collection Mirror)

A scan module adapted for use in very long-range applications will now be described. Such a module is illustrated in FIG. 17. As illustrated, this module comprises laser diode 88, focussing lens 89, fold mirror 90, pivoting scan mirror 91, spherical (or aspheric) mirror 92, (optional) spatial filter 93, photodetector 94, (optional) optical filter 95, and fold mirror 98. In this module, the pivoting scan mirror 91 is used to generate the scanning beam 96 for scanning bar code 97. The collection optics is an "in-line" design, according to which collecting mirror 92 is located behind a separate scanning mirror, and diverts the reflecting light to fold mirror 98, which then diverts the light to optional optical filter 95 and optional spatial filter 93 before it strikes photodetector 94. The optical filter is designed to select only the wavelength of the light being used for scanning, and the spatial filter (a slit) selects only those rays of light coming in more or less "on axis" from the bar code. The effect of both filters is to reject unwanted noise from ambient light entering the scanner. Additional detail about this scan module is available in co-pending U.S. patent application Ser. No. 07/819,324, Reddersen, filed Jan. 10, 1992, entitled "OPTICAL SYSTEM FOR DATA READING APPLICATIONS", which is hereby fully incorporated by reference herein as though set forth in full.

Basket Scanner

Figure 18A:
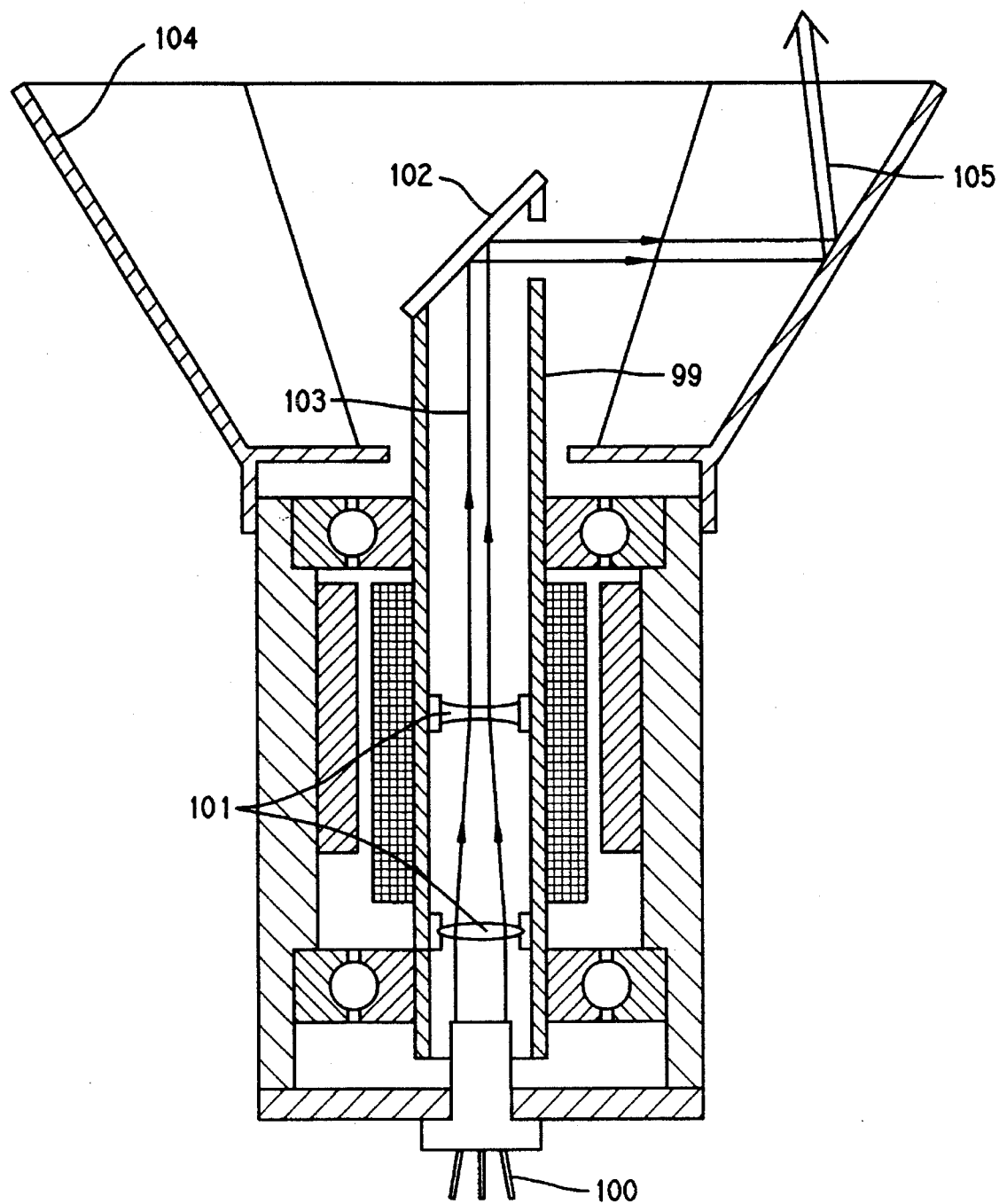

Optionally, the subject scan module can be configured with a basket scanner, as illustrated in FIGS. 18a–18b. Such a scanner is appropriate if it is desired to utilize a two-dimensional scanning pattern, such as the asterisk pattern illustrated in FIG. 9. FIG. 18a is a side view of the basket scanner while FIG. 18b is an end view. In these figures, like elements are referenced with like reference numerals.

As illustrated, the basket scanner comprises rotating center structure 99, laser diode 100, focussing lenses 101, rotating fold mirror 102, and basket mirror 104. The fold mirror is fixed to the rotating structure, and therefore rotates as the structure does. The laser diode produces a beam 103 which, after being focused by the focussing lenses 101, is directed to impinge upon the rotating folding mirror. The rotating fold mirror deflects the scanning beam 105 off of the series of basket mirrors 104 placed around the perimeter of the basket assembly shown in FIGS. 18a–18b. The result is a two-dimensional scan pattern depending on the arrangement of basket mirrors surrounding the rotating center structure.

With a basket scanner, collection is most efficiently done in a "retrodirective" manner, in which light reflected from the bar code bounces off the basket mirrors and back down the center shaft of the rotating structure, where a beamsplitter picks off the reflected light and passes it to a collection lens and photodetector. Additional details on basket scanning are available in U.S. Pat. No. 4,939,356, Rando et al., which is hereby fully incorporated by reference herein as though set forth in full.

Alternative Scanning Subassemblies

Several alternatives to the above scanning subassemblies will now be described. One such alternative is illustrated in FIGS. 19a–19b, with FIG. 19a being a top view, and FIG. 19b a bottom view. In these figures, like elements are referenced with like reference numerals.

As illustrated, the polygon 11 continues to be used to generate scan lines as described earlier, but the fold mirror 107 between the laser diode module 110 and the polygon can itself oscillate back and forth. It will be synchronized to tilt based on receipt of the "start of scan" signal described earlier. It should be appreciated that for applications with very few raster lines, the polygon could also tilt each of its facets at different angles.

Figure 20A:
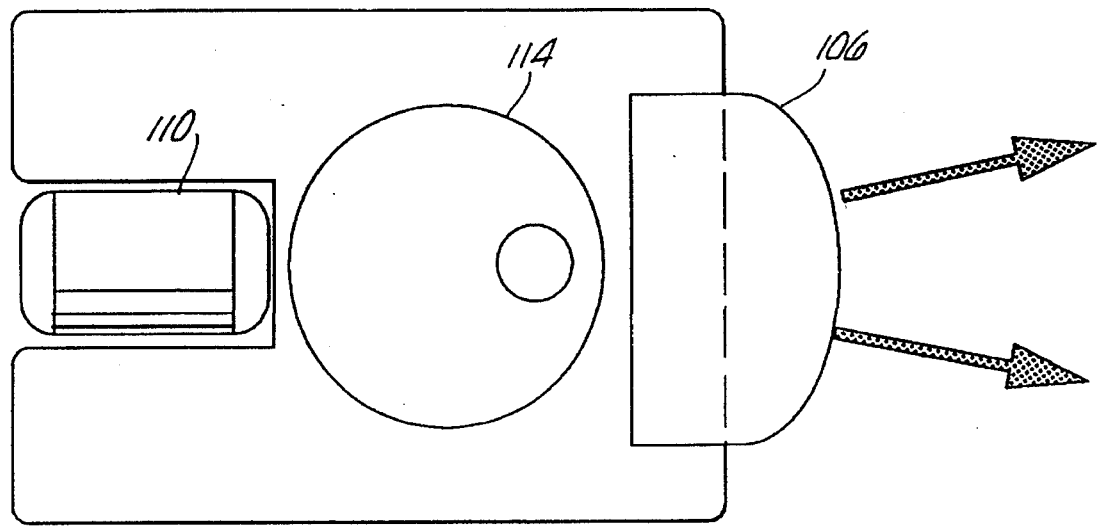
FIGS. 20a–20b illustrate a scan module incorporating a holographic disk.
Figure 20B:
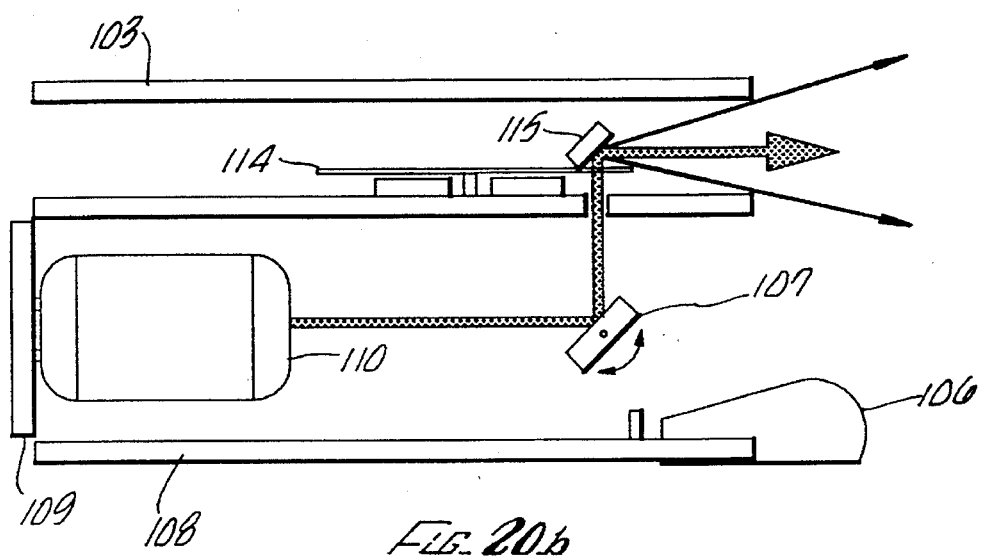

A second alternative is illustrated in FIGS. 20a–20b, with FIG. 20a being a top view, and FIG. 20b being a bottom view. In these figures, like elements are referenced with like reference numerals. As illustrated, in this approach, the polygon 111 has been replaced with a mini-holographic disk 114. The disk is designed so that, as it rotates, different segments of the holographic disk swing into place over the laser beam, and the holographic gratings move the beam to scan it at different angles and positions outward from the disk. A fold mirror 115 mounted above the holographic disk deflects the light outward from the scanner. It should be appreciated that a more complex disk is possible which allows use of multiple radial "tracks" with different scan patterns on the same disk; these tracks would be accessible by pivoting the fold mirror 107, either prior to scanning, or dynamically during scanning, to access the different tracks, and hence scan patterns.

Figure 21:
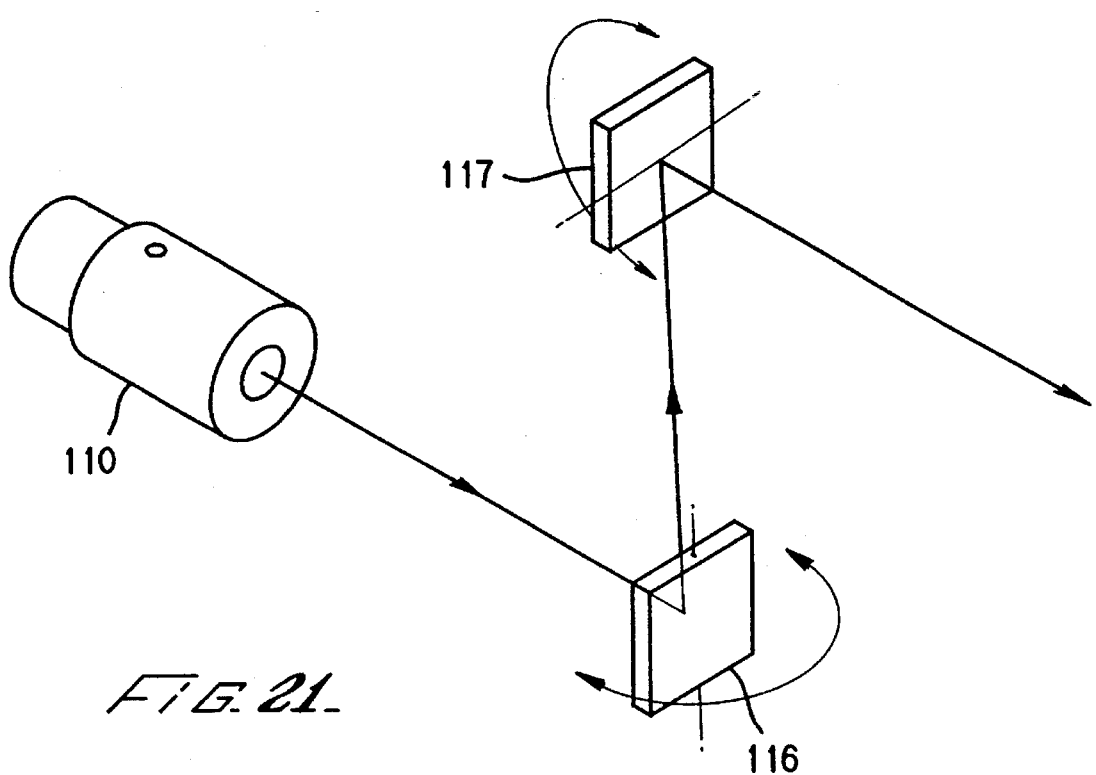
FIG. 21 illustrates a scan module incorporating two oscillating mirrors to generate a two-dimensional scan pattern.
Figure 25A:
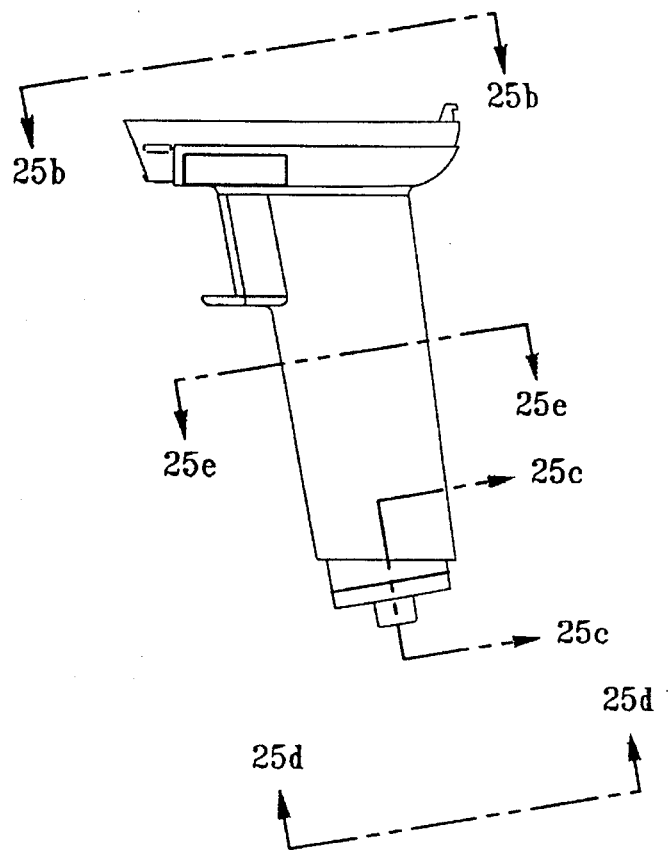
FIGS. 25a–25j illustrate a housing body for the scanner incorporating the teachings of the subject invention.
Figure 25B:
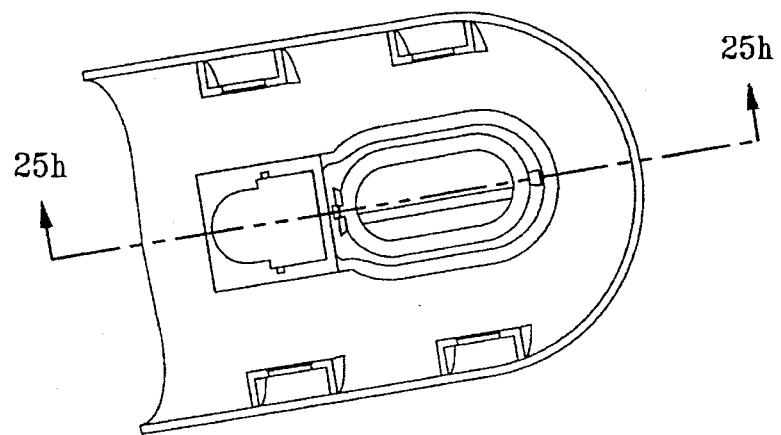
Figure 25C:
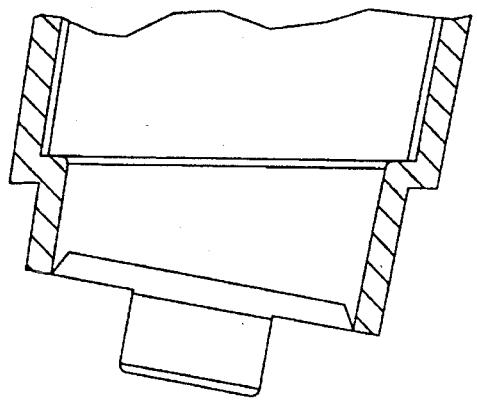
Figure 25D:
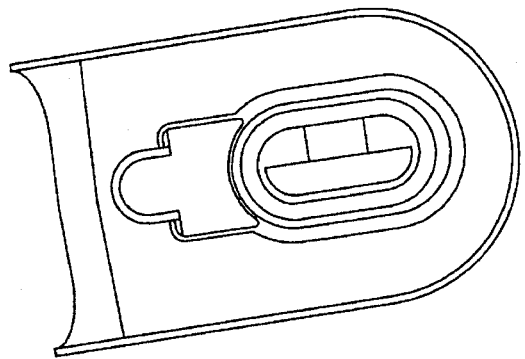
Figure 25E:
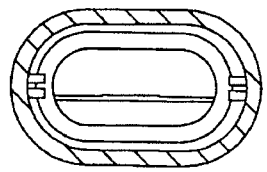
Figure 25F:
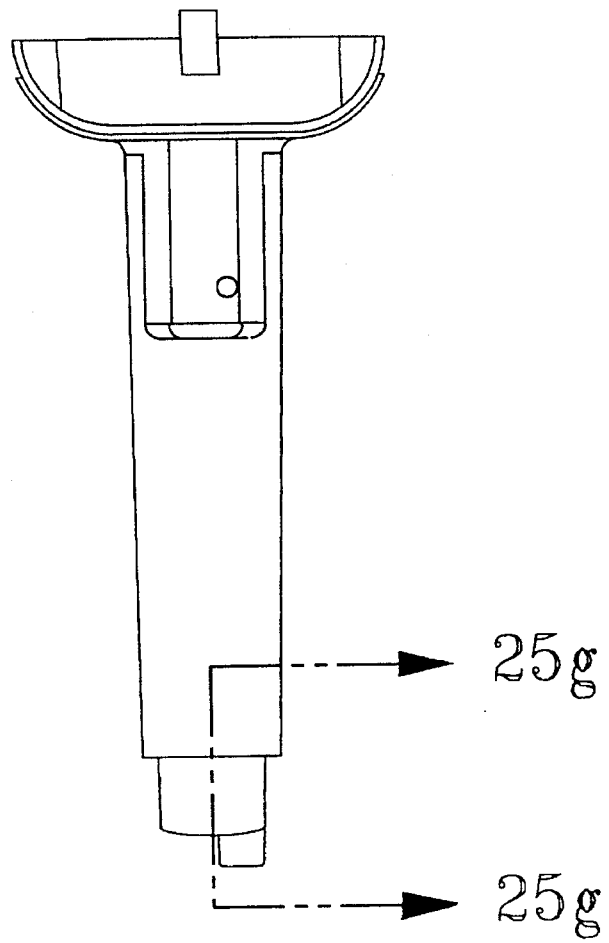
Figure 25G:
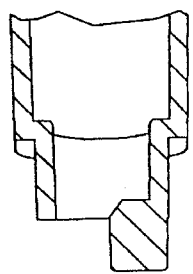
Figure 25H:
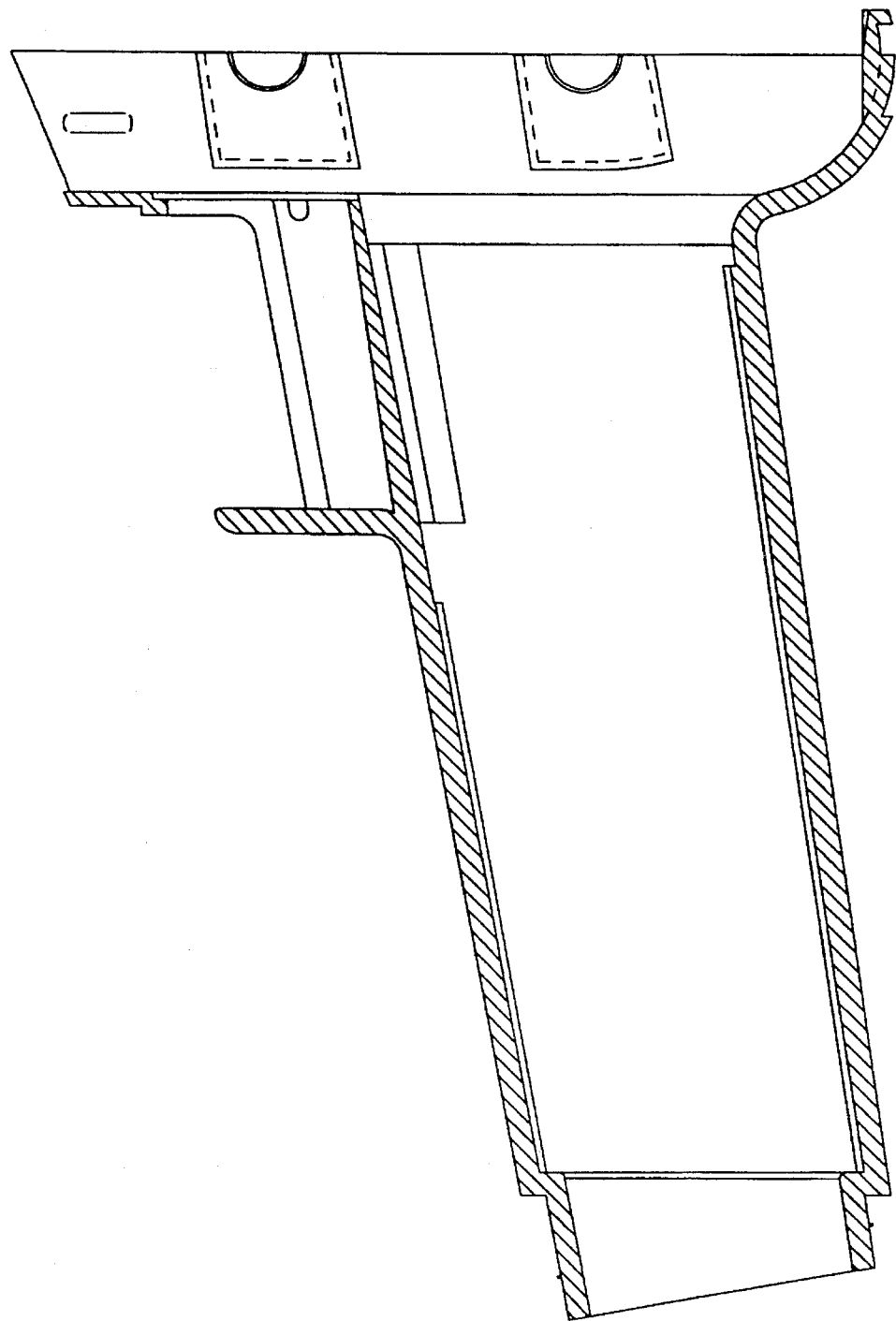
Figure 25I:
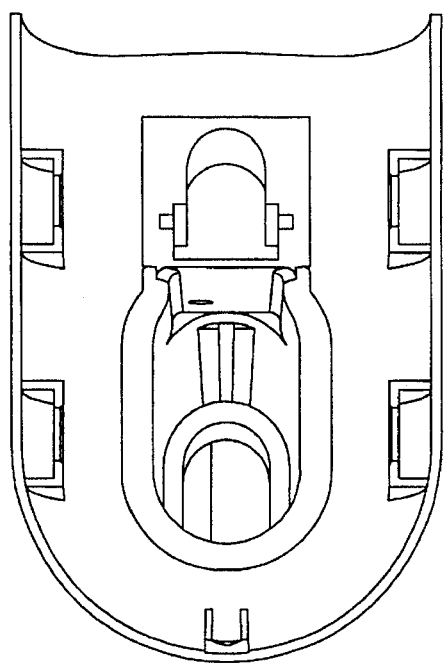
Figure 25J:
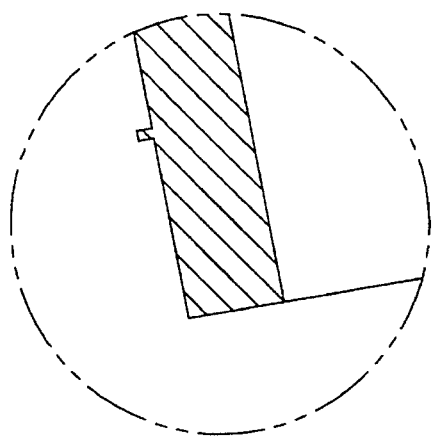
Figure 26A:
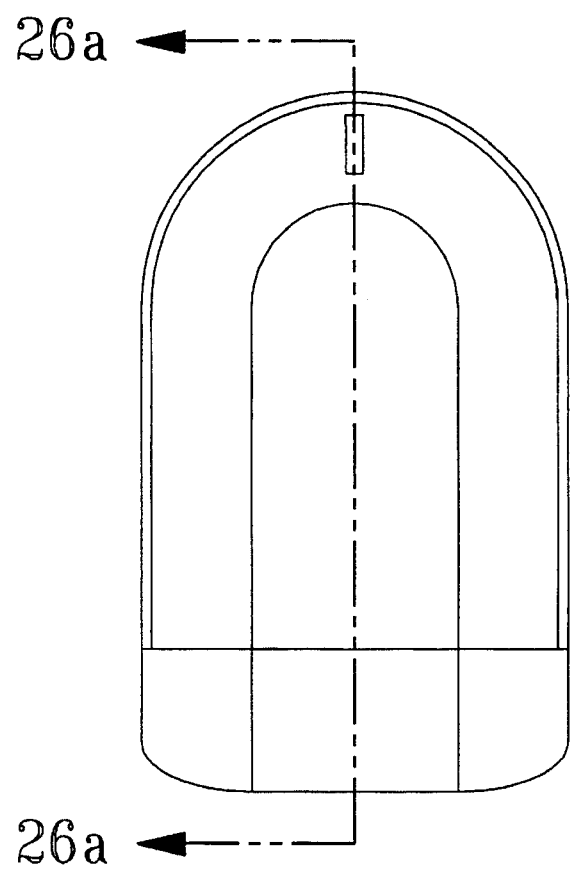
FIGS. 26a–26f illustrate a housing top for a scanner incorporating the teachings of the subject invention.
Figure 26B:
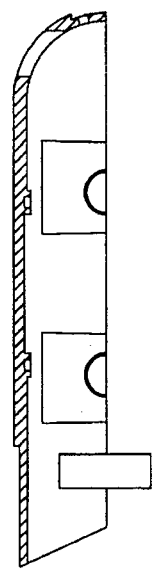
Figure 26C:
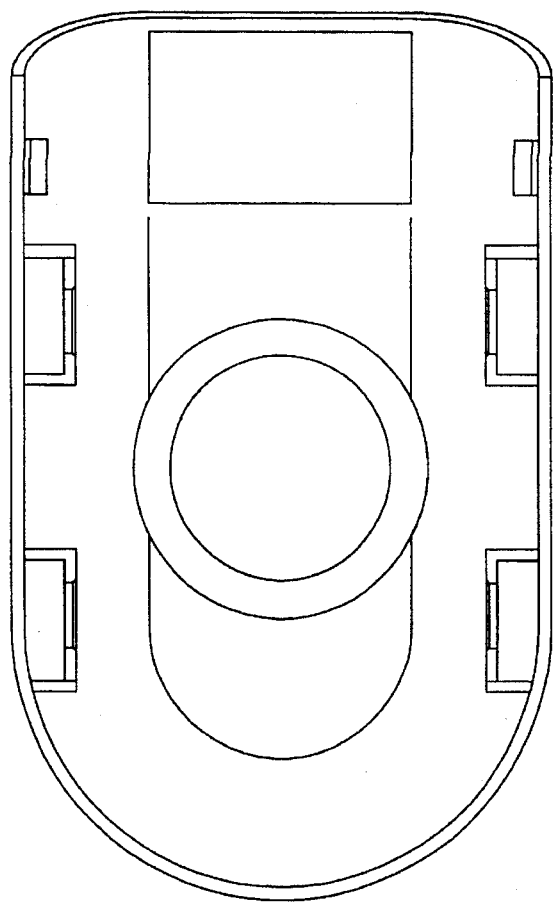
Figure 26D:
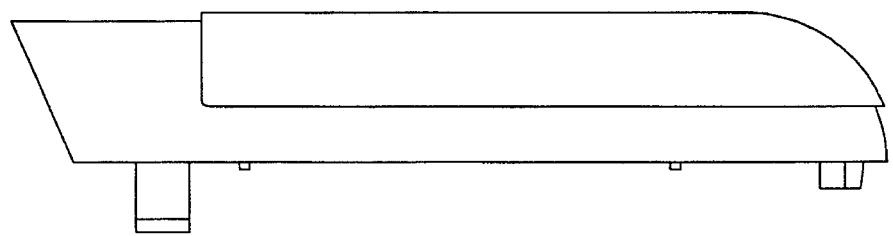
Figure 26E:
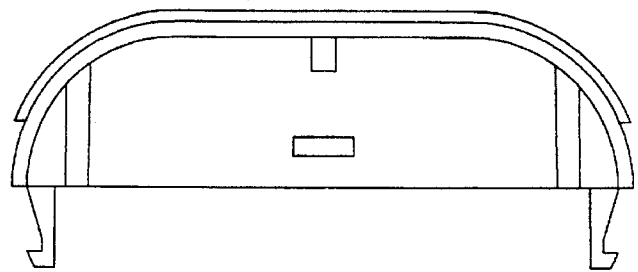
Figure 26F:
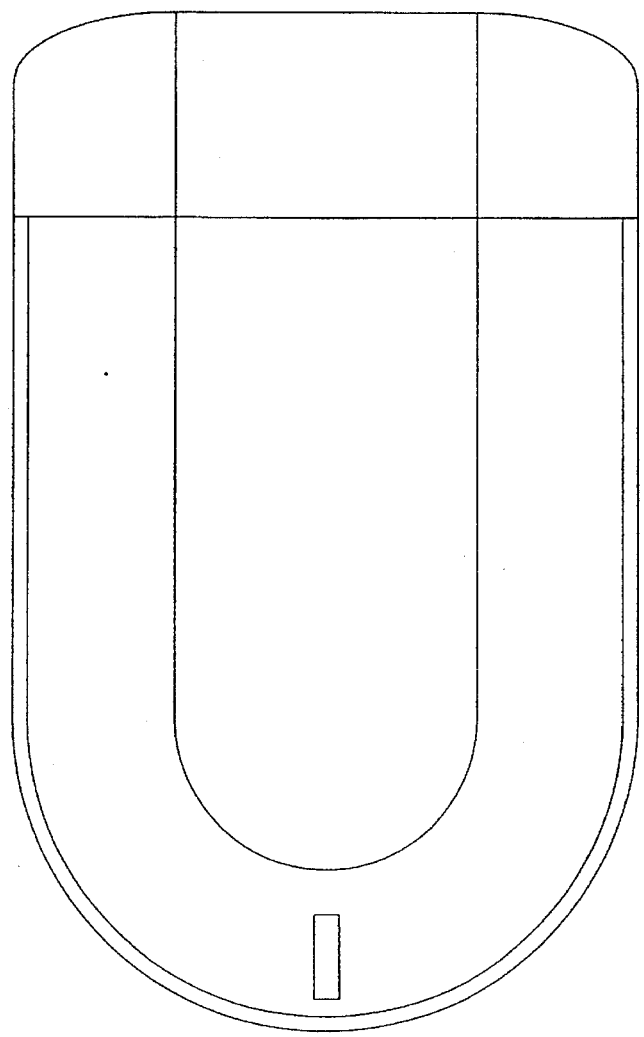
Figure 27A:
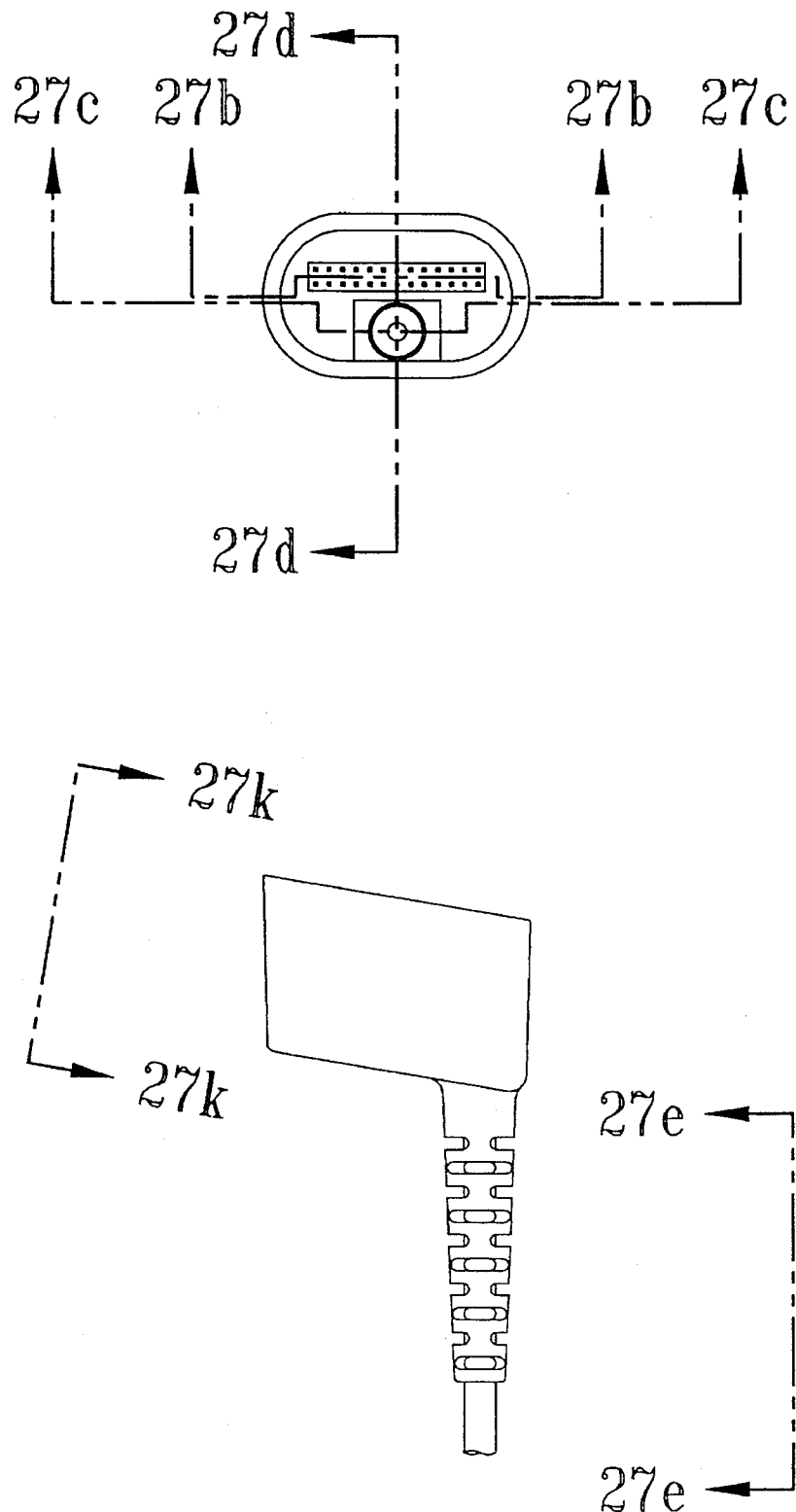
FIGS. 27a–27k illustrate the end cap subassembly for a scanner incorporating the teachings of the subject invention.
Figure 27B:
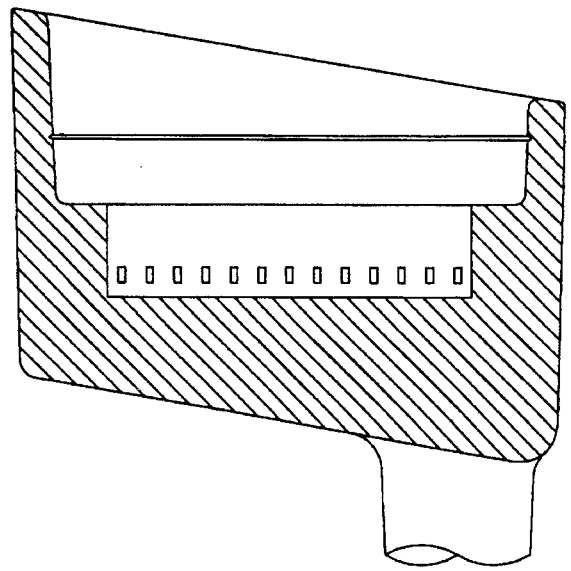
Figure 27C:
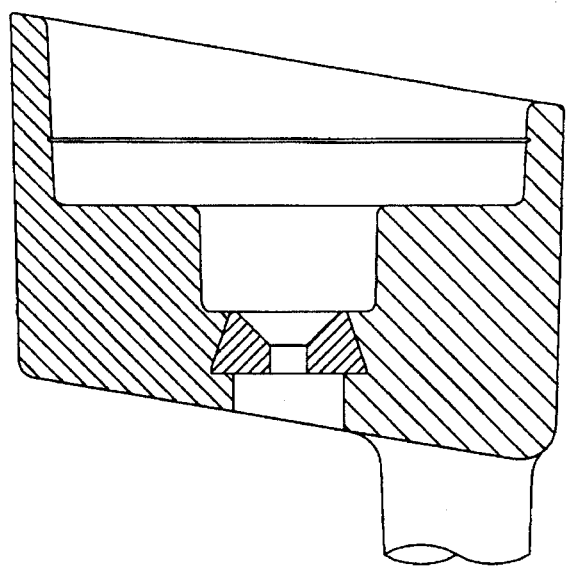
Figure 27D:
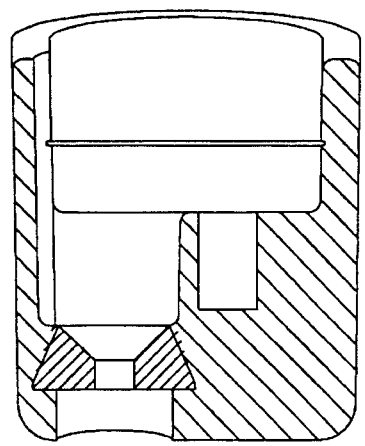
Figure 27E:
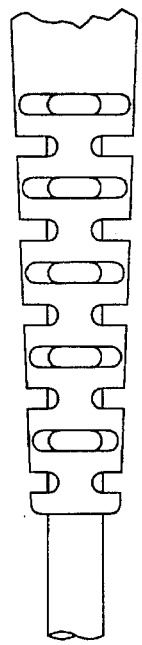
Figure 27F:
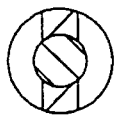
Figure 27G:
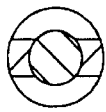
Figure 27H:
Figure 27I:
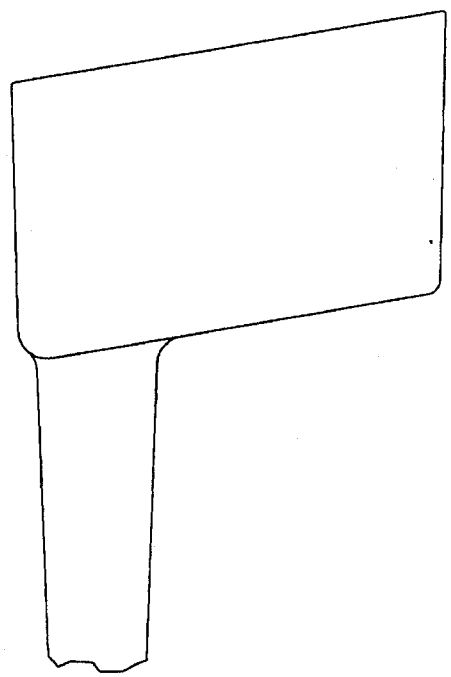
Figure 27J:
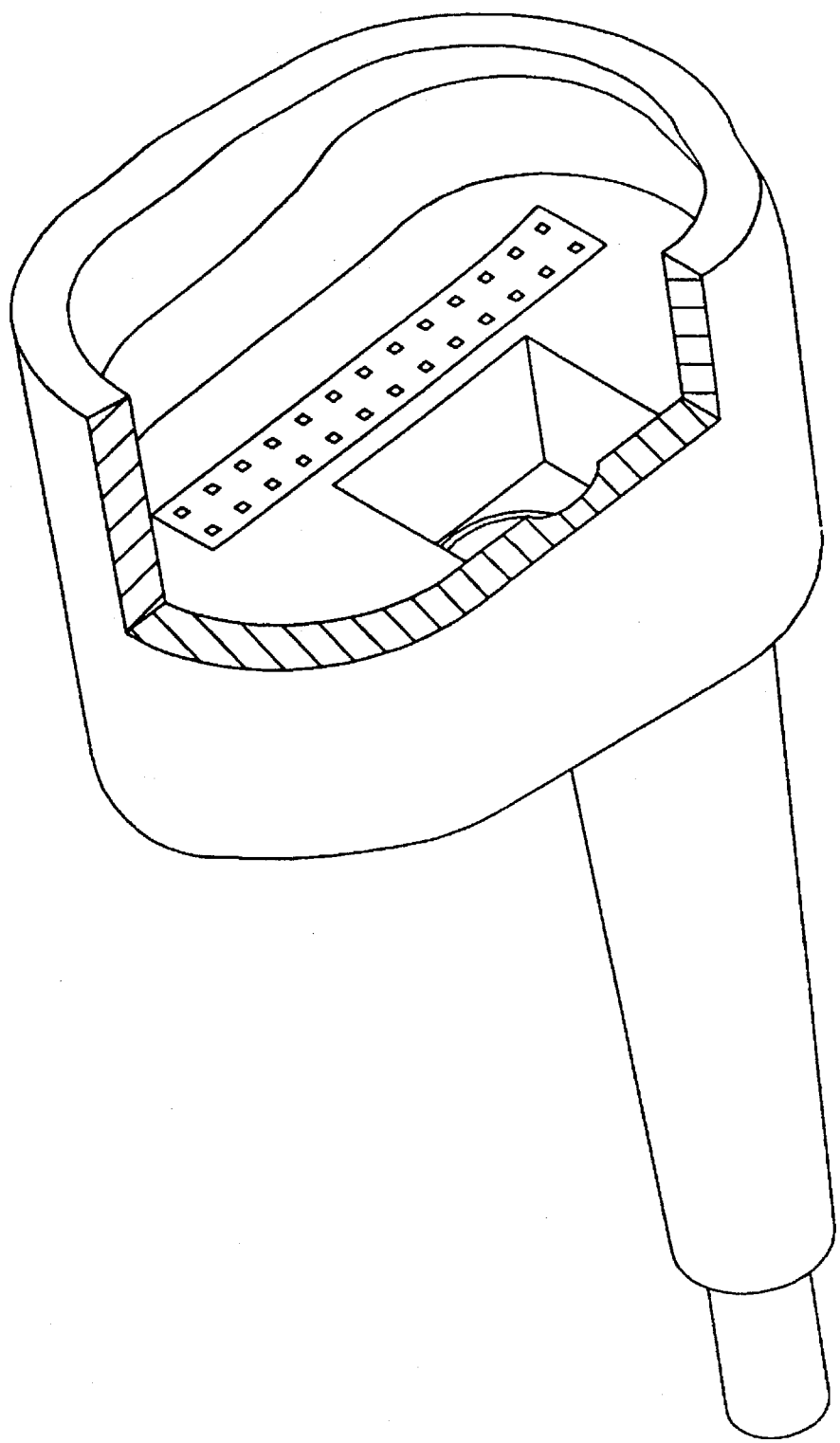
Figure 27K:
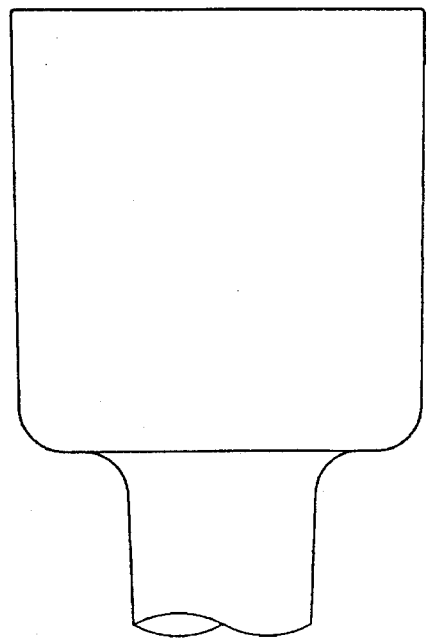
Figure 28A:
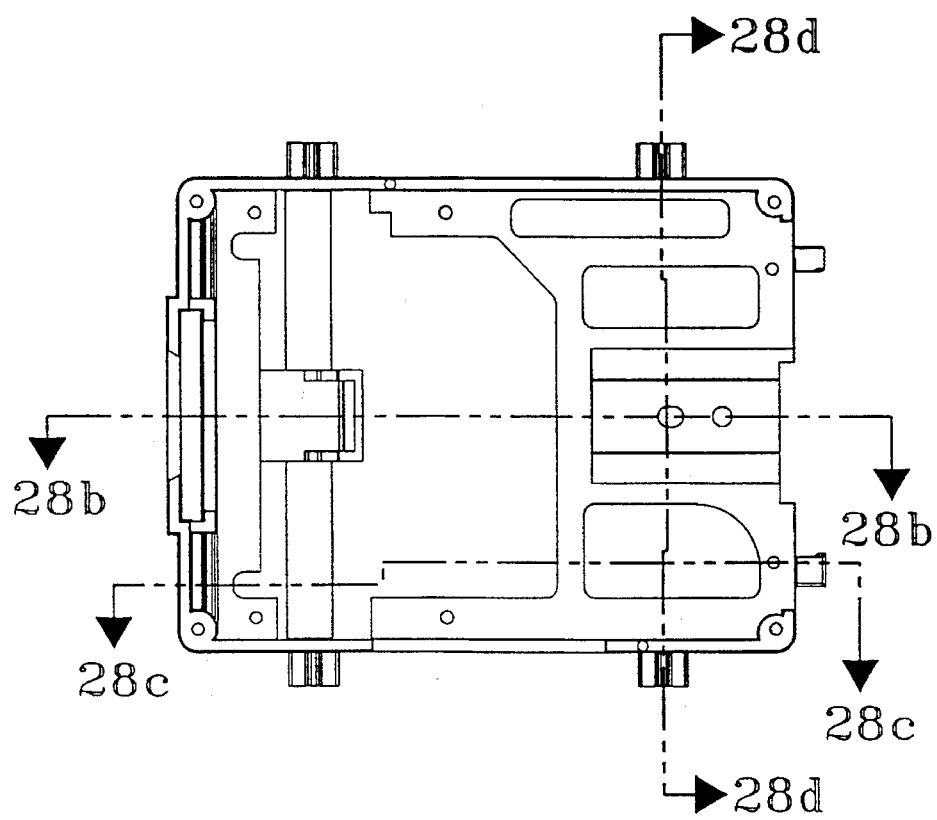
FIGS. 28a–28j illustrate an optical chassis configured for use in the scan module of the subject invention.
Figure 28B:
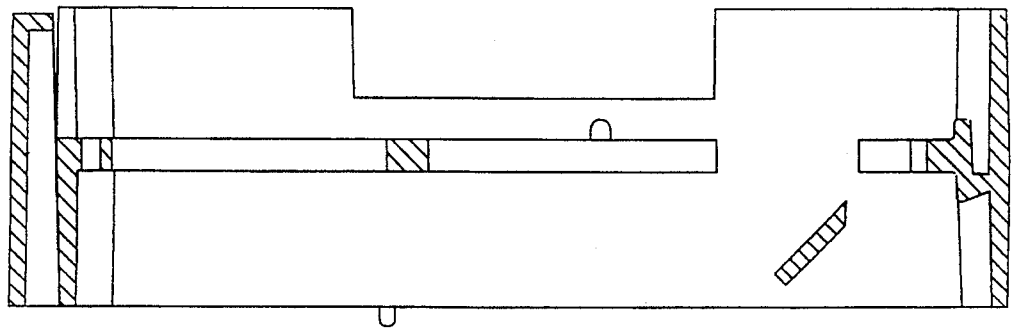
Figure 28C:
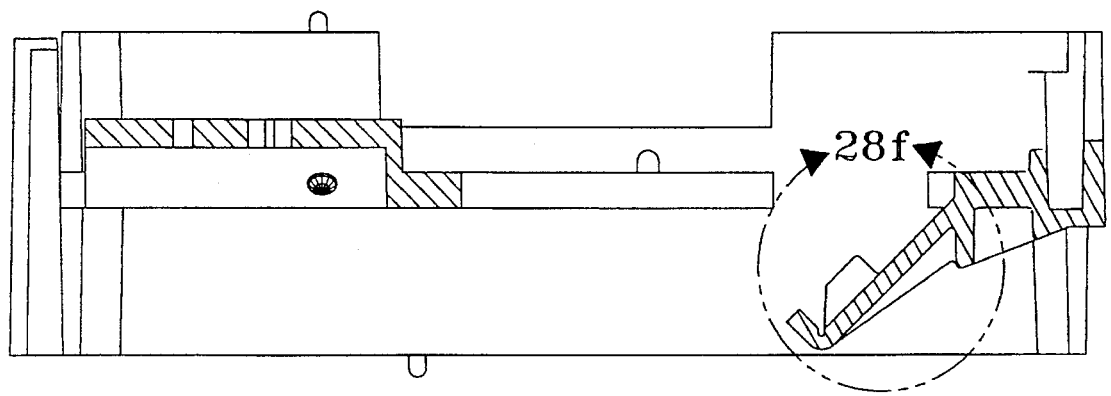
Figure 28D:
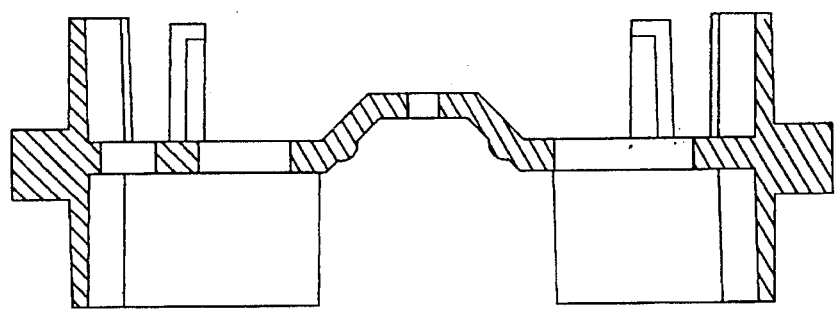
Figure 28E:
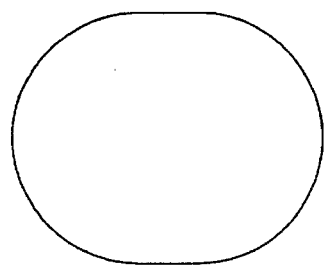
Figure 28F:
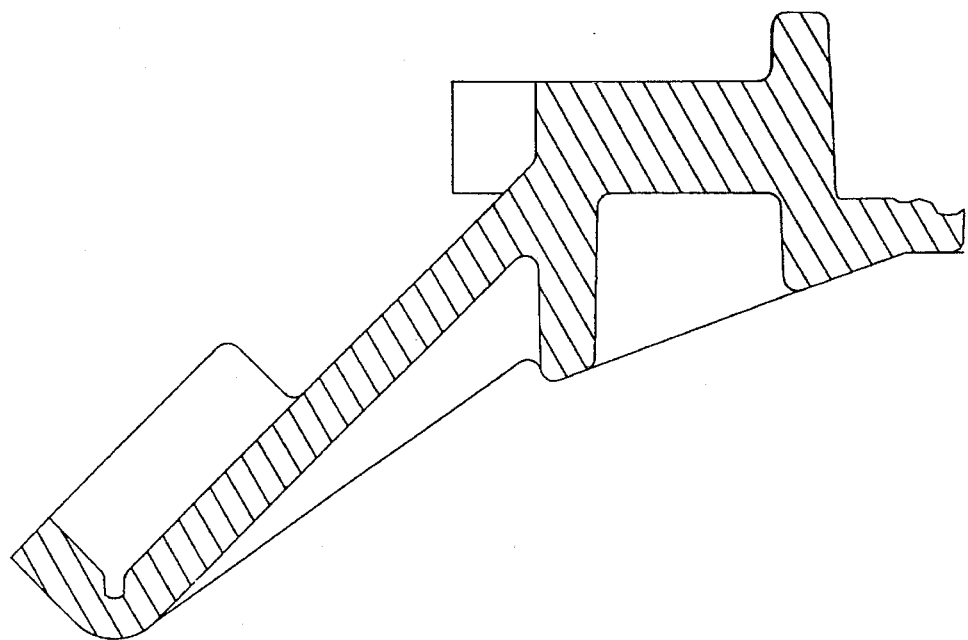
Figure 28G:
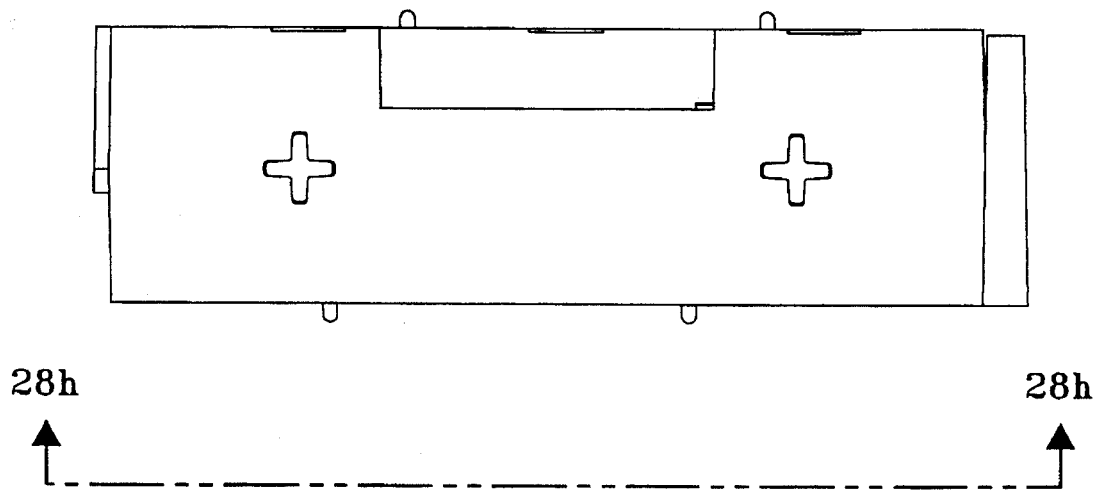
Figure 28H:
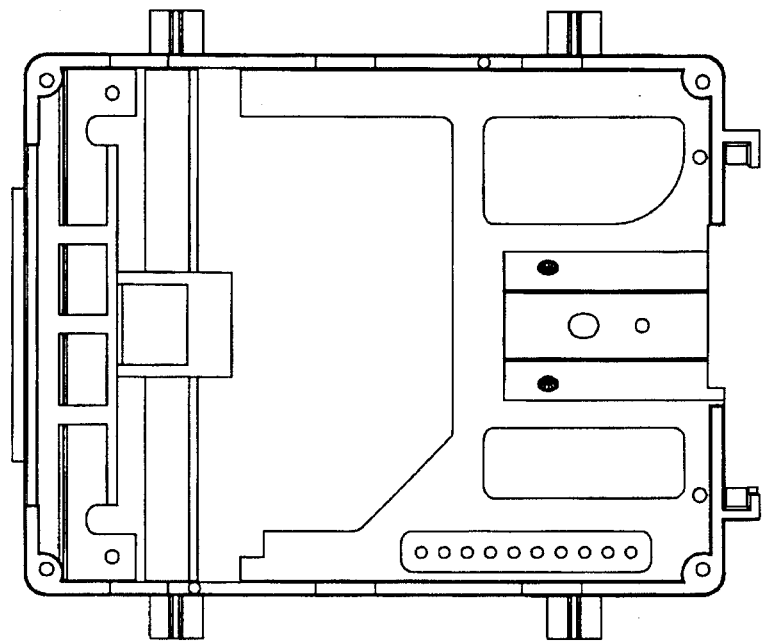
Figure 28I:
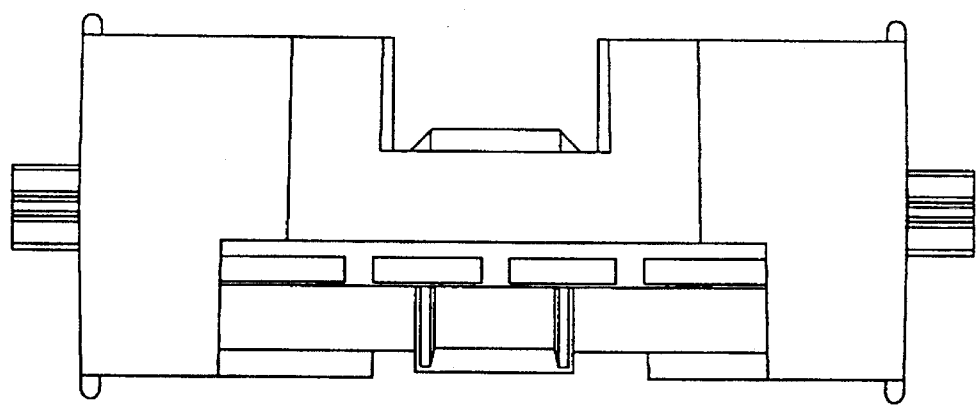
Figure 28J:
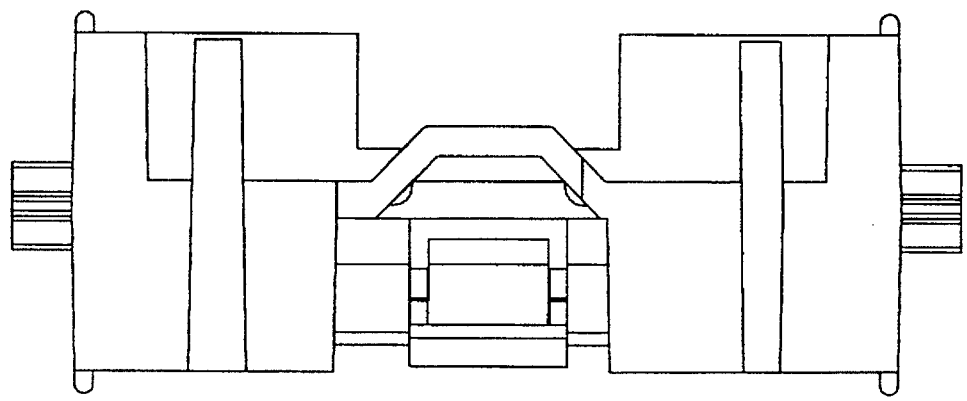

A third alternative, using two orthogonal oscillating mirrors, is illustrated in FIG. 21. In this alternative, mirror 116 provide one dimension of movement, and mirror 117 provides the second dimension of movement. The separation of the mirrors must be kept to a minimum, so as to minimize the size of the mirror 117, and to minimize the size of the "scan error" caused by moving the beam scanned from mirror 116 off the exact central scanning axis of the mirror 117.

It should be appreciated that the subject scan module can be equipped with a number of other optional features, such as the ability to adjust the scan line length to meet the specific bar code requirements of a given application. This can be accomplished in the subject scan module by switching the laser beam on and off so that the beam is on only for the required length, or by changing the sweep range of the pivoting fold mirror in those embodiments of the module which utilize such a component. Additional optional features include the ability change the scanning rate, or number of lines scanned per second. Either of these features can be incorporated in the subject module by changing motor rotational speed or the oscillation rate of a pivoting fold mirror in those embodiments which use such a component.

Aiming Optics

The generation of an aiming beam will now be described. In the subject module, the inclusion of this feature will be accomplished by designing the module with a larger scan angle that would be required to cover the necessary maximum bar code length. Then, a diffraction grating piece is included in the scan module on either side of the required scan angle. These gratings are "de-scanning gratings" and function to straighten out the scanning beam at the extremes so that, instead of exiting the scan module at a larger angle than the required angle, they will exit as beams of light more or less in parallel with the scanning system optical axis. Because the actual distance the scanning beam travels as it impinges on each diffraction grating is small, the de-scanned beams will appear as two more or less stationary bright dots superimposed on a more dimly lit scan line.

These principles can be illustrated with reference to FIG. 22, which illustrates polygon 118 within scan module 119. As shown, the polygon is configured to direct scanning beam 120 over a wider angle 121 then necessary to sweep the maximum required scan angle 122. Diffraction gratings 123a–123b are situated to intersect the scanning beam at these locations before it exits the scan module. As illustrated, the diffraction gratings function to produce two aiming spots 124 which are about parallel to optical axis 125.

A polygon and grating configured for use in short-range scanning applications is illustrated in, and was previously described with reference to, FIGS. 13a–13c, and FIGS. 14a–14b, while a polygon and grating configured for use in long-range scanning applications is illustrated in, and was previously described with reference to, FIGS. 15a–15c and FIGS. 16a–16b.

Focus Error Sensing Subsystem

Optionally, the scan module can be equipped with a special electro-optical system designed to determine the distance between the scanner and the bar code. This is known as "focus error sensing optics", since it can be used to determine the distance between the best focus of the scanner system and the actual position of the bar code to be scanned.

There are two principal applications where this will be used. The first is to support the auto-focus or multi-lens systems described previously with respect to FIGS. 4–6. The second is to provide feedback to a special signal processing subsystem especially designed for long range applications to be explained in more detail further on.

The electro-optic system to provide this information is shown in FIG. 23, which illustrates a "top view" of a handheld laser scanner 128. In this implementation, an LED emitter and lens module 129 will be mounted either on the scan module or on the scanner enclosure itself; this emitter will send out a nearly collimated beam 130 straight ahead of the scanner. This beam will hit the bar code 131 and scatter away from it in much the same way as the scanning beam is scattered by the bar code. The scattered light 134 will be gathered by a focussing lens 132 mounted off-axis from the LED emitter optics path; this focussing lens will then gather the light on a position photosensor 133. Note that the photosensor is positioned slightly off-axis with respect to the focussing lens 132.

As illustrated, when a bar code is close to the scanner, the focussing lens will collect the light on the right end of the photosensor (as shown in the illustration). When the bar code is further away, the light will come out more towards the left end of the photosensor (again relative to the illustration). Position photosensor 133 is advantageously a simple split-detector photosensor, with appropriate electronics to determine the ratio of the photocurrent gathered in the right side of the sensor divided by the photocurrent gathered on the left side of the photosensor. This information, along with some other factors (determined from the separation of the emitter and detector subsystems and appropriate signal level considerations), will then make it possible to determine the approximate distance of the bar code from the scanner. This information is then fed back to the drive electronics associated with an auto-focus or multi-lens system, or a signal processing system for long-range scanning, to be described later.

Collection Subsystem

Figure 31A:
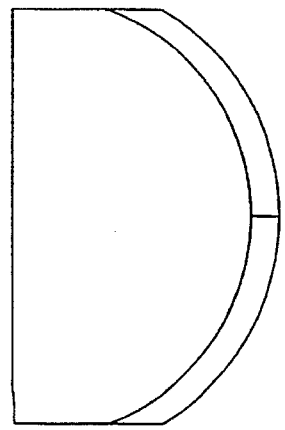
FIGS. 31a–31c illustrate a toroid collection lens for use in the scan module of the subject invention.
Figure 31B:
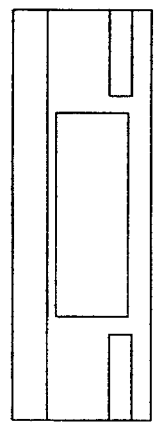
Figure 31C:
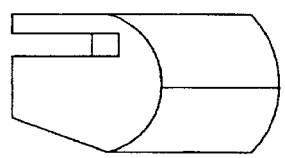

A collection optics subsystem which can advantageously be used in the scan modules using the polygon geometries illustrated in FIGS. 10a–10b, 12, 19a–19b, and the holographic disk system of FIG. 20a–20b uses a toroidal-shaped collection lens and multiple photosensors. The toroid lens, which may be plastic or molded glass, collects the light gathered over a relatively wide (>60° in both axes) field of view, and focusses it onto one or more of the photodetectors mounted directly behind the lens second surface. These photodetectors are directly mounted on the analog PCB 80 illustrated in FIG. 12. Additional detail on an exemplary embodiment of the lens is produced in FIGS. 31a–31c.

The collections optics system for the basket scanner was described previously with reference to FIGS. 18a–18b, and that for the special oscillating mirror scanning system for long range reading illustrated in FIG. 17 was described previously with reference to that figure. The collection optics for the two-dimensional scanning system concept shown in FIG. 21 can utilize either the toroidal collections optics system or a variant of the collection mirror structure shown in FIG. 17.

Signal Processing Subsystem

Signal processing refers to the process of digitizing the analog signal, to produce a digital signal having an amplitude determined at least partly by the intensity of the light reflected by the bar code symbol as it is scanned, where the width of and space between the digital pulses corresponds to that of the bars making up the bar code symbol. The circuitry to perform this function is advantageously located on the analog PCB, identified with reference numeral 80 in FIG. 12.

Preferably, this circuitry employs a derivative-based method to digitize the incoming signal, according to which the second derivative of the incoming signal is determined, and a digital pulse is either started or stopped at the zero-crossings of the second derivative signal.

An overall block diagram of an exemplary embodiment of the signal processing circuitry is illustrated in FIG. 24a. As shown, the embodiment comprises pre-amplifier 201, high pass filter 202, low pass filter 203, peak detector circuit 204, digitizing circuit 205, and motion sense circuit 206, all of which are coupled together as shown. Note that, as will be discussed, embodiments are possible in which not all portions of this circuit are included.

The first step in operation of this circuitry is the collection of the light on the photodetectors 247 shown at the upper left in FIG. 24a. These can be photodetectors positioned behind the toroid collection lens described earlier (identified with reference numeral 74 in FIG. 12), or from one or more photodetectors used in one of the other light collection subsystems which are contemplated (such as those illustrated in FIGS. 17, 18a–18b). Optionally, the signal collected by these photodetectors is modulated with a high frequency carrier signal, because the scanning beam emitted by the laser diode itself has been modulated by a similar frequency. Advantageously, a 455 KHZ square or sine-wave signal is utilized as the carrier signal. It should be appreciated, however, that embodiments are possible in which modulation is not performed.

The incoming signal is then input to the pre-amplifier, which functions to amplify the input signal by an amount inversely proportional to an Automatic Gain Control ("AGC") signal 211 which is generated by the peak detector circuit 204. Thus, for embodiments where the input signal has been modulated, the resultant amplified signal 13 is input to high pass filter 202, which functions to pass all high-frequency components of signal 213 (for example, at 250 KHz and above), and to filter out unwanted low frequency components which have been introduced from various sources, such as ambient light and power supply noise.

Filtered signal 214 is then input to detector circuit and low pass filter 203, which could be synchronous, single-side band, or double side-band envelope. This circuit and filter 203 functions to pass only low frequency components, and filter out high frequency components. The effect is to remove the carrier signal 207, and to leave only the low frequency envelope 208 in the signal, so that the resultant signal 215 is more representative of the reflected light intensity off the bar code symbol.

The signal 215 from this stage goes in two directions. First, it is input to peak detector circuit 204 which functions to detect the peak voltage of the signal. This value is used to produce AGC signal 210, which is input to the pre-amplifier 201 in a feedback loop described earlier, and is used to reduce or increase the amount of amplification as the peak voltage changes in order to maintain a constant amplification. The effect is to keep the signal amplitude constant to minimize distortion from weak to strong signals off the detector.

Second, the signal 215 is also input to digitizing circuit 205, shown as a single block in FIG. 24a, and shown in more detail in FIG. 24b. As stated, this circuitry functions to produce a digital signal 216, where the width of and space between the pulses making up the signal corresponds to that of the bars in the bar code symbol being scanned.

Turning to FIG. 24b, an exemplary embodiment of this circuit comprises bandpass filter 217, low pass filter 218, unity gain buffers 219 and 220, high pass filters 221 and 222, comparators 223 and 224, threshold generator 225, gating generator 226, AND gates 227 and 228, and flip-flop 229, all coupled together as shown in the figure.

The operation of the digitizing circuit begins with the input of signal 215 to bandpass filter 217. The bandpass filter functions to produce signal 230, which is the first derivative of signal 215. The output of the bandpass filter 230 is then input to low pass filter 218, which functions to cut out high frequency noise components, and make the first derivative signal 230 more "smooth" and uniform than the raw first derivative signal.

The resultant signal 231, labelled as the DER signal, is then input to unity gain buffers 219 and 220, which differ insofar as buffer 219 is configured to have a gain of +1, while buffer 220 is configured to have a gain of −1. The resultant signals, DER+ signal 232 and DER− signal 233, are complements of each other. These signals are then input to high pass filters 221 and 222, respectively.

These high pass filters function to form the second derivative of the inputted signals. The resultant signals, 2nd+ signal 234 and 2nd− signal 235, are also complements of each other. These signals are then both input to comparators 223 and 224, with the 2nd− signal being input to the −input of comparator 223 and the +input of comparator 224, and the 2nd+ signal being input to the +input of comparator 223 and the −input of comparator 224. The function of the comparators is to detect when the second derivative of the input signal has undergone a transition point commonly known as a "zero crossing." A zero crossing represents a transition from a black to white bar or vice-versa in the analog signal. In the present exemplary embodiment, a zero crossing is determined to occur when the 2nd+ and 2nd− signals intersect each other. Alternatively, a zero crossing can be determined to occur when the 2nd+ signal makes a negative going transition through 0 volts.

The output of the comparators, SIG+ signal 236 and SIG− signal 237, are respectively input to AND gates 227 and 228. The other inputs to the AND gates are GATE− signal 238 and GATE+ signal 239, the generation of which will now be described with reference to FIG. 24a.

Turning to that figure, a motion sense circuit 206 is provided, and one function of this circuit is to generate a pulse at the beginning of each scan. The pulse which is generated is START OF SCAN ("SOS") signal 240. With reference to the embodiment of the scan module illustrated in FIG. 12, the SOS signal is based on information generated by photosensor 87, mounted on motor PCB 53. As stated, this component is actually an emitter/detector combination which provides a transition signal when a new facet of the polygon rotates in front of the detector portion of the photosensor. This signal is passed to the motion sense circuit, which in turn notes (and calculates, effectively, using the photoreflector input) when a new scan line (generated by the passing of a new scan facet, in the polygon case) is ready to start scanning. The result is the start of scan ("SOS") signal 240 which is sent out from the motion sense circuit.

Turning back to FIG. 24b, the SOS signal is then input to threshold generator 225, which generates a threshold level on THRESH signal 241 when a pulse appears on the SOS signal 240. Thus, a threshold level will be determined for every scan. The threshold level for a scan is advantageously a fixed value which is not determined through conventional means, i.e., by peak detection or filtering, and is therefore independent of the analog signal throughout the scan. Alternatively, the threshold level is "toggled" between different values on successive scans of the same symbol. For example, the threshold level could be "toggled" between high and low levels on successive scans with the high level determined appropriate for far field labels or large labels, and the low level determined appropriate for near field labels or small labels. The digital signals from the various scans are then compared, and the one which best represents the analog signal, as determined by a check sum digit, parity check, or other known method, is retained for further processing. It has been found that such an approach dramatically improves the read rate which can be achieved, and also increases the capability of the scanner to read a wide variety of labels with varying label contrast and reflected light intensity.

Moreover, this technique of using the SOS signal can also be employed to "toggle" gain or bandpass in order to improve scanner depth of field capability. For example, these parameters could be set on a first scan in a manner determined appropriate to process weak signals, far field labels, or large labels, such as by increasing the amplification and decreasing the bandwidth from nominal values. Then, on a successive scan of the same symbol, the parameters could be set in a manner determined appropriate for another type of symbol or label, e.g., near field labels or small labels, such as by decreasing the amplification and increasing the bandwidth from nominal values. Other examples are possible, including where other parameters are varied, or where the parameters are "toggled" over more than two scans, and it should be appreciated that the above description is not meant to be limiting.

Still further, using the focus error sensing subsystem described with reference to FIG. 23, thresholding could be automatically toggled to match optimum parameters for a specific "read distance" from the scanner.

Turning back to FIG. 24b, the THRESH signal is input to gating generator 226 along with the DER+ and DER− signals discussed previously. The function of the gating generator 226 is to generate gating pulses which define gating periods during which the SIG− and SIG+ signals are evaluated for a zero crossing. The output of the gating generator is a pair of pulses, GATE− 238 and GATE+ 239, which define these periods for the two signals SIG− and SIG+.

The SIG− signal is then ANDed with the GATE− signal by means of AND gate 227, ad the resultant output, signal 242, is then input to the RESET input of flip-flop 229. Similarly, the SIG+ signal is ANDed with the GATE+ signal by means of AND gate 228, and the resultant output, signal 243, is then input to the SET input of flip-flop 29.

The result of all this is that when a zero-crossing appears on the SIG− signal during the period defined by the GATE− signal, the output of the flip-flop will be reset to a logical "0," while when a zero-crossing appears on the SIG+ signal during the period defined by the GATE+ signal, the output of the flip-flop will be set to a logical "1." The result is an accurate digital representation of the scanned bar symbols. Additional details on the aforementioned method of signal processing, and derivative-based signal processing in general, are available in "SIGNAL PROCESSING APPARATUS AND METHOD," U.S. application Ser. No. 07/786,290, filed Nov. 1, 1991, Elliott et al., which is hereby fully incorporated by reference herein as though set forth in full, and U.S. Pat. No. 4,000,397, Herbert et al., which is also hereby fully incorporated by reference herein as though set forth in full.

Summary

The various embodiments of the scan module which have been discussed will now be summarized.

First, a scan module has been described which is partitioned into a number of discrete subsystems, including a laser diode subsystem, a scanning subsystem, optional aiming subsystem, collection subsystem, and signal processing subsystem.

Further, with reference to FIG. 12, each of these subsystems is releasably affixed to a single optical chassis, and hence can be separately removed and interchanged with a different component, while leaving all other subsystems the same, in order to configure the scan module for a different purpose.

As has been discussed, a variety of laser diode subsystems are possible for incorporation into the scan module, which differ according to the laser diode, laser diode optics, or the method of mounting the laser diode optics which are utilized.

For example, laser diode subsystems incorporating visible or infrared laser diodes are possible. Further, laser diode subsystems configured with laser diode optics with or without an aperture, laser diode optics with a truncated gaussion output, or a multi-focus or auto-focus lens system are possible.

Still further, a laser diode subsystem with fixed single position lens system, a multi-position selectable lens system, or configured with an auto-focus mechanism are all possible.

A variety of scanning subsystems are also possible for incorporation into the module, including a one-dimensional polygonal approach, with the polygon configured for either short- or long-range scanning, a polygon oscillating mirror approach for two-dimensional scanning, a two-oscillating mirror approach for two-dimensional scanning, a single oscillating mirror approach for one-dimensional scanning, a holographic disk approach with or without a pivoting fold mirror for one or two-dimensional scanning, respectively, and a basket scanner approach.

A scan module is possible with or without aiming optics. An embodiment of aiming optics has been described which can be readily incorporated into the scan module, according to which a grating is utilized to pick off the scanning beam at the extremes of the scanning cycle to form the aiming beam. Accordingly, an aiming beam can be formed from the same source as the scanning beam.

A variety of collection subsystems are also possible for incorporation into the scan module, including an embodiment utilizing toroidal collection optics, an approach illustrated in FIG. 17, in which a separate fixed mirror is utilized for collection, and the basket scanner approach (illustrated in FIGS. 18a–18b) in which the scanning mirrors also function as collection mirrors.

A variety of signal processing subsystems are also possible, including an approach utilizing second-derivative detection electronics, or an approach utilizing second derivative detection electronics in conjunction with the focus error feedback subsystem.

All these options are best illustrated in FIG. 3, in which the top view of header boxes, identified with numerals 300, 303, 308, 312, 319, 322 and 325, represent the subsystems making up the scan module, and the boxes in the rows below each header box representing the options available for the subsystem represented by the header box.

The boxes labelled with identifying numerals 301–302, 304–307, and 309–311 all represent options available for the laser diode subsystem; the boxes labelled with identifying numerals 313–318 all represent options available for the scanning subsystem; the boxes labelled 320–321 all represent options available for the aiming optics; the boxes labelled 323–324 representing options available for the collection subsystem; and the boxes labelled 326–327 all representing options available for the signal processing subsystem.

An overall assembly of a laser bar code scanner has also been described in which a scan module incorporating any of the options described above can be readily incorporated by interchanging it with a scan module already contained in the unit.

Turning to FIG. 1, for example, scan module 2 can be readily interchanged with an alternate scan module incorporating any of the features illustrated in FIG. 3 simply by removing bumper 19, housing top 16, and then lifting out the scan module 2 (after disconnecting the ribbon cable connecting the scan module to digital PCB 5). A second scan module can then be fitted into its place simply by re-connecting the ribbon cable to the module, adding the shock mounts 3, reinserting the scan module within the housing so that the shock mounts fit into the slots 4, placing the housing top 16 back in place, and then putting the bumper 19 back in place.

Additionally, turning to FIG. 12, many of the subsystems within the scan module can be interchanged with alternative subsystems incorporating any of the features illustrated in FIG. 3. For example, for a module equipped with a polygon 52 configured for short-range applications, that polygon can readily be replaced by a polygon configured for long-range applications simply by removing the scan module from the housing as described earlier, removing control PCB 66 (by removing screws 65), lifting polygon 52 off of magnet yoke 54, and replacing it with the alternate polygon, and then reassembling the unit.

Alternatively, if the module is not equipped with an aiming beam, and it is desired to add this capability, the module could be readily disassembled as described above, and grating 69 slipped into the corresponding slots in the optical chassis to add this capability.

Further, if the module is equipped with a grating configured for short-range use, and it is desired to replace it with a grating configured for long-range use, the unit could be disassembled as above, and grating 69 interchanged with the alternate grating.

Still further, if it is desired to replace the laser diode 82 (and laser diode PCB 83) with an alternate subassembly incorporating any of the options illustrated in FIG. 3, then the module could be disassembled as described above, and laser diode module 82 (which is affixed to laser diode board 83) interchanged with an alternate module and board by means of screw 85. Then, the new subassembly could be re-aligned by means of screw 84.

It should also be appreciated that laser bar code scanners configured for short-range, long-range and very-long range applications are possible simply by incorporating a scan module configured with the appropriate features.

For short range applications, defined as where the scanner is expected to read minimum bar code widths of 5 mils, and to read 40 mil labels out to distances of about 25 inches, the following features are appropriate:

visible laser diode modulated scanning beam laser diode optics with aperture stops of various shapes For long-range applications, defined as where the scanner is expected to read minimum bar code widths of 10 mils within a foot or so of the scanner, and to read minimum widths of 15 mils out to about 6 feet, and possibly, for very long-range applications, to read 40 mil labels at distance out to 12 feet, the following features are appropriate:

non-modulated scanning beam higher power laser diodes (up to 20 mW or more)

multi-focus laser diode optics auto-focus laser diode optics focusing error sensing optics

Housing

Additional detail on the housing body is provided in FIGS. 25a–25j; on the housing top, in FIGS. 26a–26f; and on the end cap subassembly, in FIGS. 27a–27k, in which exemplary dimensions are indicated in inches. In addition, further detail on interfacing is available in co-pending U.S. patent application Ser. No. 07/819,324, Reddersen, filed Jan. 10, 1992, entitled "OPTICAL SYSTEM FOR DATA READ-ING APPLICATIONS," which is hereby fully incorporated by reference herein as though set forth in full.

Resonant Cavity

By utilizing an appropriate air cavity, the volume of the sound developed by a piezoelectric buzzer (see FIG. 36a) can be increased. The increase in sound pressure is developed at certain resonant frequencies (sub-harmonics as well as harmonics). The resonant frequencies are determined by several factors: the size of the cavity, the size of the piezo, and (to a lesser degree) the type of material used for the product enclosure. The bandwidth of the resonant frequency ranges are very narrow, on the order of 20 to 30 Hz. The resonant frequencies occur in octave increments (i.e., 500 Hz, 1000 Hz, 2000 Hz, etc.). By changing the size of the air cavity, the sound pressure of almost any frequency can be increased.

What is taking place is that at certain specific resonant frequencies, a standing wave is built up inside the air cavity between the piezo buzzer and the wall opposite the piezo buzzer. When this condition occurs, the opposite wall vibrates (provided that it is thin enough) in phase with the buzzer (see FIG. 36b). This allows the buzzer to move farther with less effort, which increases the amount of sound pressure that it can develop. Not only does the buzzer produce more sound, but the opposite wall produces sound while vibrating and directs sound in the opposite direction of the buzzer (this would usually be towards the outside of the case of the product).

This design has the advantage of not requiring a separate housing for the buzzer, since the cavity formed by the housing top can be configured to be resonant. The product wall becomes the housing for the buzzer. This reduces the required space for the design. Another advantage to this design is that it increases sound pressure without increasing input power to the piezo. A third advantage is that sound is produced on the opposite wall from the buzzer without the use of unsightly holes. This is generally the side of the wall that the sound is desired to originate from.

Figure 36A:
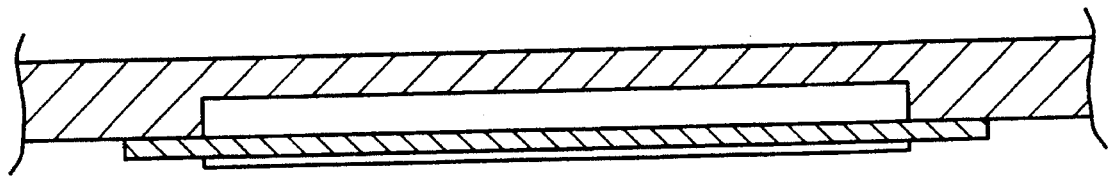
FIGS. 36a–36b describe a housing for the scanner of the subject invention which is configured to include a resonant cavity for the piezoelectric buzzer.
Figure 36B:
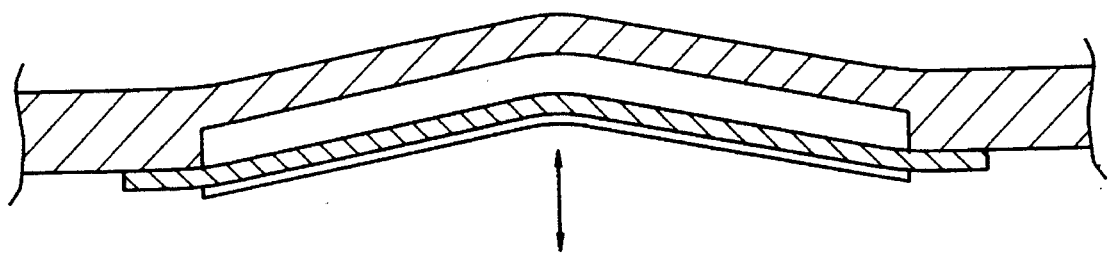

A side view of the subject resonant cavity is illustrated in FIGS. 36a–36b. Advantageously, the resonant cavity is circular in shape when viewed from a top view. Exemplary dimensions of the subject resonant cavity, for a resonant frequency of 2 KHZ, are as follows:

Thickness of opposite wall—80 mils.

Diameter of circular cavity—1.45 in.

Depth of cavity—45 mils.

It should be appreciated that the resonant frequency in the aforementioned dimensions bear a certain relationship to one another. It has been found in practice that the following formula provides a good representation of that relationship:

$$\text{Resonant frequency} = K \times \text{depth of cavity} \div \sqrt{\pi \times \text{radius}^2 \times \text{thickness of opposite wall}}$$

where the constant $K$ is about 97.04.

Additional advantages and modifications will readily occur to those skilled in the art. The invention in its broader aspects is not, therefore, limited to the specific details, representative methods, and illustrative examples shown and described. Accordingly, departures may be made from such details without departing from the spirit of scope of applicants' general inventive concept.

What is claimed is:

1. A laser bar code scanner assembly comprising:

a housing body enclosing, at least partly, an interior;

a window positioned on one end of the housing body; and a first scan module releasably affixed to the interior of the housing body which projects a laser beam through the window along an optical path to a laser bar code symbol, scans the beam over the symbol in a predetermined pattern, collects at least a portion of resultant light reflected from the symbol, and produces a digital signal comprising pulses; and a second scan module which is readily interchangeable with and plug compatible with the first scan module, and which is configured at least partly differently from the first scan module, wherein the second scan module comprises a first printed circuit board having first and second sides;

a rotating optical scanning element positioned to the first side of the first printed circuit board; and a compact motor coupled to the optical scanning element and mounted to the first printed circuit board, the compact motor comprising a DC brushless motor having a motor shaft having one end coupled to the optical scanning element, a magnet yoke mounted inside the optical scanning element, a magnet affixed to the magnet yoke to form a segmented magnet which is mechanically coupled to a proximate end of the motor shaft, and at least three motor wire coils mounted on the first printed circuit board.

2. The laser bar code scanner assembly of claim 1 wherein the second scan module is configured with a polygonal scanning mirror.

3. The laser bar code scanner assembly of claim 2 wherein the second scan module is configured to scan the laser beam in a one-dimensional pattern.

4. A handheld scanner comprising:

a first printed circuit board having first and second sides;

a rotating optical scanning element positioned to the first side of the first printed circuit board; and a compact motor coupled to the optical scanning element and mounted to the first printed circuit board, the compact motor comprising a DC brushless motor having a motor shaft having one end coupled to the optical scanning element, a magnet yoke mounted inside the optical scanning element, a magnet affixed to the magnet yoke to form a segmented magnet which is mechanically coupled to a proximate end of the motor shaft, and at least three motor wire coils mounted on the first printed circuit board.

5. The laser bar code scanner assembly of claim 3 wherein the optical scanning element comprises a multi-faceted polygon mirror.

6. The laser bar code scanner assembly of claim 4 wherein the magnet is made of rare earth $S_nCO_5$.

7. A laser bar code scanner assembly comprising:

a housing body enclosing, at least partly, an interior;

a window; and a scan module releasably affixed to the interior of the housing body, wherein the scan module projects a laser beam through the window along an optical path to a laser bar code symbol, scans the beam over the symbol in a predetermined pattern, and collects at least a portion of the resultant light reflected from the symbol, wherein the scan module is releasably affixed to the interior of the housing body by shock mounts mounted to sides of the scan module which fit into corresponding slots configured within the interior of the housing body.

8. The laser bar code scanner assembly of claim 7 wherein the housing body includes a removable housing top portion which when removed permits access to the interior of the housing body, the shock mounts being held in the slots by the housing top portion when the housing top portion is attached and the shock mounts being releasable from the slots when the housing top portion is removed.

9. The laser bar code scanner assembly of claim 7 wherein the shock mounts are installed on hubs attached to sides of the scan module.

* * * * *